(12) United States Patent
Wang et al.

(10) Patent No.: US 11,774,728 B2
(45) Date of Patent: Oct. 3, 2023

(54) PHOTOGRAPHING OPTICAL LENS SYSTEM, IMAGE CAPTURING UNIT AND ELECTRONIC DEVICE

(71) Applicant: LARGAN PRECISION CO., LTD., Taichung (TW)

(72) Inventors: Kuan Chun Wang, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 488 days.

(21) Appl. No.: 17/148,430

(22) Filed: Jan. 13, 2021

(65) Prior Publication Data
US 2022/0187570 A1    Jun. 16, 2022

(30) Foreign Application Priority Data
Dec. 11, 2020 (TW) ................. 109143918

(51) Int. Cl.
| | |
|---|---|
| G02B 13/00 | (2006.01) |
| G02B 9/64 | (2006.01) |
| G02B 13/02 | (2006.01) |
| G02B 13/06 | (2006.01) |
| G02B 27/00 | (2006.01) |

(52) U.S. Cl.
CPC ........... *G02B 13/0045* (2013.01); *G02B 9/64* (2013.01); *G02B 13/02* (2013.01); *G02B 13/06* (2013.01); *G02B 27/0025* (2013.01)

(58) Field of Classification Search
CPC ...... G02B 13/0045; G02B 9/64; G02B 13/02; G02B 13/06; G02B 27/0025; G02B 13/18
See application file for complete search history.

(56) References Cited

U.S. PATENT DOCUMENTS

| | | |
|---|---|---|
| 5,015,076 A | 5/1991 | Ueda |
| 10,310,226 B2 | 6/2019 | Li |

(Continued)

FOREIGN PATENT DOCUMENTS

| | | |
|---|---|---|
| CN | 108181701 A | 6/2018 |
| CN | 109407265 A | 3/2019 |

(Continued)

OTHER PUBLICATIONS

TW Office Action in Application No. 109143918 dated Oct. 26, 2021.

*Primary Examiner* — William Choi
*Assistant Examiner* — Ray Alexander Dean
(74) *Attorney, Agent, or Firm* — Maschoff Brennan

(57) ABSTRACT

A photographing optical lens system includes seven lens elements which are, in order from an object side to an image side along an optical path: a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The object-side surface of the sixth lens element is concave in a paraxial region thereof, and the image-side surface of the sixth lens element is convex in a paraxial region thereof. At least one of the object-side surface and the image-side surface of at least one lens element of the photographing optical lens system has at least one inflection.

25 Claims, 26 Drawing Sheets

(56) References Cited

U.S. PATENT DOCUMENTS

| | | | |
|---|---|---|---|
| 10,656,391 B1 | 5/2020 | Cognard | |
| 2014/0043694 A1* | 2/2014 | Tsai | G02B 13/04 359/708 |
| 2015/0338607 A1 | 11/2015 | Liao et al. | |
| 2017/0184819 A1* | 6/2017 | Shi | G02B 13/0045 |
| 2018/0059376 A1 | 3/2018 | Lin et al. | |
| 2019/0049698 A1 | 2/2019 | Chen | |

FOREIGN PATENT DOCUMENTS

| | | |
|---|---|---|
| CN | 110554484 A | 12/2019 |
| CN | 210323542 U | 4/2020 |
| CN | 111198438 A | 5/2020 |
| CN | 111399190 A | 7/2020 |
| CN | 111983785 A | 11/2020 |
| JP | H05-173069 A | 7/1993 |
| JP | H11-52239 A | 2/1999 |
| TW | M600398 U | 8/2020 |
| WO | 2018/045607 A1 | 3/2018 |
| WO | 2021117497 A1 | 6/2021 |
| WO | 2022052051 A1 | 3/2022 |

* cited by examiner

PHOTOGRAPHING OPTICAL LENS SYSTEM, IMAGE CAPTURING UNIT AND ELECTRONIC DEVICE

RELATED APPLICATIONS

This application claims priority to Taiwan Application 109143918, filed on Dec. 11, 2020, which is incorporated by reference herein in its entirety.

BACKGROUND

Technical Field

The present disclosure relates to a photographing optical lens system, an image capturing unit and an electronic device, more particularly to a photographing optical lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing optical lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The object-side surface of the first lens element is concave in a paraxial region thereof. The sixth lens element has positive refractive power. The object-side surface of the sixth lens element is concave in a paraxial region thereof. The image-side surface of the sixth lens element is convex in a paraxial region thereof. At least one of the object-side surface and the image-side surface of at least one lens element of the photographing optical lens system has at least one inflection point.

When an Abbe number of the third lens element is V3, an Abbe number of the fourth lens element is V4, an Abbe number of the fifth lens element is V5, an axial distance between the object-side surface of the first lens element and an image surface is TL, an entrance pupil diameter of the photographing optical lens system is EPD, and a maximum image height of the photographing optical lens system is ImgH, the following conditions are satisfied:

$0.30<(V3+V5)/V4<1.2;$ $1.0<TL/EPD<6.0;$ and $0.80<TL/ImgH<1.8.$

According to another aspect of the present disclosure, a photographing optical lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The object-side surface of the first lens element is concave in a paraxial region thereof. The image-side surface of the first lens element is convex in a paraxial region thereof. The sixth lens element has positive refractive power. The object-side surface of the sixth lens element is concave in a paraxial region thereof. The image-side surface of the sixth lens element is convex in a paraxial region thereof. The image-side surface of the seventh lens element is concave in a paraxial region thereof. At least one of the object-side surface and the image-side surface of at least one lens element of the photographing optical lens system has at least one inflection point.

When an Abbe number of the third lens element is V3, an Abbe number of the fourth lens element is V4, an Abbe number of the fifth lens element is V5, an axial distance between an object-side surface of the first lens element and an image surface is TL, and an entrance pupil diameter of the photographing optical lens system is EPD, the following conditions are satisfied:

$0.30<(V3+V5)/V4<1.2;$ and $1.0<TL/EPD<6.0.$

According to another aspect of the present disclosure, a photographing optical lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The object-side surface of the second lens element is convex in a paraxial region thereof. The image-side surface of the second lens element is concave in a paraxial region thereof. The image-side surface of the fourth lens element is convex in a paraxial region thereof. The object-side surface of the sixth lens element is concave in a paraxial region thereof. The image-side surface of the sixth lens element is convex in a paraxial region thereof. The seventh lens element has negative refractive power. At least one of the object-side surface and the image-side surface of at least one lens element of the photographing optical lens system has at least one inflection point.

When an Abbe number of the third lens element is V3, an Abbe number of the fourth lens element is V4, an Abbe number of the fifth lens element is V5, a central thickness of the sixth lens element is CT6, a central thickness of the seventh lens element is CT7, an axial distance between the sixth lens element and the seventh lens element is T67, a focal length of the first lens element is f1, and a focal length of the fourth lens element is f4, the following conditions are satisfied:

$$0.40<(V3+V5)/V4<1.0;$$

$$1.5<(CT6+CT7)/T67<13;\text{ and}$$

$$2.2<|f1/f4|.$$

According to another aspect of the present disclosure, an image capturing unit includes one of the aforementioned photographing optical lens systems and an image sensor, wherein the image sensor is disposed on the image surface of the photographing optical lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
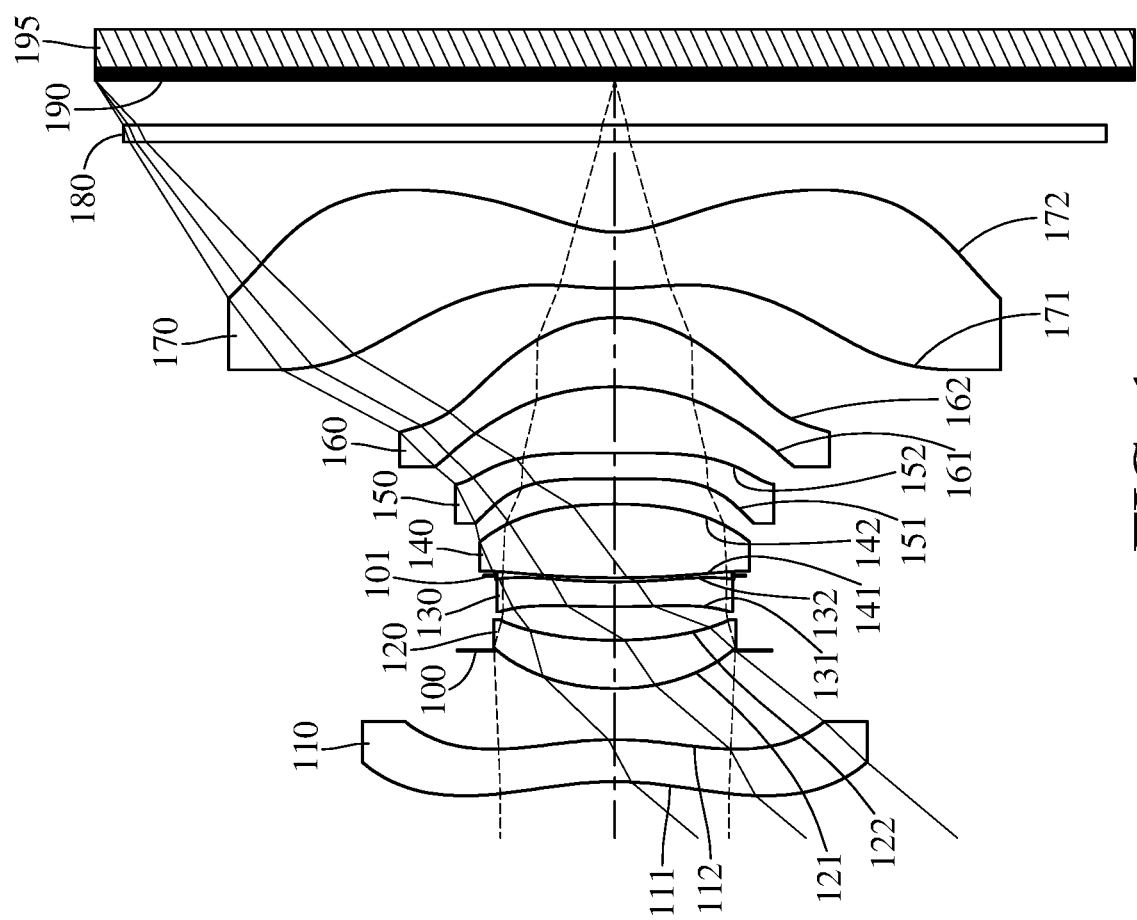
FIG. 1 is a schematic view of an image capturing unit according to the 1st embodiment of the present disclosure.

A photographing optical lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The object-side surface of the first lens element can be concave in a paraxial region thereof. Therefore, it is favorable for adjusting the incident angle of light on the first lens element so as to increase the field of view and reduce the size of the object side of the photographing optical lens system. The image-side surface of the first lens element can be convex in a paraxial region thereof. Therefore, it is favorable for the first and second lens elements to collaboration with each other so as to reduce the size of the object side of the photographing optical lens system and correct aberrations.

The object-side surface of the second lens element can be convex in a paraxial region thereof. Therefore, it is favorable for adjusting the surface shape and refractive power of the second lens element so as to reduce the size of the object side of the photographing optical lens system. The image-side surface of the second lens element can be concave in a paraxial region thereof. Therefore, it is favorable for adjusting the surface shape of the second lens element so as to correct aberrations such as astigmatism.

The image-side surface of the fourth lens element can be convex in a paraxial region thereof. Therefore, it is favorable for adjusting the travelling direction of light rays so as to obtain a balance between wide field of view and miniaturization of the photographing optical lens system. The fourth lens element can have positive refractive power. Therefore, it is favorable for adjusting the refractive power distribution of the photographing optical lens system so as to reduce the system size and enlarge the field of view.

The object-side surface of the sixth lens element is concave in a paraxial region thereof. Therefore, it is favorable for adjusting the travelling direction of light rays so as to adjust system size distribution and enlarge the field of view. The image-side surface of the sixth lens element is convex in a paraxial region thereof. Therefore, it is favorable for adjusting the travelling direction of light rays so as to increase the image surface area and improve image quality. The sixth lens element can have positive refractive power. Therefore, it is favorable for reducing the size of the image side of the photographing optical lens system.

The seventh lens element can have negative refractive power. Therefore, it is favorable for balancing the refractive power distribution at image side of the photographing optical lens system so as to correct aberrations such as spherical aberration. The object-side surface of the seventh lens element can be convex in a paraxial region thereof. Therefore, it is favorable for adjusting the surface shape of the seventh lens element so as to correct off-axis aberrations. The image-side surface of the seventh lens element can be concave in a paraxial region thereof. Therefore, it is favorable for adjusting the back focal length to the proper length.

Figure 23:
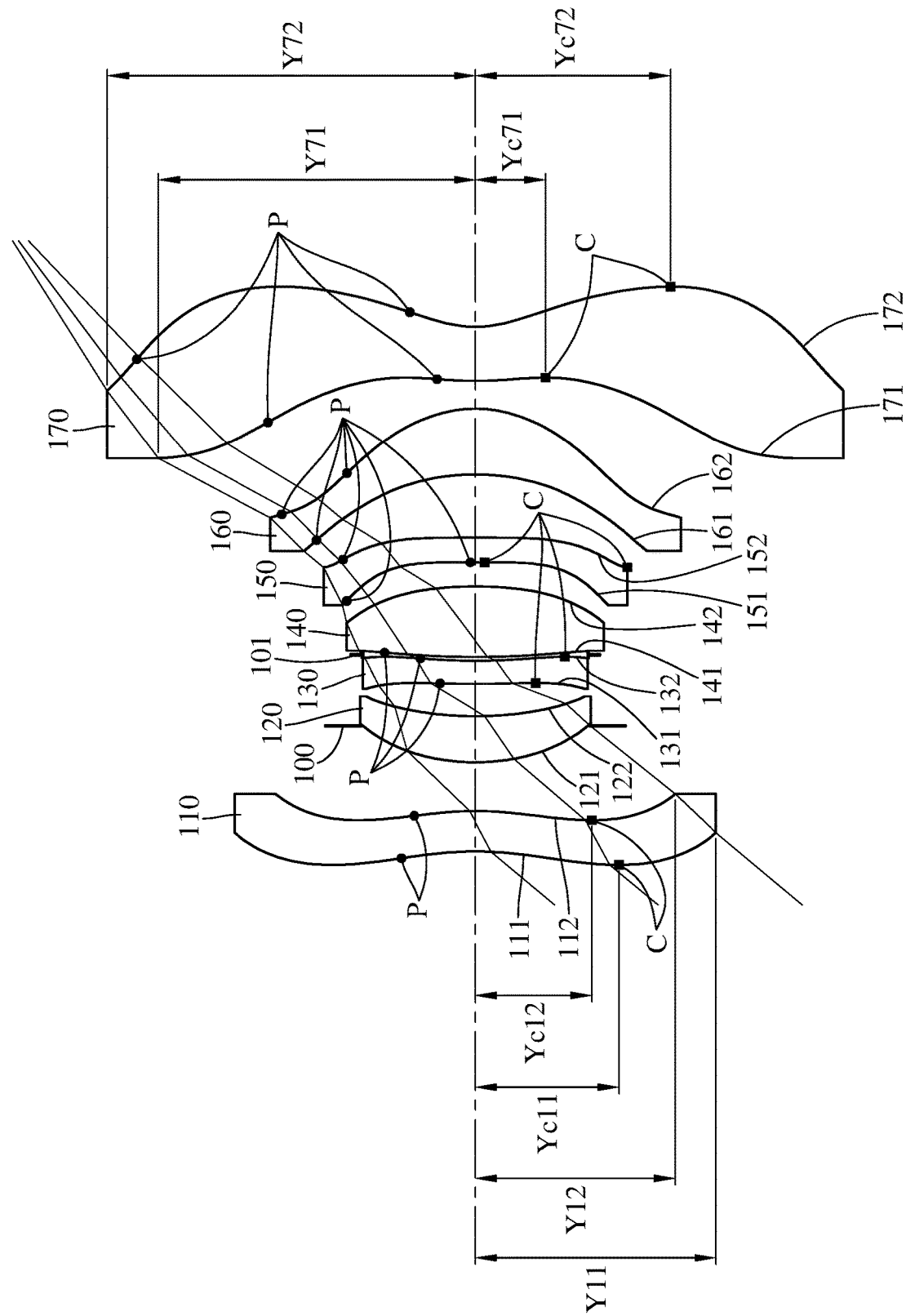
FIG. 23 shows a schematic view of Y11, Yc11, Y12, Yc12, Y71, Yc71, Y72, Yc72, and inflection points and critical points of lens elements according to the 1st embodiment of the present disclosure.

According to the present disclosure, at least one of the object-side surface and the image-side surface of at least one lens element of the photographing optical lens system has at least one inflection point. Therefore, it is favorable for increasing the variation of lens surface so as to correct aberrations and reduce the size of lens element. Moreover, at least one of the object-side surface and the image-side surface of each of at least two lens elements of the photographing optical lens system can also have at least one inflection point. Moreover, at least one of the object-side surface and the image-side surface of each of at least three lens elements of the photographing optical lens system can also have at least one inflection point. Please refer to FIG. 23, which shows a schematic view of inflection points P of lens elements according to the 1st embodiment of the present disclosure.

According to the present disclosure, at least one of the object-side surface and the image-side surface of at least one lens element of the photographing optical lens system can have at least one critical point in an off-axis region thereof. Therefore, it is favorable for further increasing the variation of lens surface so as to improve image quality, reduce the system size and enlarge the field of view. The object-side surface of the first lens element can have at least one critical point in an off-axis region thereof. Therefore, it is favorable for adjusting the surface shape of the first lens element so as to enlarge the field of view and reduce the size of the object side of the photographing optical lens system. When a vertical distance between a critical point on the object-side surface of the first lens element and an optical axis is Yc11, and a maximum effective radius of the object-side surface of the first lens element is Y11, the object-side surface of the first lens element can have at least one critical point in the off-axis region thereof satisfying the following condition: $0.15<Yc11/Y11<0.75$. Therefore, it is favorable for further adjusting the surface shape of the first lens element so as to reduce the size of the object side of the photographing optical lens system. The image-side surface of the first lens element can have at least one critical point in an off-axis region thereof. Therefore, it is favorable for adjusting the surface shape of the first lens element so as to reduce the outer diameter of the first lens element. When a vertical distance between a critical point on the image-side surface of the first lens element and the optical axis is Yc12, and a maximum effective radius of the image-side surface of the first lens element is Y12, the image-side surface of the first lens element can have at least one critical point in the off-axis region thereof satisfying the following condition: $0.20<Yc12/Y12<0.75$. Therefore, it is favorable for further adjusting the surface shape of the first lens element so as to reduce the outer diameter of the first lens element. The object-side surface of the seventh lens element can have at least one critical point in an off-axis region thereof. Therefore, it is favorable for adjusting the incident angle of light on the seventh lens element so as to reduce stray light, increase illuminance and improve image quality. When a vertical distance between a critical point on the object-side surface of the seventh lens element and the optical axis is Yc71, and a maximum effective radius of the object-side surface of the seventh lens element is Y71, the object-side surface of the seventh lens element can have at least one critical point in the off-axis region thereof satisfying the following condition: $0.10<Yc71/Y71<0.50$. Therefore, it is favorable for further improving the image quality. The image-side surface of the seventh lens element can have at least one critical point in an off-axis region thereof. Therefore, it is favorable for adjusting the incident angle of light on the image surface so as to increase image quality and improve the response efficiency of an image sensor. When a vertical distance between a critical point on the image-side surface of the seventh lens element and the optical axis is Yc72, and a maximum effective radius of the image-side surface of the seventh lens element is Y72, the image-side surface of the seventh lens element can have at least one critical point in the off-axis region thereof satisfying the following condition: $0.35<Yc72/Y72<0.80$. Therefore, it is favorable for further improving the image quality. Please refer to FIG. 23, which shows a schematic view of Y11, Yc11, Y12, Yc12, Y71, Yc71, Y72, Yc72, and critical points C of lens elements according to the 1st embodiment of the present disclosure.

When an Abbe number of the third lens element is V3, an Abbe number of the fourth lens element is V4, and an Abbe number of the fifth lens element is V5, the following condition is satisfied: $0.30<(V3+V5)/V4<1.2$. Therefore, it is favorable for adjusting the material distribution of lens elements so as to correct aberrations such as chromatic aberration. Moreover, the following condition can also be satisfied: $0.40<(V3+V5)/V4<1.0$. Moreover, the following condition can also be satisfied: $0.50<(V3+V5)/V4<0.80$.

When an axial distance between the object-side surface of the first lens element and an image surface is TL, and an entrance pupil diameter of the photographing optical lens system is EPD, the following condition can be satisfied: $1.0<TL/EPD<6.0$. Therefore, it is favorable for obtaining a balance between reducing the total track length and enlarging the size of aperture stop. Moreover, the following condition can also be satisfied: $2.0<TL/EPD<5.0$. Moreover, the following condition can also be satisfied: $2.8<TL/EPD<4.0$.

When the axial distance between the object-side surface of the first lens element and the image surface is TL, and a maximum image height of the photographing optical lens system (which can be half of a diagonal length of an effective photosensitive area of an image sensor) is ImgH, the following condition can be satisfied: $0.80<TL/ImgH<1.8$. Therefore, it is favorable for obtaining a balance between reducing the total track length and enlarging the image surface, and favorable for enlarging the field of view. Moreover, the following condition can also be satisfied: $1.0<TL/ImgH<1.6$.

When a central thickness of the sixth lens element is CT6, a central thickness of the seventh lens element is CT7, and an axial distance between the sixth lens element and the seventh lens element is T67, the following condition can be satisfied: $1.5<(CT6+CT7)/T67<13$. Therefore, it is favorable for the sixth and seventh lens elements to collaboration with each other so as to correct aberrations and adjust the size distribution of the image side of the photographing optical lens system. Moreover, the following condition can also be satisfied: $2.0<(CT6+CT7)/T67<10$. Moreover, the following condition can also be satisfied: $2.5<(CT6+CT7)/T67<8.0$. Moreover, the following condition can also be satisfied: $3.0<(CT6+CT7)/T67<6.0$.

When a focal length of the first lens element is f1, and a focal length of the fourth lens element is f4, the following condition can be satisfied: $2.2<|f1/f4|$. Therefore, it is favorable for adjusting the refractive power distribution of the photographing optical lens system so as to increase the field of view and reduce the system size. Moreover, the following condition can also be satisfied: $3.0<|f1/f4|$. Moreover, the following condition can also be satisfied: $3.7<|f1/f4|$.

When the Abbe number of the third lens element is V3, the Abbe number of the fourth lens element is V4, the Abbe number of the fifth lens element is V5, an Abbe number of the sixth lens element is V6, and an Abbe number of the seventh lens element is V7, the following condition can be satisfied: $4.0<(V4+V6+V7)/(V3+V5)<6.0$. Therefore, it is favorable for adjusting the size distribution of lens elements so as to correct chromatic aberration.

When the maximum effective radius of the object-side surface of the first lens element is Y11, and the maximum effective radius of the image-side surface of the seventh lens element is Y72, the following condition can be satisfied: $0.25<Y11/Y72<0.90$. Therefore, it is favorable for adjusting the travelling direction of light rays so as to obtain a balance among the field of view, the image surface size and the system size distribution. Moreover, the following condition can also be satisfied: $0.30<Y11/Y72<0.75$.

When a minimum value among Abbe numbers of all lens elements of the photographing optical lens system is Vmin, the following condition can be satisfied: $10.0<Vmin<20.0$. Therefore, it is favorable for adjusting the material distribution of lens elements so as to further correct chromatic aberration.

When a focal length of the photographing optical lens system is f, the focal length of the first lens element is f1, a focal length of the second lens element is f2, and a focal length of the third lens element is f3, the following condition can be satisfied: $|f/f1|+|f/f2|+|f/f3|<1.0$. Therefore, it is favorable for adjusting the refractive power distribution of the object side of the photographing optical lens system so as to enlarge the field of view, correct aberrations and reduce the object-side size of the system. Moreover, the following condition can also be satisfied: $|f/f1|+|f/f2|+|f/f3|<0.85$.

When a central thickness of the first lens element is CT1, and a central thickness of the third lens element is CT3, the following condition can be satisfied: $0.90<CT1/CT3<2.8$. Therefore, it is favorable for adjusting the distribution of lens elements at the object side of photographing optical lens system so as to reduce the object-side size of the system. Moreover, the following condition can also be satisfied: $1.1<CT1/CT3<2.5$.

When the central thickness of the third lens element is CT3, and a central thickness of the fourth lens element is CT4, the following condition can be satisfied: $0.15<CT3/CT4<0.60$. Therefore, it is favorable for the third and fourth lens elements to collaborate with each other so as to balance the size distribution between the object side and image side of the photographing optical lens system. Moreover, the following condition can also be satisfied: $0.25<CT3/CT4<0.40$.

When the focal length of the fourth lens element is f4, and a focal length of the sixth lens element is f6, the following condition can be satisfied: $1.3<f4/f6<2.5$. Therefore, it is favorable for adjusting the refractive power distribution so as to reduce the size and the sensitivity of the photographing optical lens system.

When the focal length of the photographing optical lens system is f, a curvature radius of the object-side surface of the sixth lens element is R11, and a curvature radius of the image-side surface of the sixth lens element is R12, the following condition can be satisfied: $-7.5<f/R11+f/R12<-1.5$. Therefore, it is favorable for adjusting the surface shape and refractive power of the sixth lens element so as to correct aberrations, enlarge the field of view and increase the image surface area. Moreover, the following condition can also be satisfied: $-6.5<f/R11+f/R12<-2.5$. Moreover, the following condition can also be satisfied: $-5.5<f/R11+f/R12<-3.5$.

When the focal length of the photographing optical lens system is f, and a curvature radius of the image-side surface of the seventh lens element is R14, the following condition can be satisfied: $3.0<f/R14<4.0$. Therefore, it is favorable for adjusting the surface shape and refractive power of the seventh lens element so as to correct aberrations and adjust the back focal length.

When the axial distance between the object-side surface of the first lens element and the image surface is TL, and the focal length of the photographing optical lens system is f, the following condition can be satisfied: $1.2<TL/f<2.5$. Therefore, it is favorable for obtaining a balance between reducing the total track length and enlarging the field of view. Moreover, the following condition can also be satisfied: $1.5<TL/f<2.0$.

When an Abbe number of the first lens element is V1, an Abbe number of the second lens element is V2, and the Abbe number of the third lens element is V3, the following condition can be satisfied: $40.0<V1+V2+V3<125.0$. Therefore, it is favorable for the materials of the first, second and third lens elements to collaborate with one another so as to correct aberrations such as chromatic aberration. Moreover, the following condition can also be satisfied: $45.0<V1+V2+V3<115.0$.

When the focal length of the photographing optical lens system is f, and a composite focal length of the first lens element, the second lens element and the third lens element is f123, the following condition can be satisfied: $|f/f123|<0.40$. Therefore, it is favorable for adjusting the refractive power distribution at the object side of the photographing optical lens system so as to enlarge the field of view and correct aberrations. Moreover, the following condition can also be satisfied: $|f/f123|<0.35$.

When the focal length of the first lens element is f1, and a curvature radius of the object-side surface of the first lens element is R1, the following condition can be satisfied: $|f1|/R1<-2.5$. Therefore, it is favorable for adjusting the surface shape and refractive power of the first lens element so as to enlarge the field of view and reduce the outer diameter of the first lens element. Moreover, the following condition can also be satisfied: $|f1|/R1<-4.0$.

When the central thickness of the first lens element is CT1, a central thickness of the second lens element is CT2, and an axial distance between the first lens element and the second lens element is T12, the following condition can be satisfied: $0.80<(CT1+CT2)/T12<12$. Therefore, it is favorable for the first and second lens elements to collaboration with each other so as to enlarge the field of view. Moreover, the following condition can also be satisfied: $1.2<(CT1+CT2)/T12<9.5$.

When half of a maximum field of view of the photographing optical lens system is HFOV, the following condition can be satisfied: 42.5 degrees<HFOV<65.0 degrees. Therefore, it is favorable for obtaining a wide angle configuration and preventing aberrations such as distortion generated due to an overly large field of view. Moreover, the following condition can also be satisfied: 47.0 degrees<HFOV<58.0 degrees.

When an f-number of the photographing optical lens system is Fno, the following condition can be satisfied: 1.2<Fno<2.0. Therefore, it is favorable for obtaining a balance between the illuminance and depth of field.

When the focal length of the photographing optical lens system is f, and the focal length of the first lens element is f1, the following condition can be satisfied: |f/f1|<0.45. Therefore, it is favorable for adjusting the refractive power of the first lens element so as to enlarge the field of view and correct aberrations. Moreover, the following condition can also be satisfied: |f/f1|<0.30.

When the focal length of the photographing optical lens system is f, and a focal length of the seventh lens element is f7, the following condition can be satisfied: −1.8<f/f7<−0.70. Therefore, it is favorable for further adjusting the refractive power of the seventh lens element so as to correct aberrations.

When the focal length of the photographing optical lens system is f, and a composite focal length of the fourth lens element, the fifth lens element and the sixth lens element is f456, the following condition can be satisfied: 1.2<f/f456<1.8. Therefore, it is favorable for the fourth, fifth and sixth lens elements to collaborate with one another so as to reduce the system size and correct aberrations.

When the curvature radius of the object-side surface of the sixth lens element is R11, and the curvature radius of the image-side surface of the sixth lens element is R12, the following condition can be satisfied: 1.3<(R11+R12)/(R11−R12)<4.0. Therefore, it is favorable for adjusting the surface shape and refractive power of the sixth lens element so as to enlarge the field of view and increase the image surface area. Moreover, the following condition can also be satisfied: 1.6<(R11+R12)/(R11−R12)<3.5.

According to the present disclosure, the aforementioned features and conditions can be utilized in numerous combinations so as to achieve corresponding effects.

According to the present disclosure, the lens elements of the photographing optical lens system can be made of either glass or plastic material. When the lens elements are made of glass material, the refractive power distribution of the photographing optical lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photographing optical lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing optical lens system, based on the corresponding image sensor, can be flat or curved, especially a curved surface being concave facing towards the object side of the photographing optical lens system.

According to the present disclosure, an image correction unit, such as a field flattener, can be optionally disposed between the lens element closest to the image side of the photographing optical lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 24:
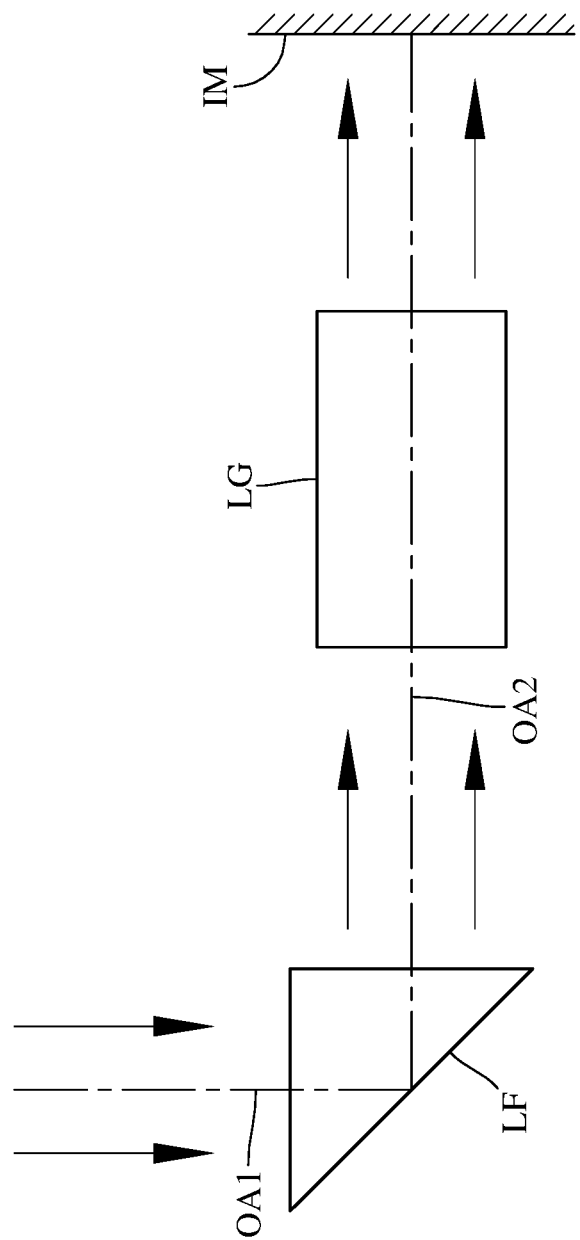
FIG. 24 shows a schematic view of a configuration of a light-folding element in an imaging lens assembly according to one embodiment of the present disclosure.
Figure 25:
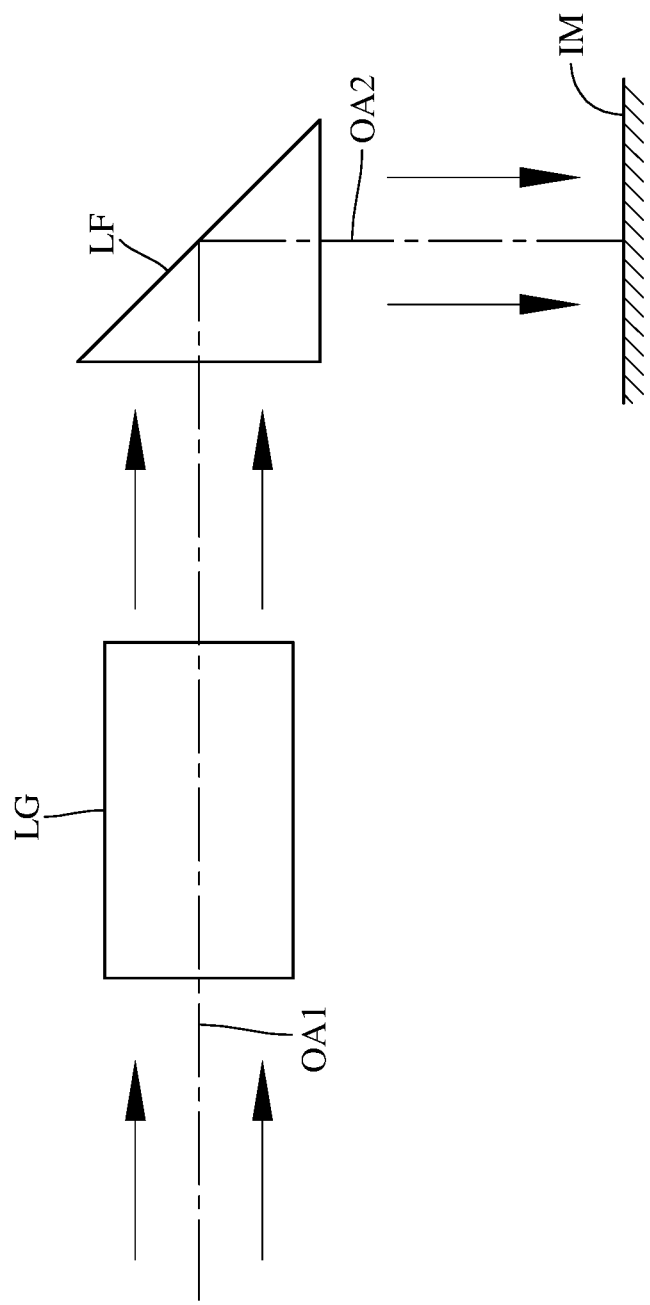
FIG. 25 shows a schematic view of another configuration of a light-folding element in an imaging lens assembly according to one embodiment of the present disclosure.
Figure 26:
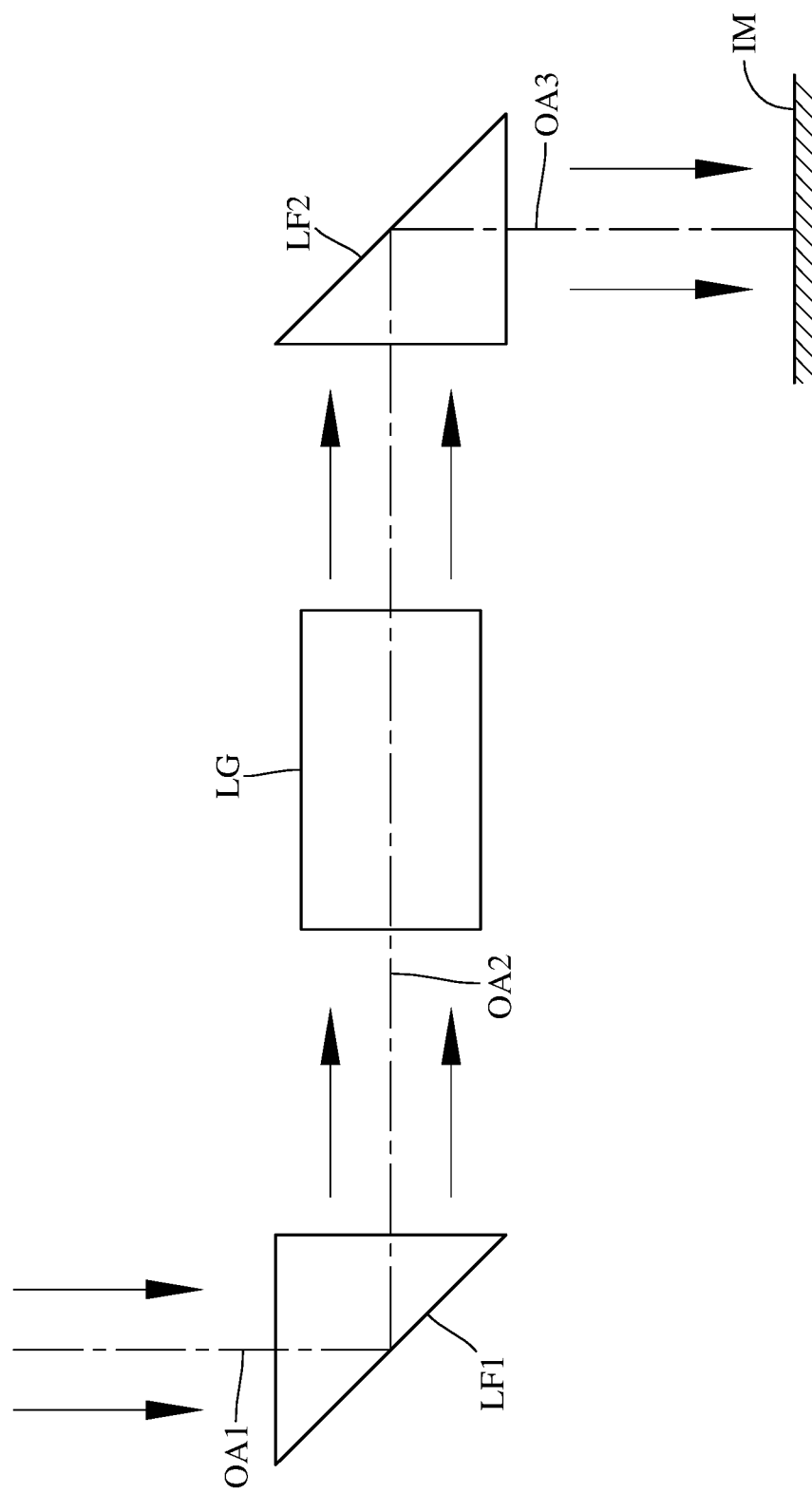
FIG. 26 shows a schematic view of a configuration of two light-folding elements in an imaging lens assembly according to one embodiment of the present disclosure.

According to the present disclosure, at least one light-folding element, such as a prism or a mirror, can be optionally disposed between an imaged object and the image surface on the imaging optical path, such that the photographing optical lens system can be more flexible in space arrangement, and therefore the dimensions of an electronic device is not restricted by the total track length of the photographing optical lens system. Specifically, please refer to FIG. 24 and FIG. 25. FIG. 24 shows a schematic view of a configuration of a light-folding element in a photographing optical lens system according to one embodiment of the present disclosure, and FIG. 25 shows a schematic view of another configuration of a light-folding element in a photographing optical lens system according to one embodiment of the present disclosure. In FIG. 24 and FIG. 25, the photographing optical lens system can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the photographing optical lens system as shown in FIG. 24 or disposed between a lens group LG of the photographing optical lens system and the image surface IM as shown in FIG. 25. Furthermore, please refer to FIG. 26, which shows a schematic view of a configuration of two light-folding elements in a photographing optical lens system according to one embodiment of the present disclosure. In FIG. 26, the photographing optical lens system can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the photographing optical lens system, the second light-folding element LF2 is disposed between the lens group LG of the photographing optical lens system and the image surface IM. The photographing optical lens system can be optionally provided with three or more light-folding elements, and the present disclosure is not limited to the type, amount and position of the light-folding elements of the embodiments disclosed in the aforementioned figures.

According to the present disclosure, the photographing optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens system and thereby provides a wider field of view for the same.

According to the present disclosure, the photographing optical lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
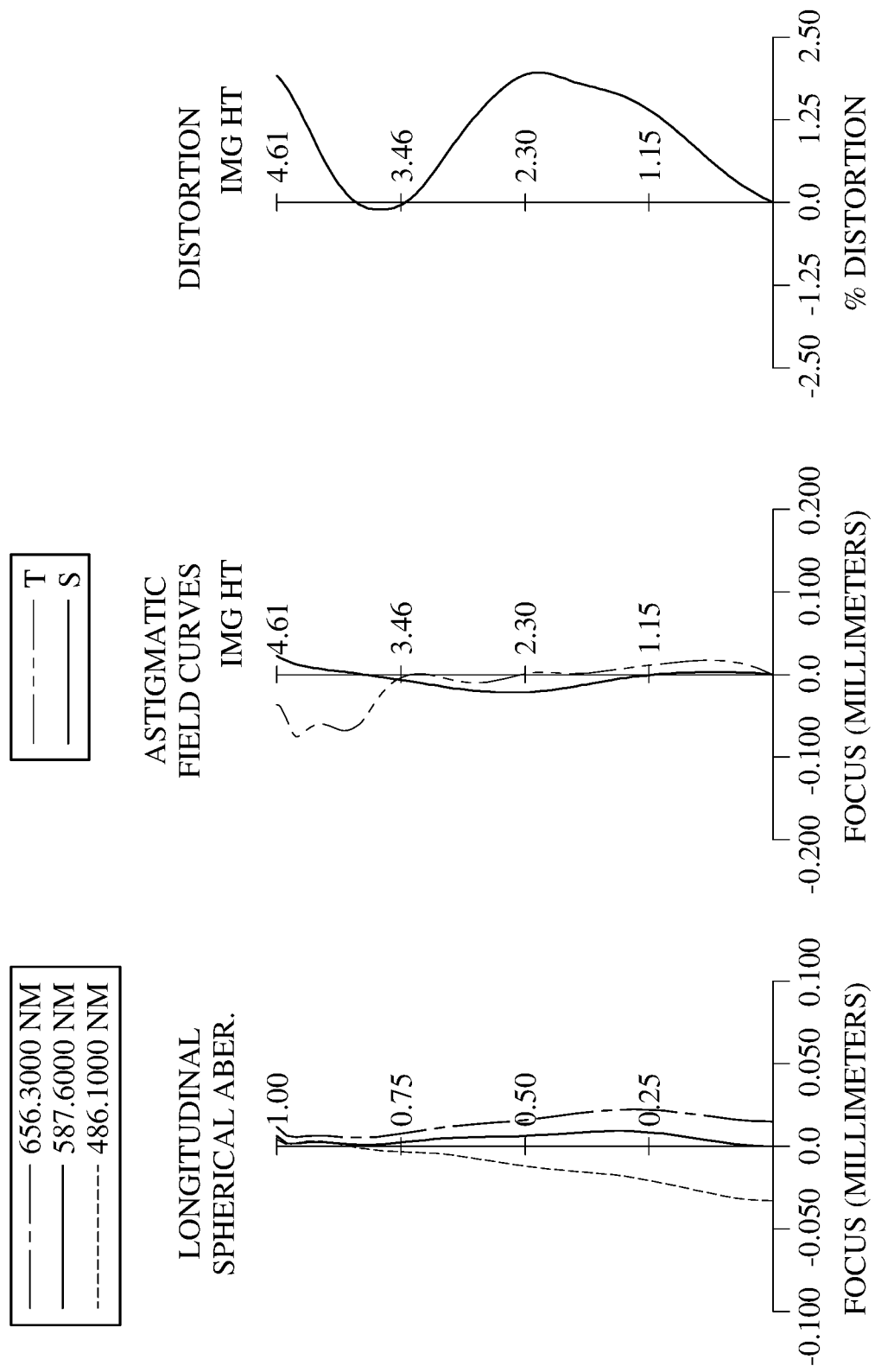
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens system (its reference numeral is omitted) of the present disclosure and an image sensor 195. The photographing optical lens system includes, in order from an object side to an image side along an optical path, a first lens element 110, an aperture stop 100, a second lens element 120, a third lens element 130, a stop 101, a fourth lens element 140, a fifth lens element 150, a sixth lens element 160, a seventh lens element 170, a filter 180 and an image surface 190. The photographing optical lens system includes seven lens elements (110, 120, 130, 140, 150, 160 and 170) with no additional lens element disposed between each of the adjacent seven lens elements.

The first lens element 110 with positive refractive power has an object-side surface 111 being concave in a paraxial region thereof and an image-side surface 112 being convex in a paraxial region thereof. The first lens element 110 is made of plastic material and has the object-side surface 111 and the image-side surface 112 being both aspheric. The object-side surface 111 of the first lens element 110 has one inflection point. The image-side surface 112 of the first lens element 110 has one inflection point. The object-side surface 111 of the first lens element 110 has one critical point in an off-axis region thereof. The image-side surface 112 of the first lens element 110 has one critical point in an off-axis region thereof.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has one inflection point. The image-side surface 132 of the third lens element 130 has one inflection point. The object-side surface 131 of the third lens element 130 has one critical point in an off-axis region thereof. The image-side surface 132 of the third lens element 130 has one critical point in an off-axis region thereof.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has one inflection point.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has two inflection points. The image-side surface 152 of the fifth lens element 150 has one inflection point. The object-side surface 151 of the fifth lens element 150 has one critical point in an off-axis region thereof. The image-side surface 152 of the fifth lens element 150 has one critical point in an off-axis region thereof.

The sixth lens element 160 with positive refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 has one inflection point. The image-side surface 162 of the sixth lens element 160 has two inflection points.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has two inflection points. The image-side surface 172 of the seventh lens element 170 has two inflection points. The object-side surface 171 of the seventh lens element 170 has one critical point in an off-axis region thereof. The image-side surface 172 of the seventh lens element 170 has one critical point in an off-axis region thereof.

The filter 180 is made of glass material and located between the seventh lens element 170 and the image surface 190, and will not affect the focal length of the photographing optical lens system. The image sensor 195 is disposed on or near the image surface 190 of the photographing optical lens system.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, 28 and 30.

In the photographing optical lens system of the image capturing unit according to the 1st embodiment, when a focal length of the photographing optical lens system is f, an f-number of the photographing optical lens system is Fno, and half of a maximum field of view of the photographing optical lens system is HFOV, these parameters have the following values: f=3.80 millimeters (mm), Fno=1.87, HFOV=50.0 degrees (deg.).

When an Abbe number of the first lens element 110 is V1, an Abbe number of the second lens element 120 is V2, and an Abbe number of the third lens element 130 is V3, the following condition is satisfied: V1+V2+V3=119.1.

When the Abbe number of the third lens element 130 is V3, an Abbe number of the fourth lens element 140 is V4, and an Abbe number of the fifth lens element 150 is V5, the following condition is satisfied: (V3+V5)/V4=0.66.

When the Abbe number of the third lens element 130 is V3, the Abbe number of the fourth lens element 140 is V4, the Abbe number of the fifth lens element 150 is V5, an Abbe number of the sixth lens element 160 is V6, and an Abbe number of the seventh lens element 170 is V7, the following condition is satisfied: (V4+V6+V7)/(V3+V5)=4.57.

When a minimum value among Abbe numbers of all lens elements of the photographing optical lens system is Vmin, the following condition is satisfied: Vmin=18.4. In this embodiment, the Abbe number of the third lens element 130 and the Abbe number of the fifth lens element 150 are equal and both smaller than Abbe numbers of the other lens elements of the photographing optical lens system, and Vmin is equal to the Abbe number of the third lens element 130 and the Abbe number of the fifth lens element 150.

When a central thickness of the first lens element 110 is CT1, a central thickness of the second lens element 120 is CT2, and an axial distance between the first lens element 110 and the second lens element 120 is T12, the following condition is satisfied: (CT1+CT2)/T12=1.76. In this embodiment, an axial distance between two adjacent lens elements is a distance in a paraxial region between two adjacent lens surfaces of the two adjacent lens elements.

When the central thickness of the first lens element 110 is CT1, and a central thickness of the third lens element 130 is CT3, the following condition is satisfied: CT1/CT3=1.70.

When the central thickness of the third lens element 130 is CT3, and a central thickness of the fourth lens element 140 is CT4, the following condition is satisfied: CT3/CT4=0.34.

When a central thickness of the sixth lens element 160 is CT6, a central thickness of the seventh lens element 170 is CT7, and an axial distance between the sixth lens element 160 and the seventh lens element 170 is T67, the following condition is satisfied: (CT6+CT7)/T67=4.29.

When an axial distance between the object-side surface 111 of the first lens element 110 and the image surface 190 is TL, and an entrance pupil diameter of the photographing optical lens system is EPD, the following condition is satisfied: TL/EPD=3.07.

When the axial distance between the object-side surface 111 of the first lens element 110 and the image surface 190 is TL, and the focal length of the photographing optical lens system is f, the following condition is satisfied: TL/f=1.64.

When the axial distance between the object-side surface 111 of the first lens element 110 and the image surface 190 is TL, and a maximum image height of the photographing optical lens system is ImgH, the following condition is satisfied: TL/ImgH=1.35.

When a curvature radius of the object-side surface 161 of the sixth lens element 160 is R11, and a curvature radius of the image-side surface 162 of the sixth lens element 160 is R12, the following condition is satisfied: (R11+R12)/(R11−R12)=3.26.

When the focal length of the photographing optical lens system is f, and a focal length of the first lens element 110 is f1, the following condition is satisfied: |f/f1|=0.03.

When the focal length of the photographing optical lens system is f, the focal length of the first lens element 110 is f1, a focal length of the second lens element 120 is f2, and a focal length of the third lens element 130 is f3, the following condition is satisfied: |f/f1|+|f/f2|+|f/f3|=0.70.

When the focal length of the photographing optical lens system is f, and a focal length of the seventh lens element 170 is f7, the following condition is satisfied: f/f7=−1.26.

When the focal length of the photographing optical lens system is f, and a composite focal length of the first lens element 110, the second lens element 120 and the third lens element 130 is f123, the following condition is satisfied: |f/f123|=0.30.

When the focal length of the photographing optical lens system is f, and a composite focal length of the fourth lens element 140, the fifth lens element 150 and the sixth lens element 160 is f456, the following condition is satisfied: f/f456=1.40.

When the focal length of the photographing optical lens system is f, the curvature radius of the object-side surface 161 of the sixth lens element 160 is R11, and the curvature radius of the image-side surface 162 of the sixth lens element 160 is R12, the following condition is satisfied: f/R11+f/R12=−5.03.

When the focal length of the photographing optical lens system is f, and a curvature radius of the image-side surface 172 of the seventh lens element 170 is R14, the following condition is satisfied: f/R14=3.65.

When the focal length of the first lens element 110 is f1, and a focal length of the fourth lens element 140 is f4, the following condition is satisfied: |f1/f4|=24.14.

When the focal length of the first lens element 110 is f1, and a curvature radius of the object-side surface 111 of the first lens element 110 is R1, the following condition is satisfied: |f1|/R1=−43.81.

When the focal length of the photographing optical lens system is f, and the focal length of the fourth lens element 140 is f4, and a focal length of the sixth lens element 160 is f6, the following condition is satisfied: f4/f6=1.45.

When a maximum effective radius of the object-side surface 111 of the first lens element 110 is Y11, and a maximum effective radius of the image-side surface 172 of the seventh lens element 170 is Y72, the following condition is satisfied: Y11/Y72=0.65.

When a vertical distance between a critical point on the object-side surface 111 of the first lens element 110 and the optical axis is Yc11, and the maximum effective radius of the object-side surface 111 of the first lens element 110 is Y11, the object-side surface 111 of the first lens element 110 has one critical point in the off-axis region thereof satisfying the following condition: Yc11/Y11=0.60.

When a vertical distance between a critical point on the image-side surface 112 of the first lens element 110 and the optical axis is Yc12, and a maximum effective radius of the image-side surface 112 of the first lens element 110 is Y12, the image-side surface 112 of the first lens element 110 has one critical point in the off-axis region thereof satisfying the following condition: Yc12/Y12=0.58.

When a vertical distance between a critical point on the object-side surface 171 of the seventh lens element 170 and the optical axis is Yc71, and a maximum effective radius of the object-side surface 171 of the seventh lens element 170 is Y71, the object-side surface 171 of the seventh lens element 170 has one critical point in the off-axis region thereof satisfying the following condition: Yc71/Y71=0.22.

When a vertical distance between a critical point on the image-side surface 172 of the seventh lens element 170 and the optical axis is Yc72, and the maximum effective radius of the image-side surface 172 of the seventh lens element 170 is Y72, the image-side surface 172 of the seventh lens element 170 has one critical point in the off-axis region thereof satisfying the following condition: Yc72/Y72=0.53.

The detailed optical data of the 1st embodiment are shown in Table 1 and the aspheric surface data are shown in Table 2 below.

TABLE 1

1st Embodiment
f = 3.80 mm, Fno = 1.87, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.9905 | (ASP) | 0.373 | Plastic | 1.545 | 56.1 | 131.00 |
| 2 | | −2.9965 | (ASP) | 0.793 | | | | |
| 3 | Ape. Stop | Plano | | −0.339 | | | | |
| 4 | Lens 2 | 2.0758 | (ASP) | 0.428 | Plastic | 1.562 | 44.6 | 8.51 |
| 5 | | 3.3973 | (ASP) | 0.299 | | | | |
| 6 | Lens 3 | 9.4726 | (ASP) | 0.220 | Plastic | 1.686 | 18.4 | −16.86 |
| 7 | | 5.1587 | (ASP) | 0.055 | | | | |
| 8 | Stop | Plano | | −0.018 | | | | |
| 9 | Lens 4 | 10.8792 | (ASP) | 0.654 | Plastic | 1.544 | 56.0 | 5.43 |
| 10 | | −3.9651 | (ASP) | 0.224 | | | | |
| 11 | Lens 5 | 222.7171 | (ASP) | 0.230 | Plastic | 1.686 | 18.4 | 141.68 |
| 12 | | −172.4138 | (ASP) | 0.587 | | | | |
| 13 | Lens 6 | −2.1774 | (ASP) | 0.615 | Plastic | 1.544 | 56.0 | 3.73 |
| 14 | | −1.1555 | (ASP) | 0.260 | | | | |
| 15 | Lens 7 | 3.3192 | (ASP) | 0.500 | Plastic | 1.544 | 56.0 | −3.02 |
| 16 | | 1.0412 | (ASP) | 0.800 | | | | |
| 17 | Filter | Plano | | 0.150 | Glass | 1.517 | 64.2 | — |
| 18 | | Plano | | 0.394 | | | | |
| 19 | Image | Plano | | — | | | | |

Note:

Reference wavelength is 587.6 nm (d-line).

An effective radius of the stop 101 (Surface 8) is 1.050 mm.

TABLE 2

Aspheric Coefficients

| Surface # | 1 | 2 | 4 | 5 | 6 |
|---|---|---|---|---|---|
| k= | 0.00000E+00 | 6.43283E−01 | 1.04083E+00 | 0.00000E+00 | 0.00000E+00 |
| A4= | 8.23603715E−02 | 1.21474058E−01 | 4.30904501E−02 | 1.52077985E−02 | −7.78386148E−02 |
| A6= | −1.99245487E−02 | −4.59830887E−02 | −5.22825749E−02 | −2.42395376E−02 | 8.63568235E−03 |
| A8= | 5.53644497E−03 | 2.38165306E−02 | 5.60931236E−02 | 7.27986259E−02 | −1.52856685E−01 |
| A10= | −1.13142157E−03 | −9.14256928E−03 | −3.67989207E−02 | −7.48039815E−02 | 4.11931635E−01 |
| A12= | 1.61863376E−04 | 2.34410026E−03 | 1.19153382E−02 | 3.42717674E−02 | −5.51913311E−01 |
| A14= | −1.29348377E−05 | −3.28870226E−04 | 7.05255269E−04 | — | 3.62920637E−01 |
| A16= | 4.18281437E−07 | 1.85843103E−05 | — | — | −9.37544772E−02 |

| Surface # | 7 | 9 | 10 | 11 | 12 |
|---|---|---|---|---|---|
| k= | 0.00000E+00 | 0.00000E+00 | 0.00000E+00 | 9.00000E+01 | 9.00000E+01 |
| A4= | −3.36864040E−02 | 3.66158658E−02 | −8.65190246E−02 | −1.48203126E−01 | −6.17765424E−02 |
| A6= | −2.88696810E−02 | 1.80115689E−04 | −5.16631443E−03 | −1.07760597E−01 | −1.48711095E−01 |
| A8= | −6.53059452E−02 | −1.25313207E−01 | 8.97724136E−02 | 2.08960129E−01 | 3.40962038E−01 |
| A10= | 1.09504302E−01 | 1.59926421E−01 | −1.73100935E−01 | −2.30259515E−01 | −4.60477262E−01 |
| A12= | −6.08945294E−02 | −7.46335653E−02 | 1.59165378E−01 | 1.10415622E−01 | 4.03335584E−01 |
| A14= | 1.18114186E−02 | 9.65354389E−03 | −7.09397117E−02 | −1.03402821E−02 | −2.32215007E−01 |
| A16= | — | — | 1.17175571E−02 | −3.23564595E−03 | 8.33599779E−02 |
| A18= | — | — | — | — | −1.61013081E−02 |
| A20= | — | — | — | — | 1.23067675E−03 |

| Surface # | 13 | 14 | 15 | 16 | — |
|---|---|---|---|---|---|
| k= | 0.00000E+00 | −9.19789E−01 | 0.00000E+00 | −1.00111E+00 | — |
| A4= | 1.50459425E−02 | 8.27771843E−02 | −2.04653652E−01 | −3.99729808E−01 | — |
| A6= | −8.62525646E−02 | −1.65080592E−01 | −1.16541085E−02 | 2.95046470E−01 | — |
| A8= | 3.38853699E−02 | 1.77610229E−01 | 1.45028225E−01 | −1.80054145E−01 | — |
| A10= | 6.70983578E−02 | −1.29141722E−01 | −1.39114826E−01 | 8.50700991E−02 | — |
| A12= | −7.27817814E−02 | 6.40934576E−02 | 7.46574650E−02 | −3.02971923E−02 | — |
| A14= | 2.89026208E−02 | −1.47309051E−02 | −2.65731557E−02 | 8.02928627E−03 | — |
| A16= | −5.09606834E−03 | −1.61530414E−03 | 6.66013944E−03 | −1.57552916E−03 | — |
| A18= | 3.30566609E−04 | 1.83990285E−03 | −1.20545471E−03 | 2.27986908E−04 | — |
| A20= | — | −4.54147726E−04 | 1.58647419E−04 | −2.41369912E−05 | — |
| A22= | — | 5.06210377E−05 | −1.50639469E−05 | 1.83984454E−06 | — |
| A24= | — | −2.20189714E−06 | 1.00665940E−06 | −9.80118611E−08 | — |
| A26= | — | — | −4.49654762E−08 | 3.45503579E−09 | — |
| A28= | — | — | 1.20632035E−09 | −7.22762242E−11 | — |
| A30= | — | — | −1.47110368E−11 | 6.78275644E−13 | — |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
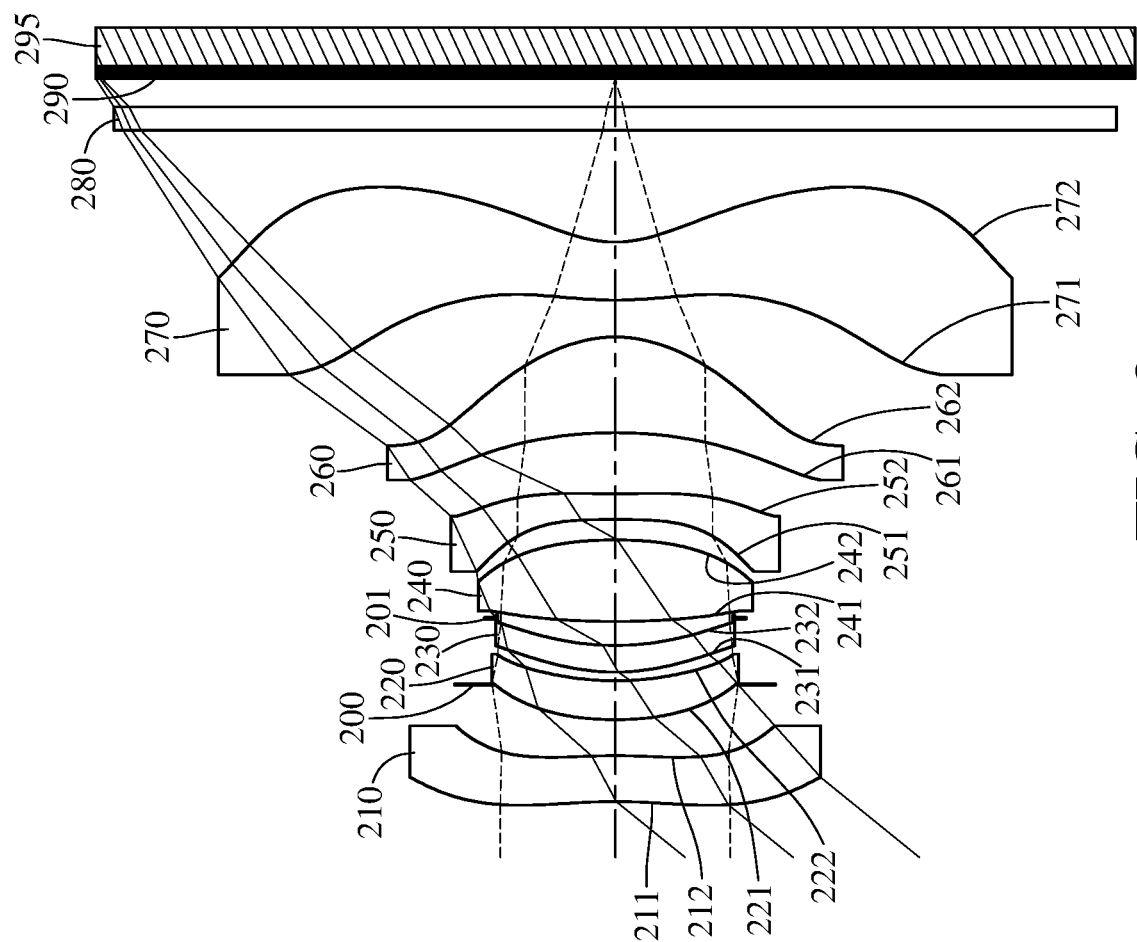
FIG. 3 is a schematic view of an image capturing unit according to the 2nd embodiment of the present disclosure.
Figure 4:
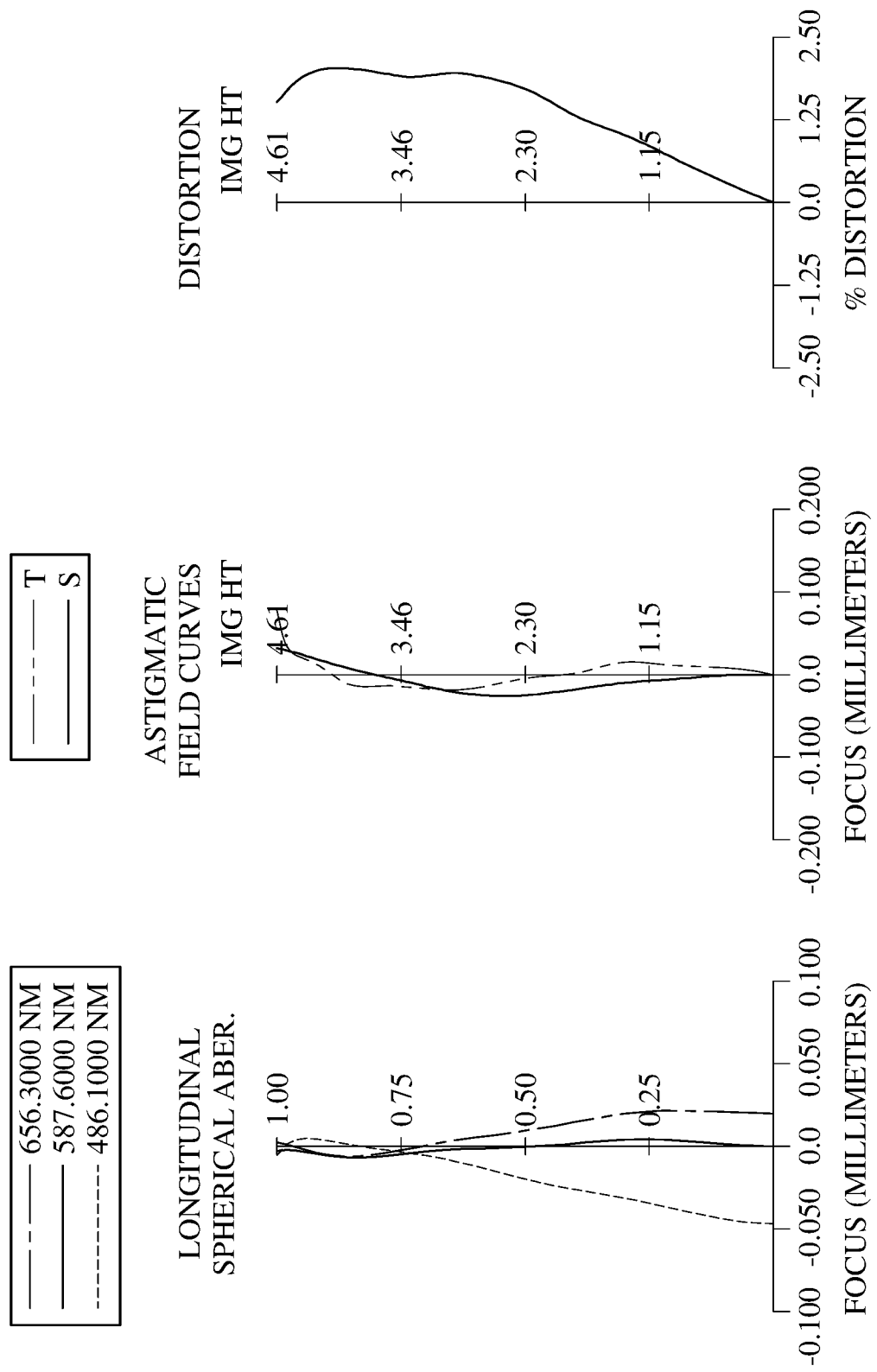
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens system (its reference numeral is omitted) of the present disclosure and an image sensor 295. The photographing optical lens system includes, in order from an object side to an image side along an optical path, a first lens element 210, an aperture stop 200, a second lens element 220, a third lens element 230, a stop 201, a fourth lens element 240, a fifth lens element 250, a sixth lens element 260, a seventh lens element 270, a filter 280 and an image surface 290. The photographing optical lens system includes seven lens elements (210, 220, 230, 240, 250, 260 and 270) with no additional lens element disposed between each of the adjacent seven lens elements.

The first lens element 210 with negative refractive power has an object-side surface 211 being concave in a paraxial region thereof and an image-side surface 212 being convex in a paraxial region thereof. The first lens element 210 is made of plastic material and has the object-side surface 211 and the image-side surface 212 being both aspheric. The object-side surface 211 of the first lens element 210 has one inflection point. The image-side surface 212 of the first lens element 210 has one inflection point. The object-side surface 211 of the first lens element 210 has one critical point in an off-axis region thereof. The image-side surface 212 of the first lens element 210 has one critical point in an off-axis region thereof.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has one inflection point. The image-side surface 232 of the third lens element 230 has one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has one inflection point.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has one inflection point. The image-side surface 252 of the fifth lens element 250 has two inflection points. The image-side surface 252 of the fifth lens element 250 has two critical points in an off-axis region thereof.

The sixth lens element 260 with positive refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has one inflection point. The image-side surface 262 of the sixth lens element 260 has two inflection points.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has two inflection points. The image-side surface 272 of the seventh lens element 270 has two inflection points. The object-side surface 271 of the seventh lens element 270 has one critical point in an off-axis region thereof. The image-side surface 272 of the seventh lens element 270 has one critical point in an off-axis region thereof.

The filter 280 is made of glass material and located between the seventh lens element 270 and the image surface 290, and will not affect the focal length of the photographing optical lens system. The image sensor 295 is disposed on or near the image surface 290 of the photographing optical lens system.

The detailed optical data of the 2nd embodiment are shown in Table 3 and the aspheric surface data are shown in Table 4 below.

TABLE 3

2nd Embodiment
f = 3.70 mm, Fno = 1.80, HFOV = 50.8 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −4.8411 | (ASP) | 0.411 | Plastic | 1.642 | 22.5 | −194.96 |
| 2 |  | −5.2031 | (ASP) | 0.638 |  |  |  |  |
| 3 | Ape. Stop | Plano |  | −0.316 |  |  |  |  |
| 4 | Lens 2 | 2.8586 | (ASP) | 0.348 | Plastic | 1.566 | 37.4 | −86.01 |
| 5 |  | 2.5813 | (ASP) | 0.078 |  |  |  |  |
| 6 | Lens 3 | 1.9678 | (ASP) | 0.239 | Plastic | 1.686 | 18.4 | 11.52 |
| 7 |  | 2.4908 | (ASP) | 0.243 |  |  |  |  |
| 8 | Stop | Plano |  | −0.029 |  |  |  |  |
| 9 | Lens 4 | 7.7942 | (ASP) | 0.730 | Plastic | 1.544 | 56.0 | 4.79 |
| 10 |  | −3.7828 | (ASP) | 0.183 |  |  |  |  |
| 11 | Lens 5 | −13.2484 | (ASP) | 0.230 | Plastic | 1.686 | 18.4 | −8.81 |
| 12 |  | 11.1975 | (ASP) | 0.546 |  |  |  |  |
| 13 | Lens 6 | −4.0008 | (ASP) | 0.858 | Plastic | 1.544 | 56.0 | 2.69 |
| 14 |  | −1.1517 | (ASP) | 0.329 |  |  |  |  |
| 15 | Lens 7 | 3.4357 | (ASP) | 0.520 | Plastic | 1.544 | 56.0 | −2.95 |
| 16 |  | 1.0356 | (ASP) | 1.000 |  |  |  |  |
| 17 | Filter | Plano |  | 0.210 | Glass | 1.517 | 64.2 | — |
| 18 |  | Plano |  | 0.252 |  |  |  |  |
| 19 | Image | Plano |  | — |  |  |  |  |

Note:
Reference wavelength is 587.6 nm (d-line).
An effective radius of the stop 201 (Surface 8) is 1.060 mm.

TABLE 4

Aspheric Coefficients

| Surface # | 1 | 2 | 4 | 5 | 6 |
|---|---|---|---|---|---|
| k= | 0.00000E+00 | 2.58643E+00 | 2.63685E+00 | 0.00000E+00 | 0.00000E+00 |
| A4= | 9.83795561E−02 | 1.78708496E−01 | 9.85181755E−02 | −2.81535271E−02 | −5.47789458E−02 |
| A6= | −3.19720421E−02 | −9.72956805E−02 | −1.16203040E−01 | −2.32496512E−02 | 7.67027619E−03 |
| A8= | 1.24812888E−02 | 9.02187508E−02 | 1.36046887E−01 | 9.21108405E−02 | −7.92146713E−02 |
| A10= | −4.71950071E−03 | −6.80109371E−02 | −1.03403418E−01 | −6.69140358E−02 | 1.77519354E−01 |
| A12= | 1.43692201E−03 | 3.43267978E−02 | 5.22458775E−02 | 2.65345891E−02 | −1.88052844E−01 |

TABLE 4-continued

Aspheric Coefficients

| | | | | | |
|---|---|---|---|---|---|
| A14= | −2.64878619E−04 | −9.21179626E−03 | −1.13730272E−02 | — | 9.65840564E−02 |
| A16= | 1.98486648E−05 | 9.43551493E−04 | — | — | −1.99174216E−02 |

| Surface # | 7 | 9 | 10 | 11 | 12 |
|---|---|---|---|---|---|
| k= | 0.00000E+00 | 0.00000E+00 | 0.00000E+00 | −9.00000E+01 | −8.16319E+01 |
| A4= | 2.61902575E−03 | 1.69014678E−02 | −9.25290593E−02 | −2.71126475E−01 | −1.66779054E−01 |
| A6= | −2.19087256E−02 | −1.77950684E−02 | 4.63755594E−02 | 9.47863763E−02 | 7.20823757E−02 |
| A8= | −1.61005936E−02 | 4.30478519E−02 | −2.63158748E−02 | 3.30975057E−02 | 5.01380771E−02 |
| A10= | 3.02686017E−02 | −6.68006186E−02 | −2.46301029E−02 | −1.48512987E−01 | −1.38375845E−01 |
| A12= | −1.47652972E−02 | 5.34009589E−02 | 3.82104579E−02 | 1.21234994E−01 | 1.32060221E−01 |
| A14= | −2.63259761E−05 | −1.75379242E−02 | −1.81123811E−02 | −3.70369540E−02 | −7.26099345E−02 |
| A16= | — | — | 2.81642822E−03 | 3.86161566E−03 | 2.46545661E−02 |
| A18= | — | — | — | — | −4.74288267E−03 |
| A20= | — | — | — | — | 3.97143293E−04 |

| Surface # | 13 | 14 | 15 | 16 | — |
|---|---|---|---|---|---|
| k= | 0.00000E+00 | −1.10695E+00 | 0.00000E+00 | −1.01315E+00 | — |
| A4= | 8.89885895E−03 | 1.00914218E−01 | −1.05718686E−01 | −3.36025956E−01 | — |
| A6= | −4.47178514E−02 | −1.37381574E−01 | −4.83977719E−02 | 2.27695713E−01 | — |
| A8= | 3.87081448E−02 | 1.18343717E−01 | 1.10694568E−01 | −1.30826124E−01 | — |
| A10= | −1.09230499E−02 | −6.55469539E−02 | −9.16425677E−02 | 5.87371628E−02 | — |
| A12= | −1.71582639E−03 | 1.93510663E−02 | 4.76968377E−02 | −1.99694700E−02 | — |
| A14= | 1.71831244E−03 | 9.97660245E−04 | −1.73811762E−02 | 5.07901564E−03 | — |
| A16= | −3.56179874E−04 | −2.81229131E−03 | 4.61646593E−03 | −9.62656295E−04 | — |
| A18= | 2.39941004E−05 | 9.48996020E−04 | −9.07718313E−04 | 1.35527666E−04 | — |
| A20= | — | −1.53832029E−04 | 1.32211595E−04 | −1.40678415E−05 | — |
| A22= | — | 1.26170158E−05 | −1.40793370E−05 | 1.05990647E−06 | — |
| A24= | — | −4.20109989E−07 | 1.06409985E−06 | −5.62764431E−08 | — |
| A26= | — | — | −5.39742688E−08 | 1.99391509E−09 | — |
| A28= | — | — | 1.64494146E−09 | −4.22697961E−11 | — |
| A30= | — | — | −2.27334353E−11 | 4.05161730E−13 | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.70 | |f/f1| | 0.02 |
| Fno | 1.80 | |f/f1| + |f/f2| + |f/f3| | 0.38 |
| HFOV [deg.] | 50.8 | f/f7 | −1.25 |
| V1 + V2 + V3 | 78.3 | |f/f123| | 0.25 |
| (V3 + V5)/V4 | 0.66 | f/f456 | 1.46 |
| (V4 + V6 + V7)/(V3 + V5) | 4.57 | f/R11 + f/R12 | −4.14 |
| Vmin | 18.4 | f/R14 | 3.57 |
| (CT1 + CT2)/T12 | 2.36 | |f1/f4| | 40.72 |
| CT1/CT3 | 1.72 | |f1|/R1 | −40.27 |
| CT3/CT4 | 0.33 | f4/f6 | 1.78 |
| (CT6 + CT7)/T67 | 4.19 | Y11/Y72 | 0.52 |
| TL/EPD | 3.15 | Yc11/Y11 | 0.46 |
| TL/f | 1.75 | Yc12/Y12 | 0.41 |
| TL/ImgH | 1.40 | Yc71/Y71 | 0.30 |
| (R11 + R12)/(R11 − R12) | 1.81 | Yc72/Y72 | 0.59 |

3rd Embodiment

Figure 5:
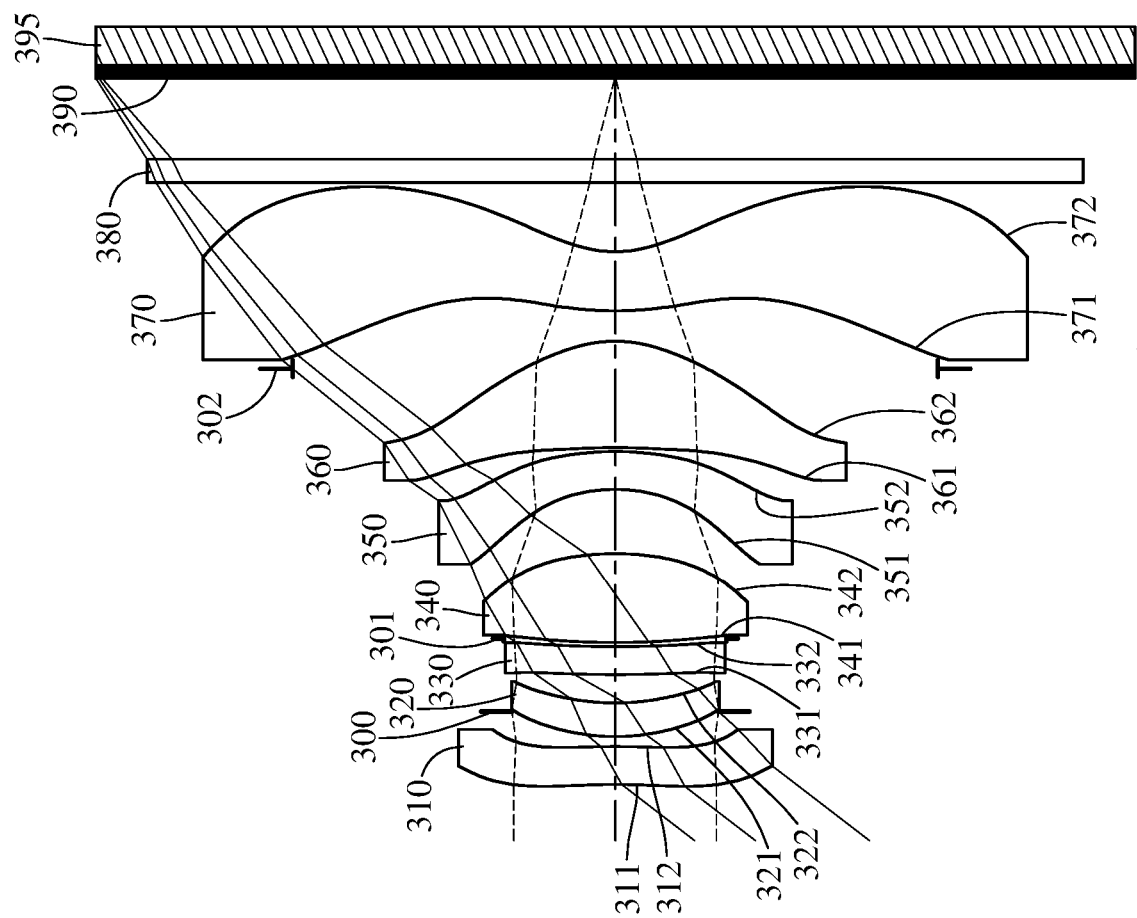
FIG. 5 is a schematic view of an image capturing unit according to the 3rd embodiment of the present disclosure.
Figure 6:
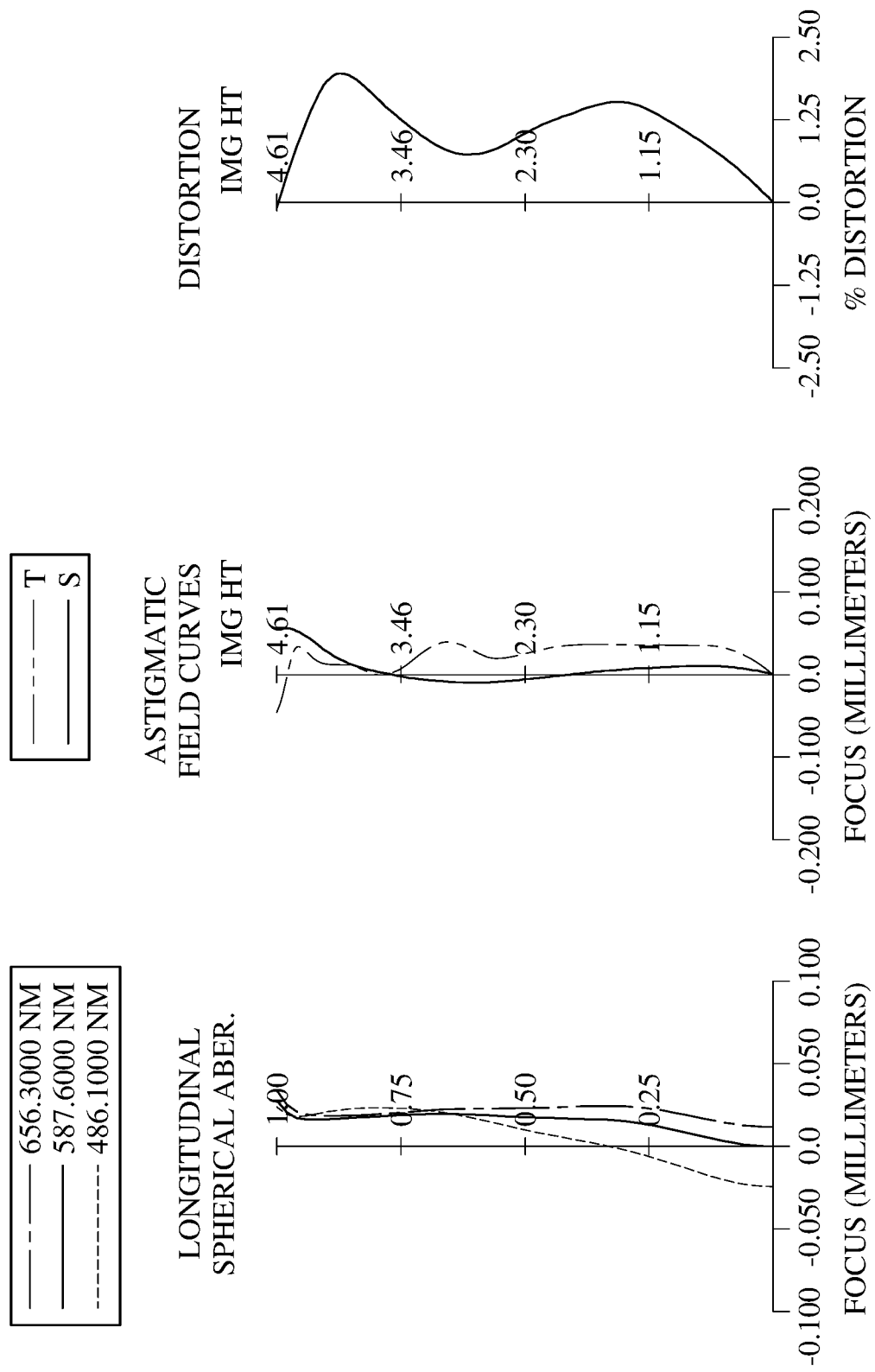
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens system (its reference numeral is omitted) of the present disclosure and an image sensor 395. The photographing optical lens system includes, in order from an object side to an image side along an optical path, a first lens element 310, an aperture stop 300, a second lens element 320, a third lens element 330, a stop 301, a fourth lens element 340, a fifth lens element 350, a sixth lens element 360, a stop 302, a seventh lens element 370, a filter 380 and an image surface 390. The photographing optical lens system includes seven lens elements (310, 320, 330, 340, 350, 360 and 370) with no additional lens element disposed between each of the adjacent seven lens elements.

The first lens element 310 with negative refractive power has an object-side surface 311 being concave in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has one inflection point. The image-side surface 312 of the first lens element 310 has one inflection point. The object-side surface 311 of the first lens element 310 has one critical point in an off-axis region thereof. The image-side surface 312 of the first lens element 310 has one critical point in an off-axis region thereof.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has one inflection point. The image-side surface 332 of the third lens element 330 has one inflection point. The object-side surface 331 of the third lens element 330 has one critical point in an off-axis region thereof. The image-side surface 332 of the third lens element 330 has one critical point in an off-axis region thereof.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has one inflection point. The image-side surface 342 of the fourth lens element 340 has one inflection point.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has one inflection point. The image-side surface 352 of the fifth lens element 350 has one inflection point. The image-side surface 352 of the fifth lens element 350 has one critical point in an off-axis region thereof.

The sixth lens element 360 with positive refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has one inflection point. The image-side surface 362 of the sixth lens element 360 has one inflection point.

The seventh lens element 370 with negative refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has two inflection points. The image-side surface 372 of the seventh lens element 370 has two inflection points. The object-side surface 371 of the seventh lens element 370 has one critical point in an off-axis region thereof. The image-side surface 372 of the seventh lens element 370 has one critical point in an off-axis region thereof.

The filter 380 is made of glass material and located between the seventh lens element 370 and the image surface 390, and will not affect the focal length of the photographing optical lens system. The image sensor 395 is disposed on or near the image surface 390 of the photographing optical lens system.

The detailed optical data of the 3rd embodiment are shown in Table 5 and the aspheric surface data are shown in Table 6 below.

TABLE 5

3rd Embodiment
f = 3.53 mm, Fno = 1.95, HFOV = 52.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.5635 | (ASP) | 0.339 | Plastic | 1.639 | 23.5 | −110.86 |
| 2 | | −6.1814 | (ASP) | 0.314 | | | | |
| 3 | Ape. Stop | Plano | | −0.225 | | | | |
| 4 | Lens 2 | 1.9042 | (ASP) | 0.300 | Plastic | 1.639 | 23.5 | 33.08 |
| 5 | | 1.9643 | (ASP) | 0.254 | | | | |
| 6 | Lens 3 | 10.6055 | (ASP) | 0.250 | Plastic | 1.686 | 18.4 | 539.01 |
| 7 | | 10.8139 | (ASP) | 0.071 | | | | |
| 8 | Stop | Plano | | −0.034 | | | | |
| 9 | Lens 4 | 7.2038 | (ASP) | 0.799 | Plastic | 1.544 | 56.0 | 3.58 |
| 10 | | −2.5680 | (ASP) | 0.575 | | | | |
| 11 | Lens 5 | −1.4816 | (ASP) | 0.339 | Plastic | 1.669 | 19.5 | −6.51 |
| 12 | | −2.4512 | (ASP) | 0.035 | | | | |
| 13 | Lens 6 | −4.5032 | (ASP) | 0.950 | Plastic | 1.544 | 56.0 | 2.50 |
| 14 | | −1.1239 | (ASP) | −0.245 | | | | |
| 15 | Stop | Plano | | 0.517 | | | | |
| 16 | Lens 7 | 3.3261 | (ASP) | 0.528 | Plastic | 1.545 | 56.1 | −3.04 |
| 17 | | 1.0445 | (ASP) | 0.617 | | | | |
| 18 | Filter | Plano | | 0.210 | Glass | 1.517 | 64.2 | — |
| 19 | | Plano | | 0.725 | | | | |
| 20 | Image | Plano | | — | | | | |

Note:
Reference wavelength is 587.6 nm (d-line).
An effective radius of the stop 301 (Surface 8) is 0.993 mm.
An effective radius of the stop 302 (Surface 15) is 2.880 mm.

TABLE 6

Aspheric Coefficients

| Surface # | 1 | 2 | 4 | 5 | 6 |
|---|---|---|---|---|---|
| k= | 0.00000E+00 | −9.90000E+01 | 3.65810E−01 | 0.00000E+00 | 0.00000E+00 |
| A4= | 1.44463900E−01 | 1.64545476E−01 | −5.00399708E−02 | −1.47852781E−01 | −2.66085322E−02 |
| A6= | −7.87973638E−02 | −9.30283447E−02 | 4.24091683E−02 | 2.05801658E−01 | 4.42509263E−02 |
| A8= | 7.16142214E−02 | 1.80204909E−01 | 2.10492152E−02 | −1.84721449E−01 | −1.77303509E−01 |
| A10= | −5.16080445E−02 | −2.15494561E−01 | −5.37040302E−02 | 1.15855406E−01 | 4.85639338E−01 |
| A12= | 2.50388300E−02 | 1.59306689E−01 | 7.94717952E−02 | 2.38445570E−02 | −9.41577470E−01 |
| A14= | −6.81124134E−03 | −4.84675055E−02 | −3.16645374E−02 | −1.99756371E−02 | 9.00694229E−01 |
| A16= | 7.19417462E−04 | — | — | — | −3.42047181E−01 |

| Surface # | 7 | 9 | 10 | 11 | 12 |
|---|---|---|---|---|---|
| k= | 0.00000E+00 | 0.00000E+00 | 0.00000E+00 | −7.23709E−03 | −4.87597E−02 |
| A4= | −5.55892535E−03 | −1.24313144E−02 | −5.65087604E−02 | −6.02518045E−02 | 1.95505859E−01 |
| A6= | 3.11770850E−02 | 3.51738255E−02 | −6.40373750E−02 | −6.41414872E−02 | −5.54210318E−01 |
| A8= | 4.77898568E−02 | −3.20358872E−04 | 1.38114715E−01 | 3.81722213E−02 | 5.71114174E−01 |
| A10= | −2.26408550E−01 | −7.95695924E−02 | −2.29018507E−01 | 1.63119454E−01 | −2.18076389E−01 |
| A12= | 2.09444017E−01 | 6.66797851E−02 | 2.32683226E−01 | −1.88858024E−01 | −7.20085211E−02 |
| A14= | −7.02966085E−02 | −1.53126795E−02 | −1.29119938E−01 | 8.59436259E−02 | 1.22268465E−01 |
| A16= | — | — | 3.02186823E−02 | −1.45751532E−02 | −6.29523851E−02 |
| A18= | — | — | — | — | 1.74567878E−02 |
| A20= | — | — | — | — | −2.61911403E−03 |
| A22= | — | — | — | — | 1.65883431E−04 |

| Surface # | 13 | 14 | 16 | 17 | |
|---|---|---|---|---|---|
| k= | 0.00000E+00 | −1.00000E+00 | 0.00000E+00 | −1.00000E+00 | — |
| A4= | 2.96842730E−01 | 2.16446711E−01 | 5.25314934E−02 | −2.23902038E−01 | — |
| A6= | −6.31497652E−01 | −2.55727772E−01 | −2.14160819E−01 | 8.21748246E−02 | — |
| A8= | 6.78634220E−01 | 2.75400212E−01 | 1.84723330E−01 | −2.38253519E−02 | — |
| A10= | −4.45495278E−01 | −2.53736905E−01 | −9.52653163E−02 | 5.44140255E−03 | — |
| A12= | 1.89669152E−01 | 1.77285474E−01 | 3.34169368E−02 | −1.00629999E−03 | — |
| A14= | −5.32650697E−02 | −8.65025093E−02 | −8.29380661E−03 | 1.50617473E−04 | — |
| A16= | 9.62450067E−03 | 2.86713383E−02 | 1.47089195E−03 | −1.76146133E−05 | — |
| A18= | −1.01485804E−03 | −6.30212518E−03 | −1.84954238E−04 | 1.52780144E−06 | — |
| A20= | 4.70963562E−05 | 8.76368940E−04 | 1.60743615E−05 | −9.27775238E−08 | — |
| A22= | — | −6.96158892E−05 | −9.16574099E−07 | 3.67354751E−09 | — |
| A24= | — | 2.40287645E−06 | 3.08046929E−08 | −8.43284996E−11 | — |
| A26= | — | — | −4.61928445E−10 | 8.44949956E−13 | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.53 | |f/f1| | 0.03 |
| Fno | 1.95 | |f/f1| + |f/f2| + |f/f3| | 0.15 |
| HFOV [deg.] | 52.5 | f/f7 | −1.16 |
| V1 + V2 + V3 | 65.4 | |f/f123| | 0.08 |
| (V3 + V5)/V4 | 0.68 | f/f456 | 1.49 |
| (V4 + V6 + V7)/(V3 + V5) | 4.44 | f/R11 + f/R12 | −3.92 |
| Vmin | 18.4 | f/R14 | 3.38 |
| (CT1 + CT2)/T12 | 7.18 | |f1/f4| | 30.94 |
| CT1/CT3 | 1.36 | |f1|/R1 | −19.93 |
| CT3/CT4 | 0.31 | f4/f6 | 1.43 |
| (CT6 + CT7)/T67 | 5.43 | Y11/Y72 | 0.38 |
| TL/EPD | 3.49 | Yc11/Y11 | 0.45 |
| TL/f | 1.79 | Yc12/Y12 | 0.43 |
| TL/ImgH | 1.37 | Yc71/Y71 | 0.38 |
| (R11 + R12)/(R11 − R12) | 1.67 | Yc72/Y72 | 0.60 |

4th Embodiment

Figure 7:
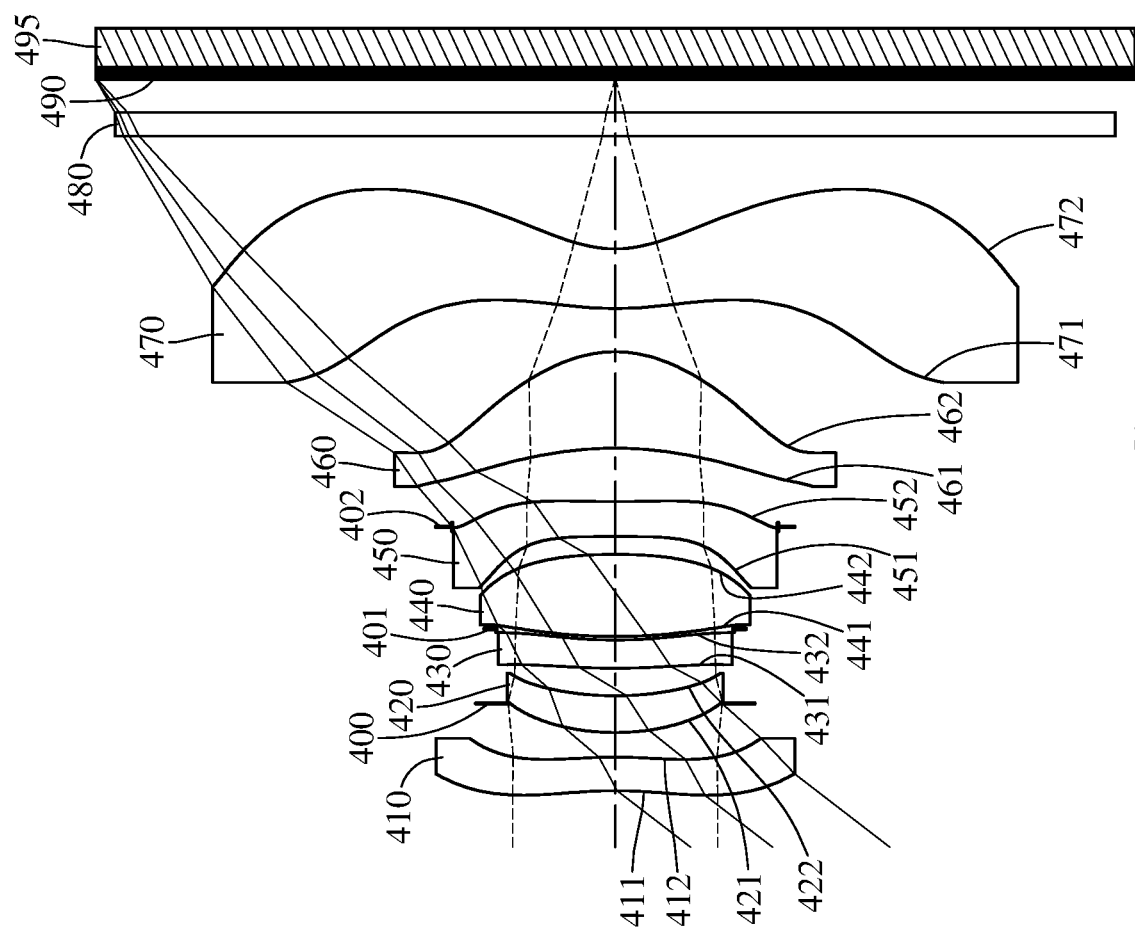
FIG. 7 is a schematic view of an image capturing unit according to the 4th embodiment of the present disclosure.
Figure 8:
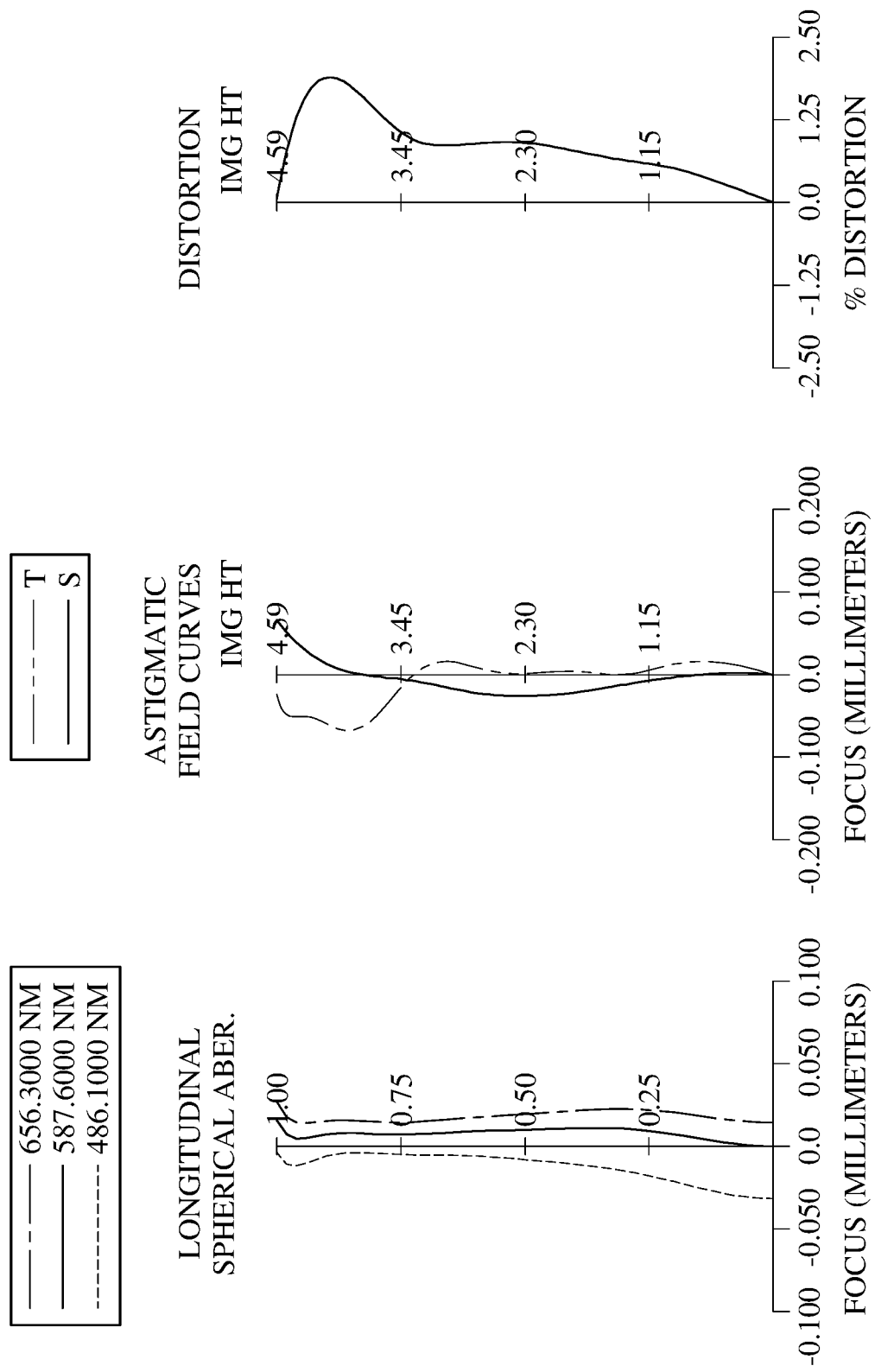
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens system (its reference numeral is omitted) of the present disclosure and an image sensor 495. The photographing optical lens system includes, in order from an object side to an image side along an optical path, a first lens element 410, an aperture stop 400, a second lens element 420, a third lens element 430, a stop 401, a fourth lens element 440, a fifth lens element 450, a stop 402, a sixth lens element 460, a seventh lens element 470, a filter 480 and an image surface 490. The photographing optical lens system includes seven lens elements (410, 420, 430, 440, 450, 460 and 470) with no additional lens element disposed between each of the adjacent seven lens elements.

The first lens element 410 with negative refractive power has an object-side surface 411 being concave in a paraxial region thereof and an image-side surface 412 being convex in a paraxial region thereof. The first lens element 410 is made of plastic material and has the object-side surface 411 and the image-side surface 412 being both aspheric. The object-side surface 411 of the first lens element 410 has one inflection point. The image-side surface 412 of the first lens element 410 has one inflection point. The object-side surface 411 of the first lens element 410 has one critical point in an off-axis region thereof. The image-side surface 412 of the first lens element 410 has one critical point in an off-axis region thereof.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has one inflection point. The image-side surface 432 of the third lens element 430 has one inflection point. The object-side surface 431 of the third lens element 430 has one critical point in an off-axis region thereof. The image-side surface 432 of the third lens element 430 has one critical point in an off-axis region thereof.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has one inflection point.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has one inflection point. The image-side surface 452 of the fifth lens element 450 has two inflection points. The image-side surface 452 of the fifth lens element 450 has one critical point in an off-axis region thereof.

The sixth lens element 460 with positive refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has two inflection points. The image-side surface 462 of the sixth lens element 460 has two inflection points. The image-side surface 462 of the sixth lens element 460 has two critical points in an off-axis region thereof.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has two inflection points. The image-side surface 472 of the seventh lens element 470 has two inflection points. The object-side surface 471 of the seventh lens element 470 has one critical point in an off-axis region thereof. The image-side surface 472 of the seventh lens element 470 has one critical point in an off-axis region thereof.

The filter 480 is made of glass material and located between the seventh lens element 470 and the image surface 490, and will not affect the focal length of the photographing optical lens system. The image sensor 495 is disposed on or near the image surface 490 of the photographing optical lens system.

The detailed optical data of the 4th embodiment are shown in Table 7 and the aspheric surface data are shown in Table 8 below.

TABLE 7

4th Embodiment
f = 3.54 mm, Fno = 1.95, HFOV = 52.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.7195 | (ASP) | 0.298 | Plastic | 1.639 | 23.5 | −118.17 |
| 2 | | −4.0345 | (ASP) | 0.474 | | | | |
| 3 | Ape. Stop | Plano | | −0.256 | | | | |
| 4 | Lens 2 | 2.2340 | (ASP) | 0.325 | Plastic | 1.639 | 23.5 | 15.30 |
| 5 | | 2.7322 | (ASP) | 0.244 | | | | |
| 6 | Lens 3 | 5.6394 | (ASP) | 0.250 | Plastic | 1.669 | 19.5 | −21.32 |
| 7 | | 3.9698 | (ASP) | 0.099 | | | | |
| 8 | Stop | Plano | | −0.067 | | | | |
| 9 | Lens 4 | 5.5041 | (ASP) | 0.727 | Plastic | 1.544 | 56.0 | 4.84 |
| 10 | | −4.8074 | (ASP) | 0.158 | | | | |
| 11 | Lens 5 | −197.3303 | (ASP) | 0.310 | Plastic | 1.669 | 19.5 | −15.78 |
| 12 | | 11.1577 | (ASP) | −0.225 | | | | |
| 13 | Stop | Plano | | 0.698 | | | | |
| 14 | Lens 6 | −3.2291 | (ASP) | 0.855 | Plastic | 1.544 | 56.0 | 2.57 |
| 15 | | −1.0679 | (ASP) | 0.383 | | | | |
| 16 | Lens 7 | 3.3875 | (ASP) | 0.528 | Plastic | 1.545 | 56.1 | −3.03 |
| 17 | | 1.0500 | (ASP) | 1.000 | | | | |
| 18 | Filter | Plano | | 0.210 | Glass | 1.517 | 64.2 | — |
| 19 | | Plano | | 0.290 | | | | |
| 20 | Image | Plano | | — | | | | |

Note:
Reference wavelength is 587.6 nm (d-line).
An effective radius of the stop 401 (Surface 8) is 1.050 mm.
An effective radius of the stop 402 (Surface 13) is 1.441 mm.

TABLE 8

| Aspheric Coefficients | | | | | |
|---|---|---|---|---|---|
| Surface # | 1 | 2 | 4 | 5 | 6 |
| k= | 0.00000E+00 | -5.96768E+00 | 2.53996E+00 | 0.00000E+00 | 0.00000E+00 |
| A4= | 1.49938914E-01 | 2.18610610E-01 | 5.53825880E-02 | -1.45611193E-02 | -7.16389533E-02 |
| A6= | -7.58311979E-02 | -1.87834109E-01 | -1.41930559E-01 | 2.55975444E-02 | 3.37828593E-02 |
| A8= | 4.99635795E-02 | 2.31788986E-01 | 2.60590281E-01 | 7.05388372E-02 | -2.07578396E-01 |
| A10= | -2.75154127E-02 | -2.17987996E-01 | -2.90451471E-01 | -6.53768692E-02 | 7.66523037E-01 |
| A12= | 1.06916562E-02 | 1.36680668E-01 | 2.00377343E-01 | 5.65594356E-02 | -1.34673820E+00 |
| A14= | -2.44009967E-03 | -4.81301872E-02 | -5.77417550E-02 | — | 1.16289297E+00 |
| A16= | 2.37274141E-04 | 7.04860336E-03 | — | — | -3.98297545E-01 |
| Surface # | 7 | 9 | 10 | 11 | 12 |
| k= | 0.00000E+00 | 0.00000E+00 | 0.00000E+00 | 9.90000E+01 | -9.60470E+01 |
| A4= | -1.19819392E-02 | 6.96820848E-02 | -9.32286811E-02 | -2.11760988E-01 | -8.55708426E-02 |
| A6= | -2.03711722E-01 | -2.10195574E-01 | 3.63957579E-02 | 7.64487744E-03 | -5.68898321E-02 |
| A8= | 3.77339481E-01 | 3.04614738E-01 | -6.39778359E-02 | -6.95636728E-02 | 1.65144512E-01 |
| A10= | -4.28502320E-01 | -2.88928028E-01 | 2.39290287E-02 | 6.47477005E-02 | -2.87513078E-01 |
| A12= | 2.90088301E-01 | 1.75976268E-01 | 2.42230615E-02 | -7.00183120E-02 | 3.20402584E-01 |
| A14= | -8.52155897E-02 | -5.03686409E-02 | -2.88616069E-02 | 5.92628635E-02 | -2.28022720E-01 |
| A16= | — | — | 7.87920362E-03 | -1.45293308E-02 | 1.00266251E-01 |
| A18= | — | — | — | — | -2.44836989E-02 |
| A20= | — | — | — | — | 2.54189388E-03 |
| Surface # | 14 | 15 | 16 | 17 | — |
| k= | 0.00000E+00 | -1.00000E+00 | 0.00000E+00 | -1.00000E+00 | — |
| A4= | 3.19856003E-02 | 1.31891870E-01 | -3.47435525E-02 | -2.83184259E-01 | — |
| A6= | -4.91352443E-02 | -1.88461192E-01 | -1.41215626E-01 | 1.56613871E-01 | — |
| A8= | 6.10346397E-02 | 2.09703242E-01 | 1.97379282E-01 | -7.23460991E-02 | — |
| A10= | -3.84952465E-02 | -1.83372744E-01 | -1.52864228E-01 | 2.60654740E-02 | — |
| A12= | 1.14574687E-02 | 1.30010009E-01 | 7.86220867E-02 | -7.27785322E-03 | — |
| A14= | -6.26874728E-04 | -7.19426082E-02 | -2.84101949E-02 | 1.57547916E-03 | — |
| A16= | -3.63428858E-04 | 3.01495125E-02 | 7.40364776E-03 | -2.63806106E-04 | — |
| A18= | 5.19186902E-05 | -8.88956452E-03 | -1.40889890E-03 | 3.38944429E-05 | — |
| A20= | — | 1.67681915E-03 | 1.96195664E-04 | -3.29414491E-06 | — |
| A22= | — | -1.78407960E-04 | -1.98021292E-05 | 2.36871977E-07 | — |
| A24= | — | 8.08791240E-06 | 1.41178691E-06 | -1.21710405E-08 | — |
| A26= | — | — | -6.74698157E-08 | 4.21399061E-10 | — |
| A28= | — | — | 1.94014744E-09 | -8.78664519E-12 | — |
| A30= | — | — | -2.53787569E-11 | 8.31630917E-14 | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.54 | $|f/f1|$ | 0.03 |
| Fno | 1.95 | $|f/f1| + |f/f2| + |f/f3|$ | 0.43 |
| HFOV [deg.] | 52.4 | f/f7 | -1.17 |
| V1 + V2 + V3 | 66.4 | $|f/f123|$ | 0.05 |
| (V3 + V5)/V4 | 0.69 | f/f456 | 1.50 |
| (V4 + V6 + V7)/(V3 + V5) | 4.32 | f/R11 + f/R12 | -4.41 |
| Vmin | 19.5 | f/R14 | 3.37 |
| (CT1 + CT2)/T12 | 2.86 | $|f1/f4|$ | 24.43 |
| CT1/CT3 | 1.19 | $|f1|/R1$ | -31.77 |
| CT3/CT4 | 0.34 | f4/f6 | 1.88 |
| (CT6 + CT7)/T67 | 3.61 | Y11/Y72 | 0.45 |
| TL/EPD | 3.47 | Yc11/Y11 | 0.51 |
| TL/f | 1.78 | Yc12/Y12 | 0.48 |
| TL/ImgH | 1.37 | Yc71/Y71 | 0.36 |
| (R11 + R12)/(R11 - R12) | 1.99 | Yc72/Y72 | 0.59 |

5th Embodiment

Figure 9:
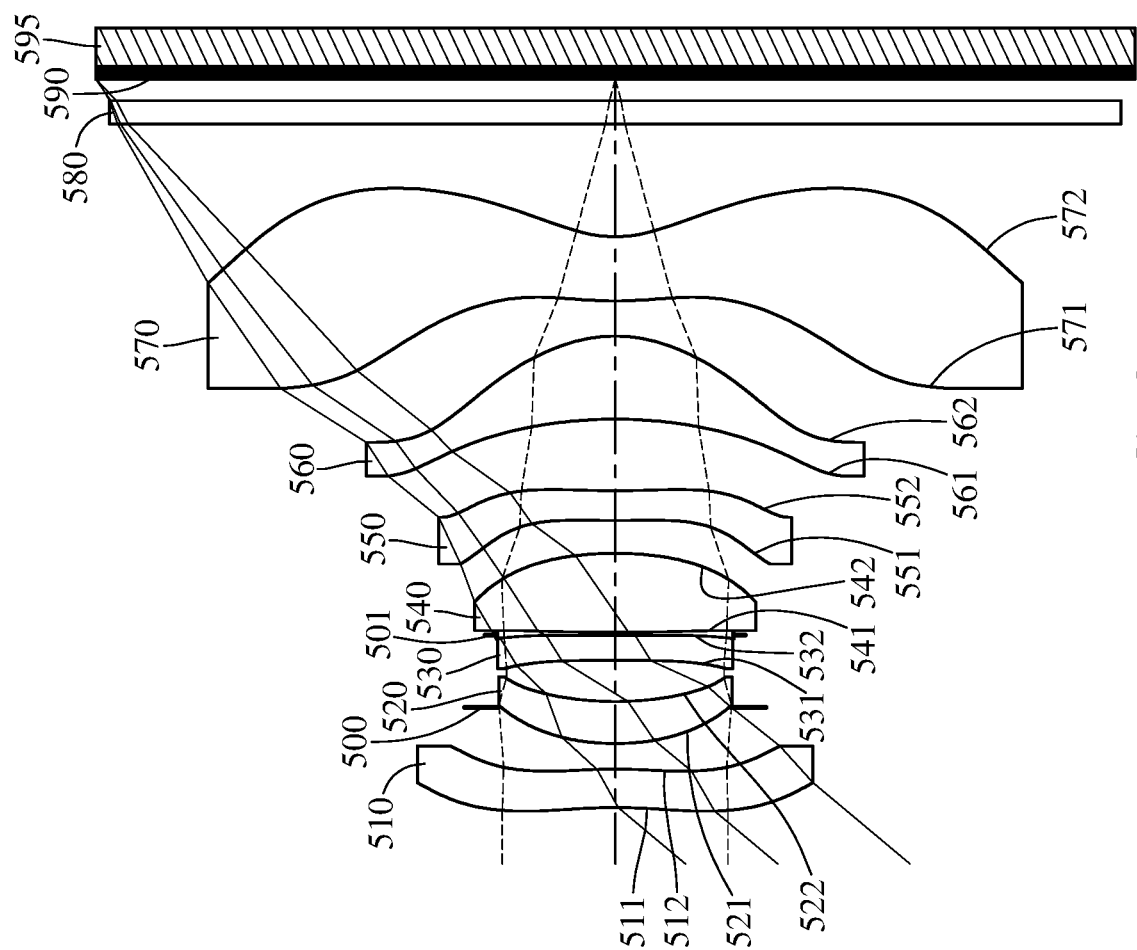
FIG. 9 is a schematic view of an image capturing unit according to the 5th embodiment of the present disclosure.
Figure 10:
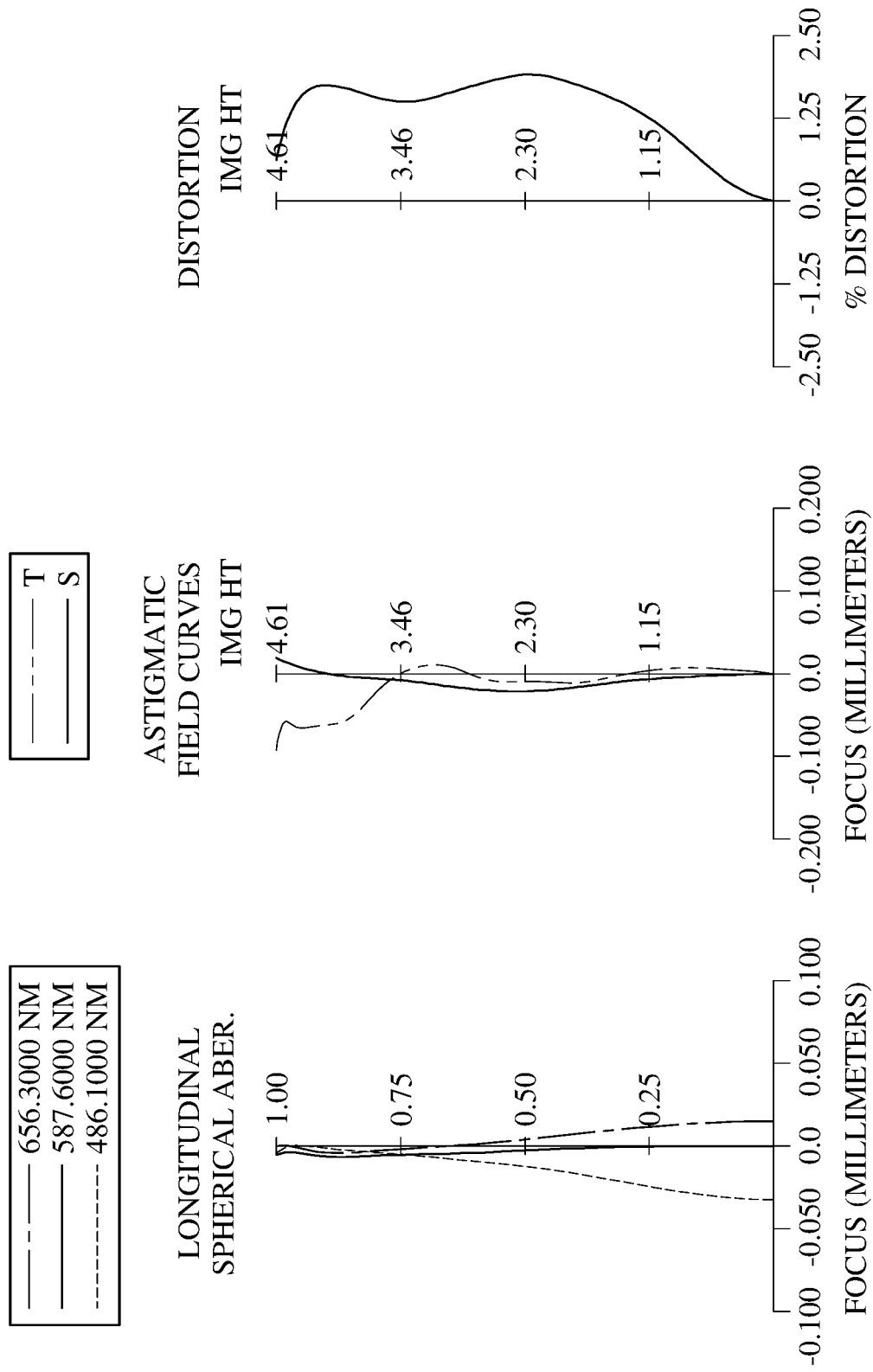
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens system (its reference numeral is omitted) of the present disclosure and an image sensor 595. The photographing optical lens system includes, in order from an object side to an image side along an optical path, a first lens element 510, an aperture stop 500, a second lens element 520, a third lens element 530, a stop 501, a fourth lens element 540, a fifth lens element 550, a sixth lens element 560, a seventh lens element 570, a filter 580 and an image surface 590. The photographing optical lens system includes seven lens elements (510, 520, 530, 540, 550, 560 and 570) with no additional lens element disposed between each of the adjacent seven lens elements.

The first lens element 510 with positive refractive power has an object-side surface 511 being concave in a paraxial region thereof and an image-side surface 512 being convex in a paraxial region thereof. The first lens element 510 is made of plastic material and has the object-side surface 511 and the image-side surface 512 being both aspheric. The object-side surface 511 of the first lens element 510 has two inflection points. The image-side surface 512 of the first lens element 510 has two inflection points. The object-side surface 511 of the first lens element 510 has one critical point in an off-axis region thereof. The image-side surface 512 of the first lens element 510 has one critical point in an off-axis region thereof.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. The image-side surface 532 of the third lens element 530 has two inflection points. The image-side surface 532 of the third lens element 530 has two critical points in an off-axis region thereof.

The fourth lens element 540 with positive refractive power has an object-side surface 541 being concave in a paraxial region thereof and an image-side surface 542 being convex in a paraxial region thereof. The fourth lens element 540 is made of glass material and has the object-side surface 541 and the image-side surface 542 being both aspheric. The object-side surface 541 of the fourth lens element 540 has two inflection points. The object-side surface 541 of the fourth lens element 540 has two critical points in an off-axis region thereof.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has two inflection points. The image-side surface 552 of the fifth lens element 550 has two inflection points. The object-side surface 551 of the fifth lens element 550 has one critical point in an off-axis region thereof. The image-side surface 552 of the fifth lens element 550 has two critical points in an off-axis region thereof.

The sixth lens element 560 with positive refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 has one inflection point. The image-side surface 562 of the sixth lens element 560 has one inflection point. The image-side surface 562 of the sixth lens element 560 has one critical point in an off-axis region thereof.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has two inflection points. The image-side surface 572 of the seventh lens element 570 has one inflection point. The object-side surface 571 of the seventh lens element 570 has one critical point in an off-axis region thereof. The image-side surface 572 of the seventh lens element 570 has one critical point in an off-axis region thereof.

The filter 580 is made of glass material and located between the seventh lens element 570 and the image surface 590, and will not affect the focal length of the photographing optical lens system. The image sensor 595 is disposed on or near the image surface 590 of the photographing optical lens system.

The detailed optical data of the 5th embodiment are shown in Table 9 and the aspheric surface data are shown in Table 10 below.

TABLE 9

5th Embodiment
f = 3.84 mm, Fno = 1.92, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.2166 | (ASP) | 0.341 | Plastic | 1.566 | 37.4 | 206.56 |
| 2 | | −4.1888 | (ASP) | 0.547 | | | | |
| 3 | Ape. Stop | Plano | | −0.320 | | | | |
| 4 | Lens 2 | 2.2151 | (ASP) | 0.373 | Plastic | 1.566 | 37.4 | 12.92 |
| 5 | | 2.9843 | (ASP) | 0.366 | | | | |
| 6 | Lens 3 | −27.6664 | (ASP) | 0.220 | Plastic | 1.679 | 18.4 | −47.07 |
| 7 | | −206.1856 | (ASP) | 0.003 | | | | |
| 8 | Stop | Plano | | 0.027 | | | | |
| 9 | Lens 4 | −180.8318 | (ASP) | 0.700 | Glass | 1.566 | 61.1 | 5.68 |
| 10 | | −3.1629 | (ASP) | 0.292 | | | | |
| 11 | Lens 5 | 15.8585 | (ASP) | 0.264 | Plastic | 1.679 | 18.4 | −24.30 |
| 12 | | 8.0328 | (ASP) | 0.636 | | | | |
| 13 | Lens 6 | −3.8947 | (ASP) | 0.737 | Plastic | 1.544 | 56.0 | 3.20 |
| 14 | | −1.2821 | (ASP) | 0.312 | | | | |
| 15 | Lens 7 | 3.4755 | (ASP) | 0.570 | Plastic | 1.544 | 56.0 | −2.98 |
| 16 | | 1.0414 | (ASP) | 1.000 | | | | |
| 17 | Filter | Plano | | 0.210 | Glass | 1.517 | 64.2 | — |
| 18 | | Plano | | 0.190 | | | | |
| 19 | Image | Plano | | — | | | | |

Note:
Reference wavelength is 587.6 nm (d-line).
An effective radius of the stop 501 (Surface 8) is 1.050 mm.

TABLE 10

Aspheric Coefficients

| Surface # | 1 | 2 | 4 | 5 | 6 |
|---|---|---|---|---|---|
| k= | 0.00000E+00 | −9.57881E−01 | 2.15250E+00 | 0.00000E+00 | 0.00000E+00 |
| A4= | 1.38010507E−01 | 2.40994001E−01 | 1.04780763E−01 | 2.42297742E−02 | −3.19494798E−02 |
| A6= | −6.80092561E−02 | −2.15320777E−01 | −2.17127858E−01 | −3.03344450E−02 | −8.79144122E−02 |
| A8= | 3.45080416E−02 | 2.09461148E−01 | 3.17786815E−01 | 1.13348552E−01 | 9.23493023E−02 |
| A10= | −1.31326653E−02 | −1.54528656E−01 | −3.17995563E−01 | −1.11183741E−01 | −1.27421438E−02 |
| A12= | 3.49612213E−03 | 7.62324711E−02 | 1.92870137E−01 | 6.54348258E−02 | −4.70056439E−02 |
| A14= | −5.49285429E−04 | −2.14160058E−02 | −5.00643393E−02 | — | 3.02972102E−02 |
| A16= | 3.41492887E−05 | 2.48167153E−03 | — | — | −3.43559106E−03 |

| Surface # | 7 | 9 | 10 | 11 | 12 |
|---|---|---|---|---|---|
| k= | 0.00000E+00 | 0.00000E+00 | 0.00000E+00 | 8.61752E+01 | −1.85121E+01 |
| A4= | 1.02884362E−01 | 1.50564776E−01 | −6.17901012E−02 | −1.47272824E−01 | −7.87880802E−02 |
| A6= | −3.70870885E−01 | −3.63115509E−01 | −1.90609751E−02 | −6.45801451E−02 | −7.75507433E−02 |
| A8= | 4.28991067E−01 | 4.02208652E−01 | 7.50506166E−02 | 1.27338606E−01 | 1.65416544E−01 |
| A10= | −2.11049924E−01 | −2.09509402E−01 | −1.42383746E−01 | −1.50587729E−01 | −2.02837948E−01 |
| A12= | 2.24156434E−02 | 3.31175703E−02 | 1.31047910E−01 | 9.06017600E−02 | 1.57812583E−01 |
| A14= | 8.23993374E−03 | 4.30641164E−03 | −5.98919469E−02 | −1.99322716E−02 | −7.80141990E−02 |
| A16= | — | — | 1.06669848E−02 | 5.68914914E−04 | 2.38382869E−02 |
| A18= | — | — | — | — | −3.92959325E−03 |
| A20= | — | — | — | — | 2.50160707E−04 |

| Surface # | 13 | 14 | 15 | 16 | — |
|---|---|---|---|---|---|
| k= | 0.00000E+00 | −9.01682E−01 | 0.00000E+00 | −1.00941E+00 | — |
| A4= | 3.48854961E−02 | 8.67985923E−02 | −1.57144546E−01 | −3.44486225E−01 | — |
| A6= | −7.52068965E−02 | −1.25394778E−01 | −5.42592735E−02 | 2.18792470E−01 | — |
| A8= | 7.07918821E−02 | 1.30444012E−01 | 1.57646965E−01 | −1.13221366E−01 | — |
| A10= | −3.76607092E−02 | −9.24864627E−02 | −1.38584844E−01 | 4.51046791E−02 | — |
| A12= | 1.15485760E−02 | 4.63109801E−02 | 7.42037452E−02 | −1.36058572E−02 | — |
| A14= | −1.99563024E−03 | −1.53550025E−02 | −2.71511507E−02 | 3.08500556E−03 | — |
| A16= | 1.84056678E−04 | 3.30770902E−03 | 7.07460022E−03 | −5.23729187E−04 | — |
| A18= | −7.33347267E−06 | −4.61990551E−04 | −1.33439934E−03 | 6.62480486E−05 | — |
| A20= | — | 4.11578969E−05 | 1.82691191E−04 | −6.18691352E−06 | — |
| A22= | — | −2.18534578E−06 | −1.79834130E−05 | 4.19357623E−07 | — |
| A24= | — | 5.40681553E−08 | 1.24101390E−06 | −2.00097351E−08 | — |
| A26= | — | — | −5.70316520E−08 | 6.36040183E−10 | — |
| A28= | — | — | 1.56891715E−09 | −1.20737768E−11 | — |
| A30= | — | — | −1.95634512E−11 | 1.03444175E−13 | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.84 | |f/f1| | 0.02 |
| Fno | 1.92 | |f/f1| + |f/f2| + |f/f3| | 0.40 |
| HFOV [deg.] | 50.0 | f/f7 | −1.29 |
| V1 + V2 + V3 | 93.3 | f/f123 | 0.25 |
| (V3 + V5)/V4 | 0.60 | f/f456 | 1.42 |
| (V4 + V6 + V7)/(V3 + V5) | 4.69 | f/R11 + f/R12 | −3.98 |
| Vmin | 18.4 | f/R14 | 3.69 |
| (CT1 + CT2)/T12 | 3.15 | |f1/f4| | 36.36 |
| CT1/CT3 | 1.55 | |f1|/R1 | −48.99 |
| CT3/CT4 | 0.31 | f4/f6 | 1.78 |
| (CT6 + CT7)/T67 | 4.19 | Y11/Y72 | 0.49 |
| TL/EPD | 3.23 | Yc11/Y11 | 0.46 |
| TL/f | 1.68 | Yc12/Y12 | 0.41 |
| TL/ImgH | 1.40 | Yc71/Y71 | 0.23 |
| (R11 + R12)/(R11 − R12) | 1.98 | Yc72/Y72 | 0.54 |

6th Embodiment

Figure 11:
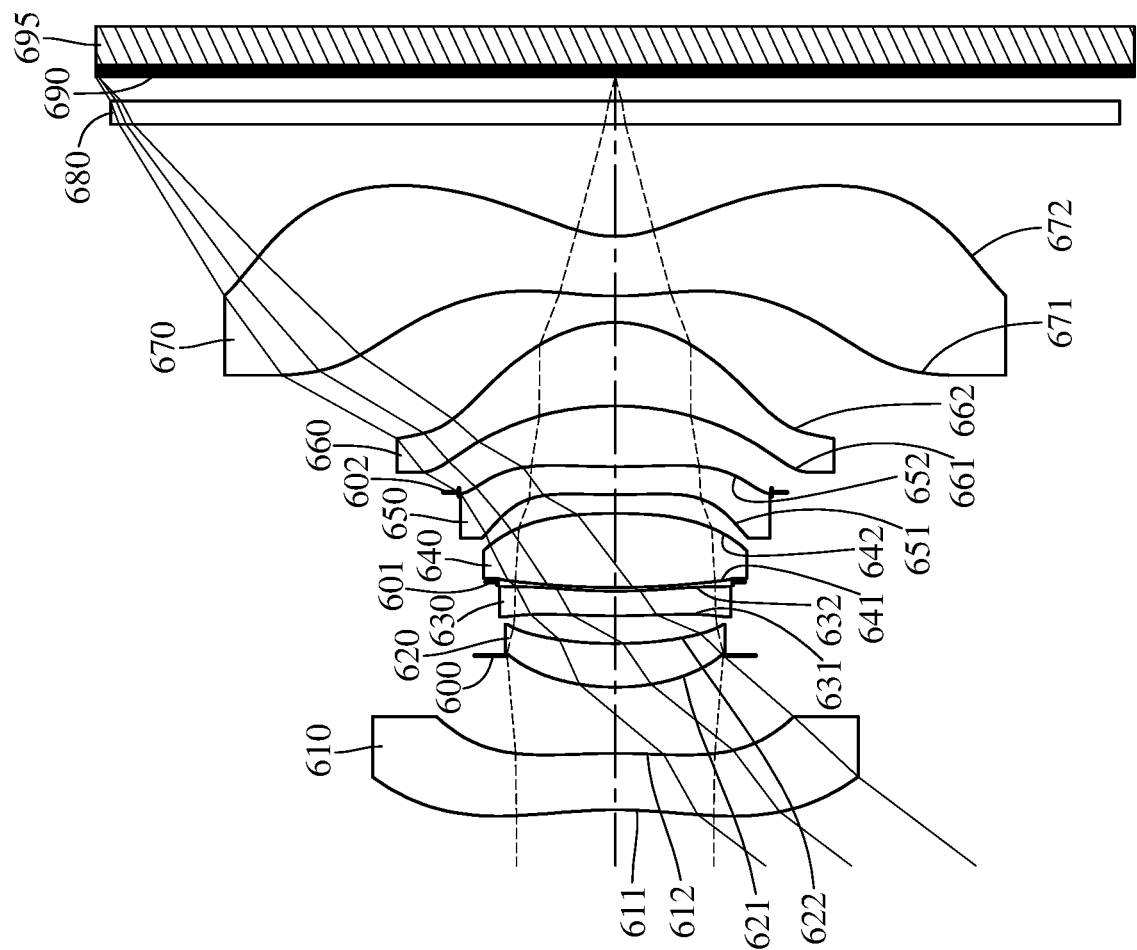
FIG. 11 is a schematic view of an image capturing unit according to the 6th embodiment of the present disclosure.
Figure 12:
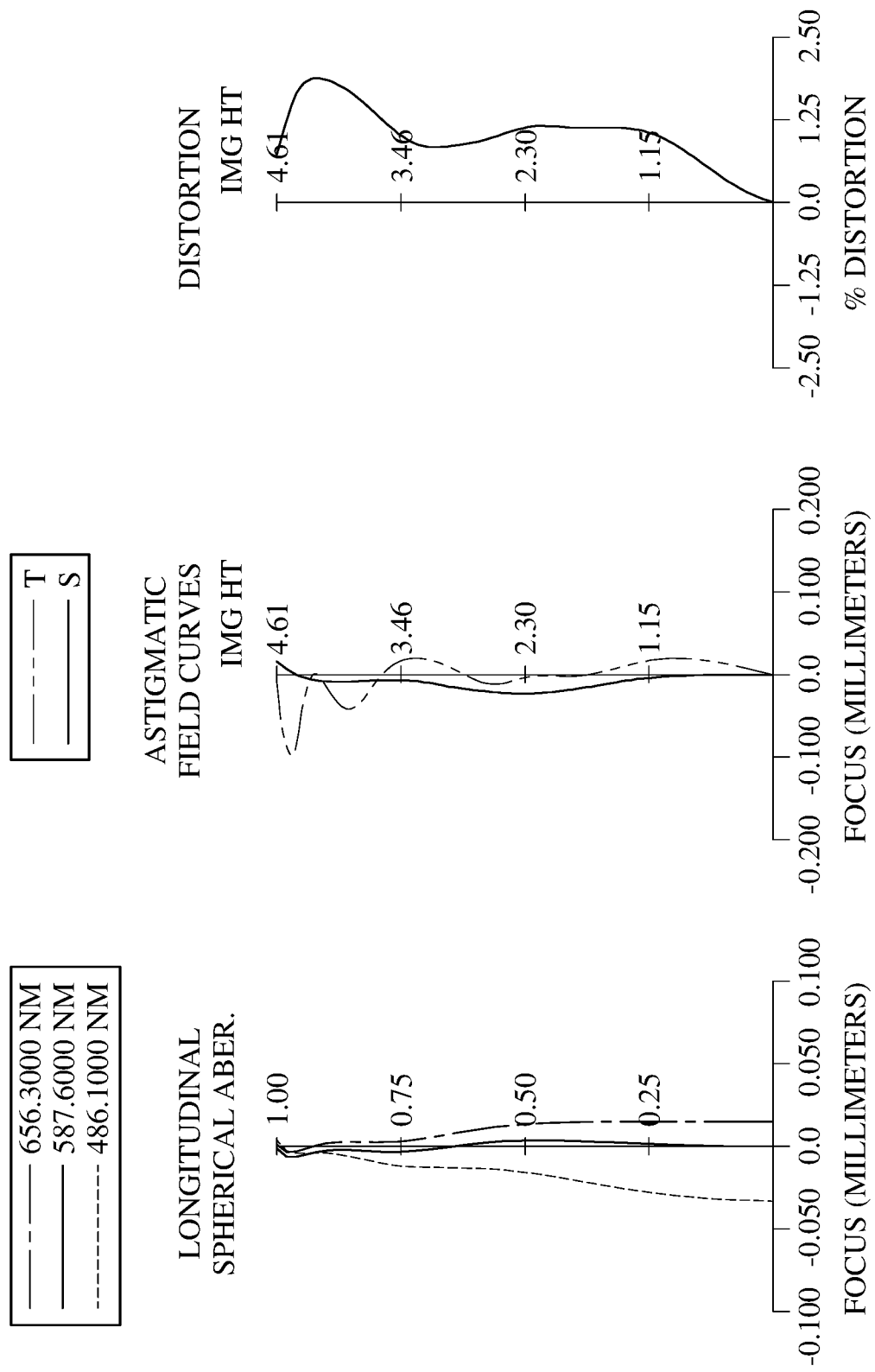
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens system (its reference numeral is omitted) of the present disclosure and an image sensor 695. The photographing optical lens system includes, in order from an object side to an image side along an optical path, a first lens element 610, an aperture stop 600, a second lens element 620, a third lens element 630, a stop 601, a fourth lens element 640, a fifth lens element 650, a stop 602, a sixth lens element 660, a seventh lens element 670, a filter 680 and an image surface 690. The photographing optical lens system includes seven lens elements (610, 620, 630, 640, 650, 660 and 670) with no additional lens element disposed between each of the adjacent seven lens elements.

The first lens element 610 with negative refractive power has an object-side surface 611 being concave in a paraxial region thereof and an image-side surface 612 being convex in a paraxial region thereof. The first lens element 610 is made of plastic material and has the object-side surface 611 and the image-side surface 612 being both aspheric. The object-side surface 611 of the first lens element 610 has one inflection point. The image-side surface 612 of the first lens element 610 has one inflection point. The object-side surface 611 of the first lens element 610 has one critical point in an off-axis region thereof. The image-side surface 612 of the first lens element 610 has one critical point in an off-axis region thereof.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has one inflection point. The image-side surface 632 of the third lens element 630 has two inflection points. The object-side surface 631 of the third lens element 630 has one critical point in an off-axis region thereof.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has one inflection point.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has two inflection points. The image-side surface 652 of the fifth lens element 650 has two inflection points. The object-side surface 651 of the fifth lens element 650 has one critical point in an off-axis region thereof. The image-side surface 652 of the fifth lens element 650 has one critical point in an off-axis region thereof.

The sixth lens element 660 with positive refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has one inflection point. The image-side surface 662 of the sixth lens element 660 has one inflection point.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has two inflection points. The image-side surface 672 of the seventh lens element 670 has two inflection points. The object-side surface 671 of the seventh lens element 670 has one critical point in an off-axis region thereof. The image-side surface 672 of the seventh lens element 670 has one critical point in an off-axis region thereof.

The filter 680 is made of glass material and located between the seventh lens element 670 and the image surface 690, and will not affect the focal length of the photographing optical lens system. The image sensor 695 is disposed on or near the image surface 690 of the photographing optical lens system.

The detailed optical data of the 6th embodiment are shown in Table 11 and the aspheric surface data are shown in Table 12 below.

TABLE 11

6th Embodiment
f = 3.45 mm, Fno = 1.96, HFOV = 53.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.2492 | (ASP) | 0.504 | Plastic | 1.529 | 58.0 | −25.11 |
| 2 | | −6.5043 | (ASP) | 0.874 | | | | |
| 3 | Ape. Stop | Plano | | −0.282 | | | | |
| 4 | Lens 2 | 2.0712 | (ASP) | 0.389 | Plastic | 1.566 | 37.4 | 7.37 |
| 5 | | 3.8332 | (ASP) | 0.248 | | | | |
| 6 | Lens 3 | 7.6033 | (ASP) | 0.220 | Plastic | 1.701 | 14.8 | −18.70 |
| 7 | | 4.7550 | (ASP) | 0.082 | | | | |
| 8 | Stop | Plano | | −0.049 | | | | |
| 9 | Lens 4 | 7.5531 | (ASP) | 0.661 | Plastic | 1.529 | 58.0 | 5.99 |
| 10 | | −5.2944 | (ASP) | 0.168 | | | | |
| 11 | Lens 5 | 7.1046 | (ASP) | 0.250 | Plastic | 1.686 | 18.4 | 112.09 |
| 12 | | 7.7157 | (ASP) | −0.230 | | | | |
| 13 | Stop | Plano | | 0.772 | | | | |
| 14 | Lens 6 | −2.5990 | (ASP) | 0.747 | Plastic | 1.529 | 58.0 | 2.89 |
| 15 | | −1.0573 | (ASP) | 0.235 | | | | |
| 16 | Lens 7 | 3.2238 | (ASP) | 0.532 | Plastic | 1.529 | 58.0 | −2.90 |
| 17 | | 0.9793 | (ASP) | 1.000 | | | | |
| 18 | Filter | Plano | | 0.210 | Glass | 1.517 | 64.2 | — |
| 19 | | Plano | | 0.214 | | | | |
| 20 | Image | Plano | | — | | | | |

Note:
Reference wavelength is 587.6 nm (d-line).
An effective radius of the stop 601 (Surface 8) is 1.050 mm.
An effective radius of the stop 602 (Surface 13) is 1.394 mm.

TABLE 12

Aspheric Coefficients

| Surface # | 1 | 2 | 4 | 5 | 6 |
|---|---|---|---|---|---|
| k= | 0.00000E+00 | 8.62061E+00 | 1.71556E+00 | 0.00000E+00 | 0.00000E+00 |
| A4= | 8.28315017E-02 | 1.25395368E-01 | 3.45065217E-02 | 2.54896658E-02 | -7.45586889E-02 |
| A6= | -2.60688637E-02 | -4.82482286E-02 | -2.93169119E-02 | 9.42825109E-03 | -2.34405933E-02 |
| A8= | 9.56968924E-03 | 3.56903446E-02 | 4.46071249E-02 | 1.48906163E-02 | 2.22303405E-02 |
| A10= | -2.76784567E-03 | -2.06644882E-02 | -5.04868921E-02 | -1.42816571E-02 | 5.75968348E-02 |
| A12= | 5.45589592E-04 | 8.34511377E-03 | 3.75772393E-02 | 2.75045381E-02 | -2.40398036E-01 |
| A14= | -6.17533184E-05 | -1.86968108E-03 | -6.92216258E-03 | — | 3.06425059E-01 |
| A16= | 2.91228434E-06 | 1.62041908E-04 | — | — | -1.29368952E-01 |

| Surface # | 7 | 9 | 10 | 11 | 12 |
|---|---|---|---|---|---|
| k= | 0.00000E+00 | 0.00000E+00 | 0.00000E+00 | -9.00000E+01 | -4.23225E+01 |
| A4= | -5.21969815E-02 | 3.05168882E-02 | -1.32049621E-01 | -1.65735522E-01 | -5.72715516E-02 |
| A6= | -2.95839545E-02 | -3.34661776E-02 | 6.35092453E-02 | -1.07599265E-01 | -1.66893017E-01 |
| A8= | -7.72591179E-02 | -1.20830072E-01 | -4.46335225E-02 | 1.18658101E-01 | 3.43764531E-01 |
| A10= | 1.67820005E-01 | 2.48837670E-01 | -5.34412711E-02 | -1.74977490E-01 | -5.20845157E-01 |
| A12= | -8.43447776E-02 | -1.47180948E-01 | 1.25314846E-01 | 8.23422638E-02 | 5.18891219E-01 |
| A14= | 1.07317515E-02 | 2.44164014E-02 | -8.20266230E-02 | 2.24572176E-02 | -3.28529694E-01 |
| A16= | — | — | 1.73435197E-02 | -1.37844000E-02 | 1.25320881E-01 |
| A18= | — | — | — | — | -2.51530314E-02 |
| A20= | — | — | — | — | 1.98774876E-03 |

| Surface # | 14 | 15 | 16 | 17 | — |
|---|---|---|---|---|---|
| k= | 0.00000E+00 | -9.60232E-01 | 0.00000E+00 | -1.01866E+00 | — |
| A4= | 1.97354023E-02 | 1.38542542E-01 | -1.00528874E-01 | -3.70008341E-01 | — |
| A6= | -8.51387834E-02 | -2.44886881E-01 | -1.73155884E-01 | 2.38126375E-01 | — |
| A8= | 7.67181629E-02 | 2.29207217E-01 | 3.05841519E-01 | -1.23453655E-01 | — |
| A10= | 2.81902110E-05 | -9.27448681E-02 | -2.55239620E-01 | 4.89478015E-02 | — |
| A12= | -3.62571566E-02 | -4.00336874E-02 | 1.35736727E-01 | -1.45635136E-02 | — |
| A14= | 2.07985814E-02 | 7.69416597E-02 | -4.98790863E-02 | 3.20814863E-03 | — |
| A16= | -4.62312690E-03 | -4.53147819E-02 | 1.31107639E-02 | -5.17059555E-04 | — |
| A18= | 3.68094519E-04 | 1.42678957E-02 | -2.50345810E-03 | 6.00272720E-05 | — |
| A20= | — | -2.56703073E-03 | 3.48340531E-04 | -4.88970315E-06 | — |
| A22= | — | 2.49326773E-04 | -3.50029476E-05 | 2.65862561E-07 | — |
| A24= | — | -1.01612399E-05 | 2.47729044E-06 | -8.62549564E-09 | — |
| A26= | — | — | -1.17297418E-07 | 1.11700092E-10 | — |
| A28= | — | — | 3.33903942E-09 | 1.67032319E-12 | — |
| A30= | — | — | -4.32494593E-11 | -5.34564043E-14 | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.45 | |f/f1| | 0.14 |
| Fno | 1.96 | |f/f1| + |f/f2| + |f/f3| | 0.79 |
| HFOV [deg.] | 53.0 | f/f7 | -1.19 |
| V1 + V2 + V3 | 110.2 | |f/f123| | 0.18 |
| (V3 + V5)/V4 | 0.57 | f/f456 | 1.43 |
| (V4 + V6 + V7)/(V3 + V5) | 5.24 | f/R11 + f/R12 | -4.59 |
| Vmin | 14.8 | f/R14 | 3.52 |
| (CT1 + CT2)/T12 | 1.51 | |f1/f4| | 4.19 |
| CT1/CT3 | 2.29 | |f1|/R1 | -5.91 |
| CT3/CT4 | 0.33 | f4/f6 | 2.08 |
| (CT6 + CT7)/T67 | 5.44 | Y11/Y72 | 0.62 |
| TL/EPD | 3.72 | Yc11/Y11 | 0.48 |
| TL/f | 1.90 | Yc12/Y12 | 0.39 |
| TL/ImgH | 1.42 | Yc71/Y71 | 0.26 |
| (R11 + R12)/(R11 - R12) | 2.37 | Yc72/Y72 | 0.55 |

7th Embodiment

Figure 13:
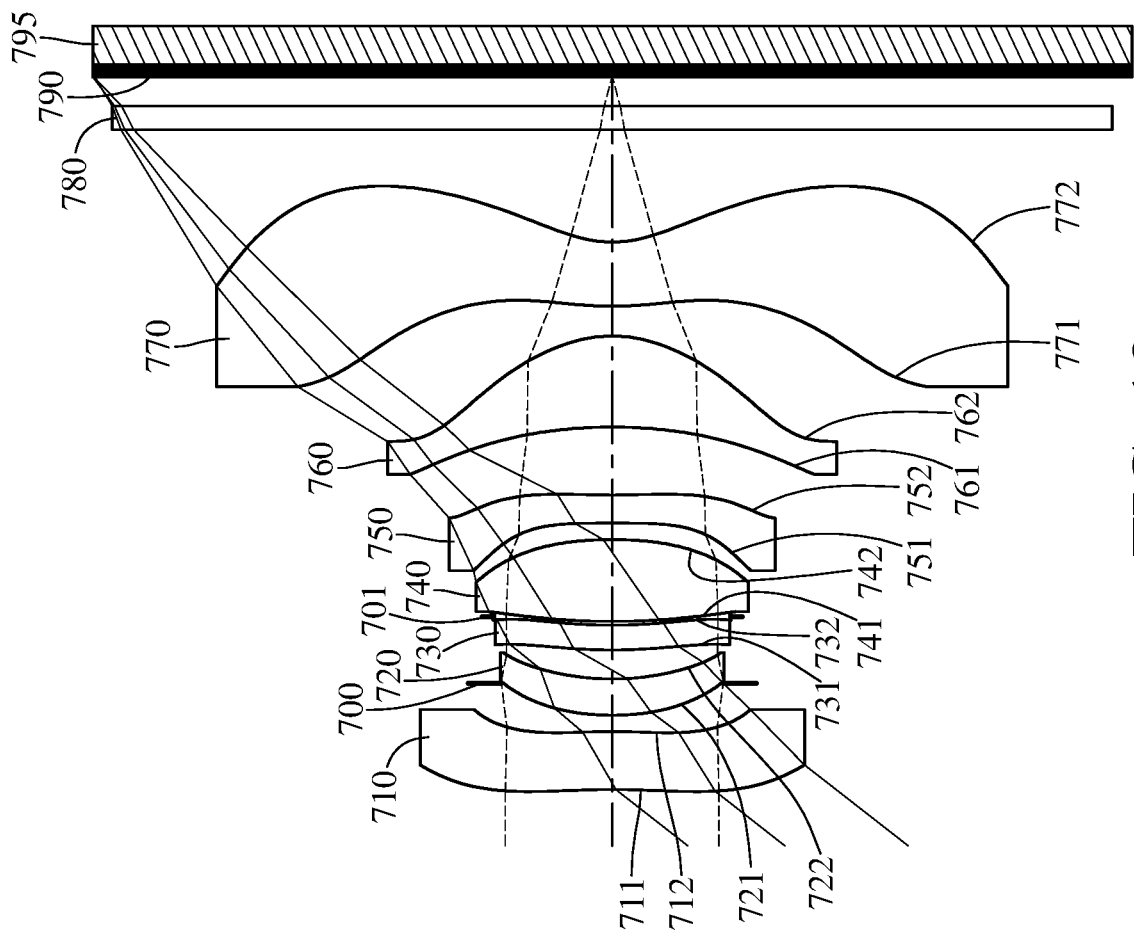
FIG. 13 is a schematic view of an image capturing unit according to the 7th embodiment of the present disclosure.
Figure 14:
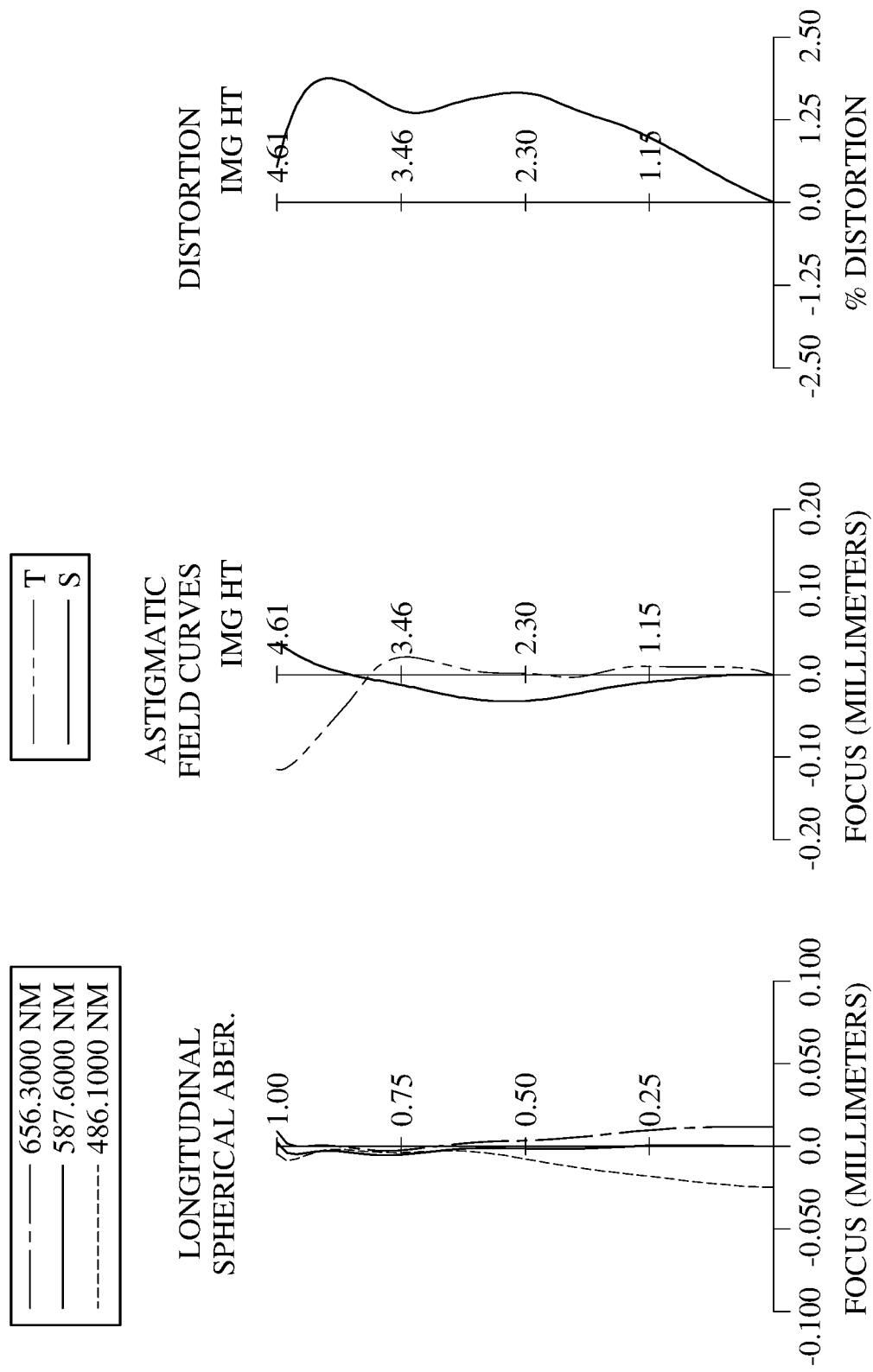
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens system (its reference numeral is omitted) of the present disclosure and an image sensor 795. The photographing optical lens system includes, in order from an object side to an image side along an optical path, a first lens element 710, an aperture stop 700, a second lens element 720, a third lens element 730, a stop 701, a fourth lens element 740, a fifth lens element 750, a sixth lens element 760, a seventh lens element 770, a filter 780 and an image surface 790. The photographing optical lens system includes seven lens elements (710, 720, 730, 740, 750, 760 and 770) with no additional lens element disposed between each of the adjacent seven lens elements.

The first lens element 710 with positive refractive power has an object-side surface 711 being concave in a paraxial region thereof and an image-side surface 712 being convex in a paraxial region thereof. The first lens element 710 is made of plastic material and has the object-side surface 711 and the image-side surface 712 being both aspheric. The object-side surface 711 of the first lens element 710 has one inflection point. The image-side surface 712 of the first lens element 710 has one inflection point. The object-side surface 711 of the first lens element 710 has one critical point in an off-axis region thereof. The image-side surface 712 of the first lens element 710 has one critical point in an off-axis region thereof.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has one inflection point. The image-side surface 732 of the third lens element 730 has one inflection point. The object-side surface 731 of the third lens element 730 has one critical point in an off-axis region thereof. The image-side surface 732 of the third lens element 730 has one critical point in an off-axis region thereof.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has one inflection point.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has one inflection point. The image-side surface 752 of the fifth lens element 750 has two inflection points. The image-side surface 752 of the fifth lens element 750 has one critical point in an off-axis region thereof.

The sixth lens element 760 with positive refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has one inflection point. The image-side surface 762 of the sixth lens element 760 has one inflection point.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has two inflection points. The image-side surface 772 of the seventh lens element 770 has two inflection points. The object-side surface 771 of the seventh lens element 770 has one critical point in an off-axis region thereof. The image-side surface 772 of the seventh lens element 770 has one critical point in an off-axis region thereof.

The filter 780 is made of glass material and located between the seventh lens element 770 and the image surface 790, and will not affect the focal length of the photographing optical lens system. The image sensor 795 is disposed on or near the image surface 790 of the photographing optical lens system.

The detailed optical data of the 7th embodiment are shown in Table 13 and the aspheric surface data are shown in Table 14 below.

TABLE 13

7th Embodiment
f = 3.58 mm, Fno = 1.89, HFOV = 52.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −6.6194 | (ASP) | 0.515 | Plastic | 1.566 | 37.4 | 33.22 |
| 2 |  | −5.0335 | (ASP) | 0.429 |  |  |  |  |
| 3 | Ape. Stop | Plano |  | −0.284 |  |  |  |  |
| 4 | Lens 2 | 2.3978 | (ASP) | 0.322 | Plastic | 1.562 | 44.6 | −388.92 |
| 5 |  | 2.2572 | (ASP) | 0.258 |  |  |  |  |
| 6 | Lens 3 | 4.5386 | (ASP) | 0.220 | Plastic | 1.679 | 18.4 | 173.74 |
| 7 |  | 4.6276 | (ASP) | 0.076 |  |  |  |  |
| 8 | Stop | Plano |  | −0.042 |  |  |  |  |
| 9 | Lens 4 | 7.7948 | (ASP) | 0.727 | Plastic | 1.544 | 56.0 | 4.48 |
| 10 |  | −3.4260 | (ASP) | 0.146 |  |  |  |  |
| 11 | Lens 5 | −172.0823 | (ASP) | 0.250 | Plastic | 1.679 | 18.4 | −11.21 |
| 12 |  | 7.9702 | (ASP) | 0.604 |  |  |  |  |
| 13 | Lens 6 | −4.2096 | (ASP) | 0.809 | Plastic | 1.544 | 56.0 | 2.67 |
| 14 |  | −1.1519 | (ASP) | 0.265 |  |  |  |  |
| 15 | Lens 7 | 3.1496 | (ASP) | 0.569 | Plastic | 1.544 | 56.0 | −2.90 |
| 16 |  | 0.9846 | (ASP) | 1.000 |  |  |  |  |
| 17 | Filter | Plano |  | 0.210 | Glass | 1.517 | 64.2 | — |
| 18 |  | Plano |  | 0.256 |  |  |  |  |
| 19 | Image | Plano |  | — |  |  |  |  |

Note:
Reference wavelength is 587.6 nm (d-line).
An effective radius of the stop 701 (Surface 8) is 1.050 mm.

TABLE 14

Aspheric Coefficients

| Surface # | 1 | 2 | 4 | 5 | 6 |
|---|---|---|---|---|---|
| k= | 0.00000E+00 | −1.13148E+01 | 2.58141E+00 | 0.00000E+00 | 0.00000E+00 |
| A4= | 8.73043323E−02 | 2.71568147E−01 | 1.62421896E−01 | −2.39206434E−02 | −4.60781861E−02 |
| A6= | −2.73368266E−02 | −3.23147398E−01 | −3.46034934E−01 | 8.47563398E−03 | −1.03704362E−02 |
| A8= | 1.02043638E−02 | 4.43927629E−01 | 5.31296724E−01 | 5.66802410E−02 | −1.15751284E−01 |
| A10= | −2.96792841E−03 | −4.27825602E−01 | −5.17153408E−01 | −4.55555625E−02 | 4.19695084E−01 |
| A12= | 6.88628915E−04 | 2.65888649E−01 | 2.95329569E−01 | 3.00227861E−02 | −6.53701435E−01 |
| A14= | −9.73237265E−05 | −9.10671347E−02 | −7.16973108E−02 | — | 4.84774725E−01 |
| A16= | 3.60184366E−06 | 1.29933597E−02 | — | — | −1.42556705E−01 |

| Surface # | 7 | 9 | 10 | 11 | 12 |
|---|---|---|---|---|---|
| k= | 0.00000E+00 | 0.00000E+00 | 0.00000E+00 | 9.00000E+01 | −6.03481E+01 |
| A4= | 8.81851886E−03 | 7.35261561E−02 | −9.90509508E−02 | −2.48095040E−01 | −1.34326956E−01 |
| A6= | −1.39397336E−01 | −1.16919873E−01 | 6.81458685E−02 | 6.65455708E−02 | 8.46136980E−03 |
| A8= | 7.65601332E−02 | 1.62451237E−02 | −5.01960114E−02 | 4.93722672E−02 | 1.40003345E−01 |
| A10= | 2.98018535E−02 | 9.57417569E−02 | −3.52235497E−02 | −2.03540157E−01 | −2.81180110E−01 |
| A12= | −4.88640324E−02 | −7.50170166E−02 | 7.12808394E−02 | 1.77886618E−01 | 2.88562451E−01 |
| A14= | 1.32383550E−02 | 1.57691197E−02 | −3.67951851E−02 | −5.47839994E−02 | −1.78453995E−01 |
| A16= | — | — | 6.23173884E−03 | 4.99729803E−03 | 6.76281427E−02 |
| A18= | — | — | — | — | −1.43345208E−02 |
| A20= | — | — | — | — | 1.30213338E−03 |

| Surface # | 13 | 14 | 15 | 16 | — |
|---|---|---|---|---|---|
| k= | 0.00000E+00 | −9.59006E−01 | 0.00000E+00 | −1.00754E+00 | — |
| A4= | 2.11337440E−02 | 1.18498613E−01 | −1.17514685E−01 | −3.63547577E−01 | — |
| A6= | −6.53019576E−02 | −1.63638015E−01 | −7.60309041E−02 | 2.47565714E−01 | — |
| A8= | 6.72422241E−02 | 1.56496618E−01 | 1.60296638E−01 | −1.40999727E−01 | — |
| A10= | −3.68679189E−02 | −9.59191371E−02 | −1.34530080E−01 | 6.22894310E−02 | — |
| A12= | 1.19948863E−02 | 3.36222665E−02 | 7.08453774E−02 | −2.08008010E−02 | — |
| A14= | −2.40203937E−03 | −2.47384391E−03 | −2.58378144E−02 | 5.19763013E−03 | — |
| A16= | 2.88738004E−04 | −2.67387020E−03 | 6.79290059E−03 | −9.68221510E−04 | — |
| A18= | −1.63867566E−05 | 1.09570776E−03 | −1.31216043E−03 | 1.33960034E−04 | — |
| A20= | — | −1.92461510E−04 | 1.87388174E−04 | −1.36565573E−05 | — |
| A22= | — | 1.66853975E−05 | −1.96492625E−05 | 1.00936847E−06 | — |
| A24= | — | −5.82166396E−07 | 1.47646140E−06 | −5.24915916E−08 | — |
| A26= | — | — | −7.54386152E−08 | 1.81802353E−09 | — |
| A28= | — | — | 2.34959095E−09 | −3.75891108E−11 | — |
| A30= | — | — | −3.36527927E−11 | 3.50508294E−13 | — |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.58 | |f/f1| | 0.11 |
| Fno | 1.89 | |f/f1| + |f/f2| + |f/f3| | 0.14 |
| HFOV [deg.] | 52.0 | f/f7 | −1.23 |
| V1 + V2 + V3 | 100.5 | |f/f123| | 0.13 |
| (V3 + V5)/V4 | 0.66 | f/f456 | 1.48 |
| (V4 + V6 + V7)/(V3 + V5) | 4.55 | f/R11 + f/R12 | −3.96 |
| Vmin | 18.4 | f/R14 | 3.64 |
| (CT1 + CT2)/T12 | 5.77 | |f1/f4| | 7.42 |
| CT1/CT3 | 2.34 | |f1|/R1 | −5.02 |
| CT3/CT4 | 0.30 | f4/f6 | 1.68 |
| (CT6 + CT7)/T67 | 5.20 | Y11/Y72 | 0.49 |
| TL/EPD | 3.34 | Yc11/Y11 | 0.43 |
| TL/f | 1.77 | Yc12/Y12 | 0.40 |
| TL/ImgH | 1.37 | Yc71/Y71 | 0.30 |
| (R11 + R12)/(R11 − R12) | 1.75 | Yc72/Y72 | 0.58 |

8th Embodiment

Figure 15:
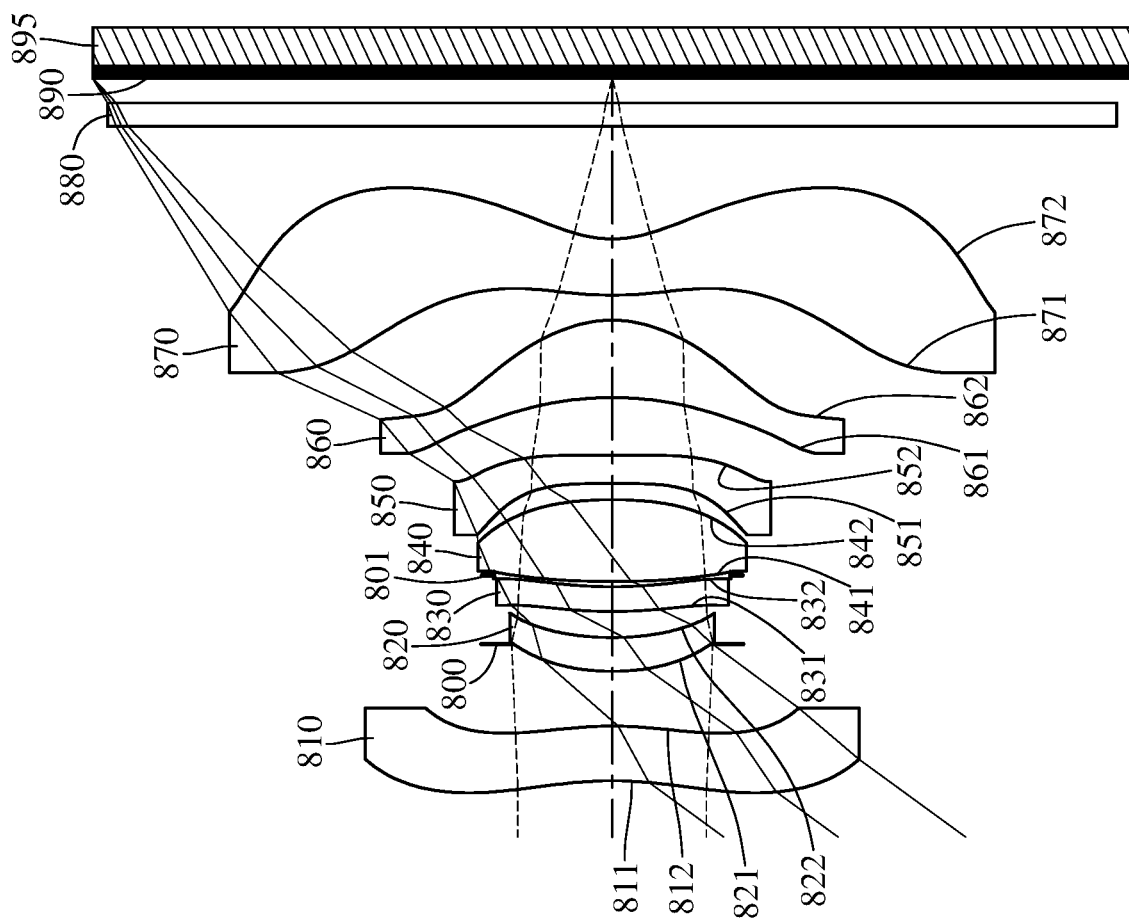
FIG. 15 is a schematic view of an image capturing unit according to the 8th embodiment of the present disclosure.
Figure 16:
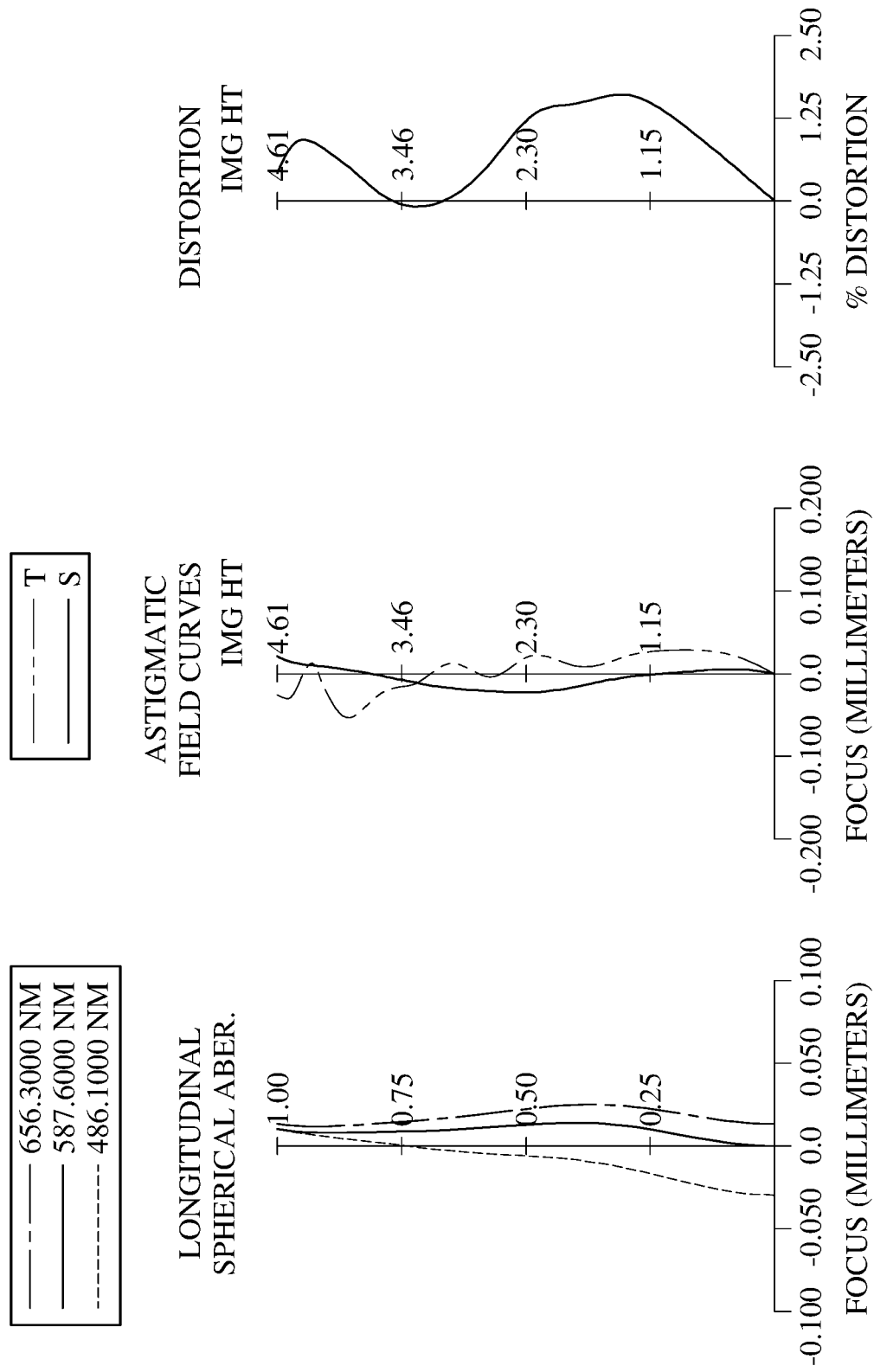
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens system (its reference numeral is omitted) of the present disclosure and an image sensor 895. The photographing optical lens system includes, in order from an object side to an image side along an optical path, a first lens element 810, an aperture stop 800, a second lens element 820, a third lens element 830, a stop 801, a fourth lens element 840, a fifth lens element 850, a sixth lens element 860, a seventh lens element 870, a filter 880 and an image surface 890. The photographing optical lens system includes seven lens elements (810, 820, 830, 840, 850, 860 and 870) with no additional lens element disposed between each of the adjacent seven lens elements.

The first lens element 810 with positive refractive power has an object-side surface 811 being concave in a paraxial region thereof and an image-side surface 812 being convex in a paraxial region thereof. The first lens element 810 is made of plastic material and has the object-side surface 811 and the image-side surface 812 being both aspheric. The object-side surface 811 of the first lens element 810 has one inflection point. The image-side surface 812 of the first lens element 810 has one inflection point. The object-side surface 811 of the first lens element 810 has one critical point in an off-axis region thereof. The image-side surface 812 of the first lens element 810 has one critical point in an off-axis region thereof.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has one inflection point. The image-side surface 832 of the third lens element 830 has one inflection point. The object-side surface 831 of the third lens element 830 has one critical point in an off-axis region thereof. The image-side surface 832 of the third lens element 830 has one critical point in an off-axis region thereof.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has one inflection point.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has one inflection point. The image-side surface 852 of the fifth lens element 850 has two inflection points. The image-side surface 852 of the fifth lens element 850 has two critical points in an off-axis region thereof.

The sixth lens element 860 with positive refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has one inflection point. The image-side surface 862 of the sixth lens element 860 has three inflection points.

The seventh lens element 870 with negative refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has two inflection points. The image-side surface 872 of the seventh lens element 870 has two inflection points. The object-side surface 871 of the seventh lens element 870 has one critical point in an off-axis region thereof. The image-side surface 872 of the seventh lens element 870 has one critical point in an off-axis region thereof.

The filter 880 is made of glass material and located between the seventh lens element 870 and the image surface 890, and will not affect the focal length of the photographing optical lens system. The image sensor 895 is disposed on or near the image surface 890 of the photographing optical lens system.

The detailed optical data of the 8th embodiment are shown in Table 15 and the aspheric surface data are shown in Table 16 below.

TABLE 15

8th Embodiment
f = 3.33 mm, Fno = 1.99, HFOV = 54.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.2236 | (ASP) | 0.486 | Plastic | 1.545 | 56.1 | 97.75 |
| 2 | | −3.2013 | (ASP) | 0.729 | | | | |
| 3 | Ape. Stop | Plano | | −0.242 | | | | |
| 4 | Lens 2 | 2.1063 | (ASP) | 0.300 | Plastic | 1.562 | 44.6 | 16.32 |
| 5 | | 2.5943 | (ASP) | 0.232 | | | | |
| 6 | Lens 3 | 4.2056 | (ASP) | 0.220 | Plastic | 1.679 | 18.4 | 428.31 |
| 7 | | 4.1770 | (ASP) | 0.103 | | | | |
| 8 | Stop | Plano | | −0.056 | | | | |
| 9 | Lens 4 | 9.5478 | (ASP) | 0.727 | Plastic | 1.544 | 56.0 | 5.12 |
| 10 | | −3.8225 | (ASP) | 0.145 | | | | |
| 11 | Lens 5 | −22.9385 | (ASP) | 0.250 | Plastic | 1.679 | 18.4 | −16.13 |
| 12 | | 21.0756 | (ASP) | 0.513 | | | | |
| 13 | Lens 6 | −2.9750 | (ASP) | 0.689 | Plastic | 1.544 | 56.0 | 2.65 |
| 14 | | −1.0505 | (ASP) | 0.222 | | | | |
| 15 | Lens 7 | 3.2532 | (ASP) | 0.500 | Plastic | 1.544 | 56.0 | −2.89 |
| 16 | | 1.0036 | (ASP) | 1.000 | | | | |
| 17 | Filter | Plano | | 0.210 | Glass | 1.517 | 64.2 | — |
| 18 | | Plano | | 0.216 | | | | |
| 19 | Image | Plano | | — | | | | |

Note:
Reference wavelength is 587.6 nm (d-line).
An effective radius of the stop 801 (Surface 8) is 1.050 mm.

TABLE 16

Aspheric Coefficients

| Surface # | 1 | 2 | 4 | 5 | 6 |
|---|---|---|---|---|---|
| k= | 0.00000E+00 | 1.68687E+00 | 2.23524E+00 | 0.00000E+00 | 0.00000E+00 |
| A4= | 8.09760544E-02 | 1.40103759E-01 | 7.10649157E-02 | 6.41449286E-02 | -2.49947216E-02 |
| A6= | -2.15012850E-02 | -6.12097616E-02 | -7.50436243E-02 | -4.14405502E-02 | -4.80014025E-02 |
| A8= | 7.11478818E-03 | 4.16471240E-02 | 6.05097757E-02 | 1.00322188E-01 | -3.85824871E-02 |
| A10= | -1.89311966E-03 | -2.09242800E-02 | -2.10193867E-02 | -7.49263346E-02 | 1.59307916E-01 |
| A12= | 3.57442043E-04 | 7.20298586E-03 | 3.92711699E-04 | 4.94134996E-02 | -2.58302484E-01 |
| A14= | -3.91604481E-05 | -1.41553637E-03 | 1.68546123E-03 | — | 2.12411228E-01 |
| A16= | 1.88207692E-06 | 1.26429720E-04 | — | — | -7.33877785E-02 |

| Surface # | 7 | 9 | 10 | 11 | 12 |
|---|---|---|---|---|---|
| k= | 0.00000E+00 | 0.00000E+00 | 0.00000E+00 | -5.17446E+01 | 6.05016E+01 |
| A4= | 5.91336766E-03 | 4.49747242E-02 | -1.41811398E-01 | -2.96635107E-01 | -1.58197934E-01 |
| A6= | -6.12975791E-02 | 7.36943499E-04 | 1.68314776E-01 | 3.06143840E-01 | 1.26697391E-01 |
| A8= | -3.87755623E-02 | -1.08289143E-01 | -3.15996212E-01 | -6.12992299E-01 | -9.03060403E-02 |
| A10= | 5.72240987E-02 | 1.36754708E-01 | 3.39159252E-01 | 6.79015118E-01 | -7.14956167E-02 |
| A12= | -6.44355469E-03 | -5.08482977E-02 | -1.83576086E-01 | -4.49845530E-01 | 2.09636647E-01 |
| A14= | -8.32743331E-03 | 2.36975177E-04 | 3.95247761E-02 | 1.72489215E-01 | -1.94578846E-01 |
| A16= | — | — | -1.09718134E-03 | -2.69895775E-02 | 9.22961162E-02 |
| A18= | — | — | — | — | -2.16158343E-02 |
| A20= | — | — | — | — | 1.95203515E-03 |

| Surface # | 13 | 14 | 15 | 16 | — |
|---|---|---|---|---|---|
| k= | 0.00000E+00 | -9.83763E-01 | 0.00000E+00 | -1.00196E+00 | — |
| A4= | 7.96079291E-03 | 1.91527060E-01 | -3.53500321E-02 | -3.22139571E-01 | — |
| A6= | -5.86586170E-02 | -3.70157090E-01 | -2.38815707E-01 | 1.69683388E-01 | — |
| A8= | 9.90967683E-02 | 4.90618639E-01 | 3.24380057E-01 | -6.73652856E-02 | — |
| A10= | -6.41278832E-02 | -4.55366805E-01 | -2.34860671E-01 | 1.75060358E-02 | — |
| A12= | 1.88505482E-02 | 3.02179428E-01 | 1.09966305E-01 | -1.91836528E-03 | — |
| A14= | -2.17179457E-03 | -1.35868799E-01 | -3.55423286E-02 | -5.13524044E-04 | — |
| A16= | -2.11724934E-05 | 4.04279955E-02 | 8.18663139E-03 | 2.88937839E-04 | — |
| A18= | 1.49605457E-05 | -7.83145626E-03 | -1.36493080E-03 | -6.81562688E-05 | — |
| A20= | — | 9.50229705E-04 | 1.65414307E-04 | 9.96066496E-06 | — |
| A22= | — | -6.56069307E-05 | -1.44688136E-05 | -9.67265467E-07 | — |
| A24= | — | 1.96645335E-06 | 8.93706871E-07 | 6.26221431E-08 | — |
| A26= | — | — | -3.71933559E-08 | -2.60121842E-09 | — |
| A28= | — | — | 9.42384656E-10 | 6.27465425E-11 | — |
| A30= | — | — | -1.10674105E-11 | -6.68293723E-13 | — |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 3.33 | |f/f1| | 0.03 |
| Fno | 1.99 | |f/f1| + |f/f2| + |f/f3| | 0.25 |
| HFOV [deg.] | 54.0 | f/f7 | -1.15 |
| V1 + V2 + V3 | 119.1 | |f/f123| | 0.26 |
| (V3 + V5)/V4 | 0.66 | f/f456 | 1.42 |
| (V4 + V6 + V7)/(V3 + V5) | 4.55 | f/R11 + f/R12 | -4.30 |
| Vmin | 18.4 | f/R14 | 3.32 |
| (CT1 + CT2)/T12 | 1.61 | |f1/f4| | 19.11 |
| CT1/CT3 | 2.21 | |f1|/R1 | -30.32 |
| CT3/CT4 | 0.30 | f4/f6 | 1.93 |
| (CT6 + CT7)/T67 | 5.36 | Y11/Y72 | 0.64 |
| TL/EPD | 3.73 | Yc11/Y11 | 0.58 |
| TL/f | 1.87 | Yc12/Y12 | 0.58 |
| TL/ImgH | 1.36 | Yc71/Y71 | 0.29 |
| (R11 + R12)/(R11 − R12) | 2.09 | Yc72/Y72 | 0.55 |

9th Embodiment

Figure 17:
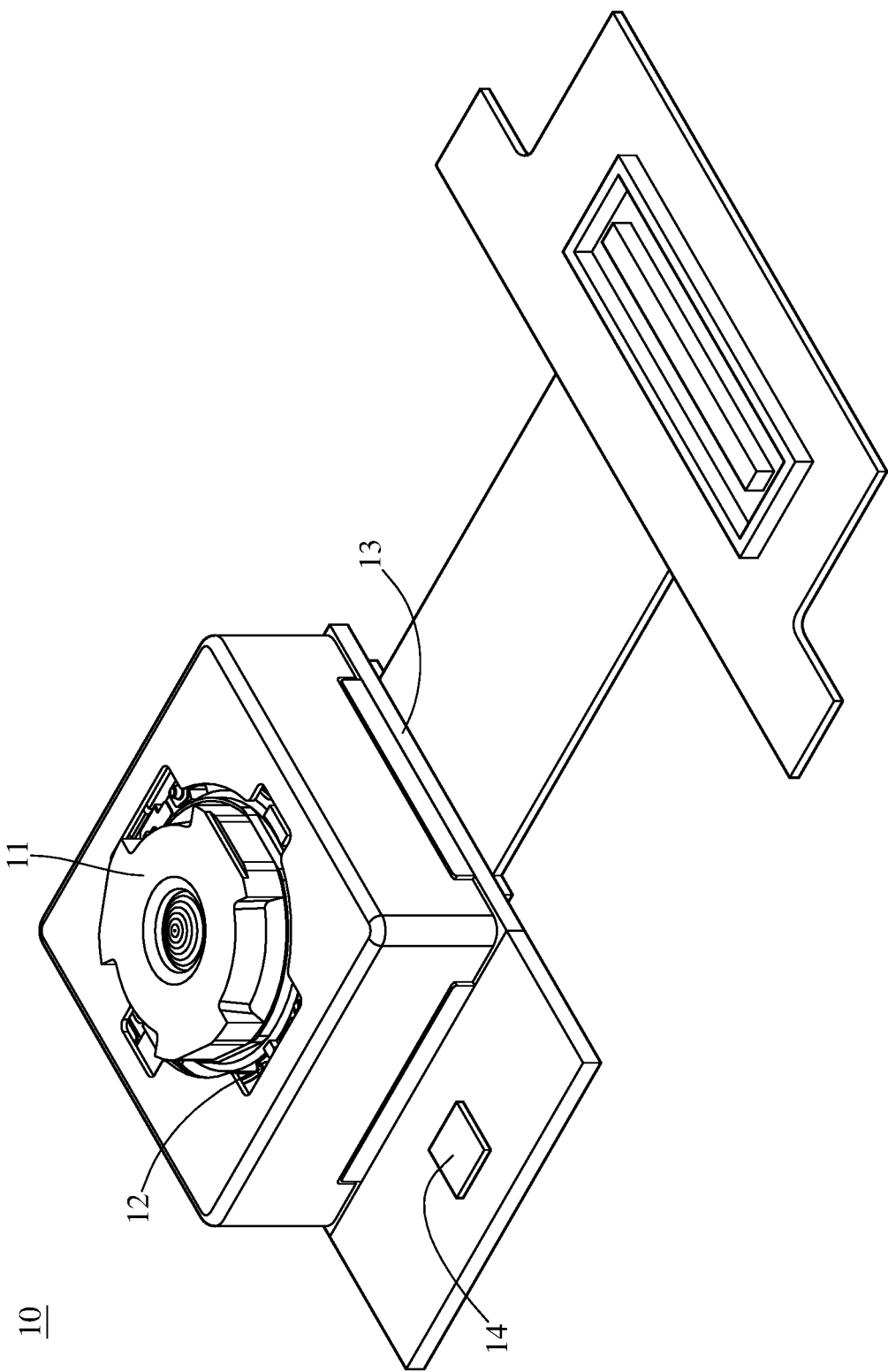
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 10 is a camera module including a lens unit 11, a driving device 12, an image sensor 13 and an image stabilizer 14. The lens unit 11 includes the photographing optical lens system disclosed in the 1st embodiment, a barrel and a holder member (their reference numerals are omitted) for holding the photographing optical lens system. However, the lens unit 11 may alternatively be provided with the photographing optical lens system disclosed in other embodiments of the present disclosure, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing optical lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

10th Embodiment

Figure 18:
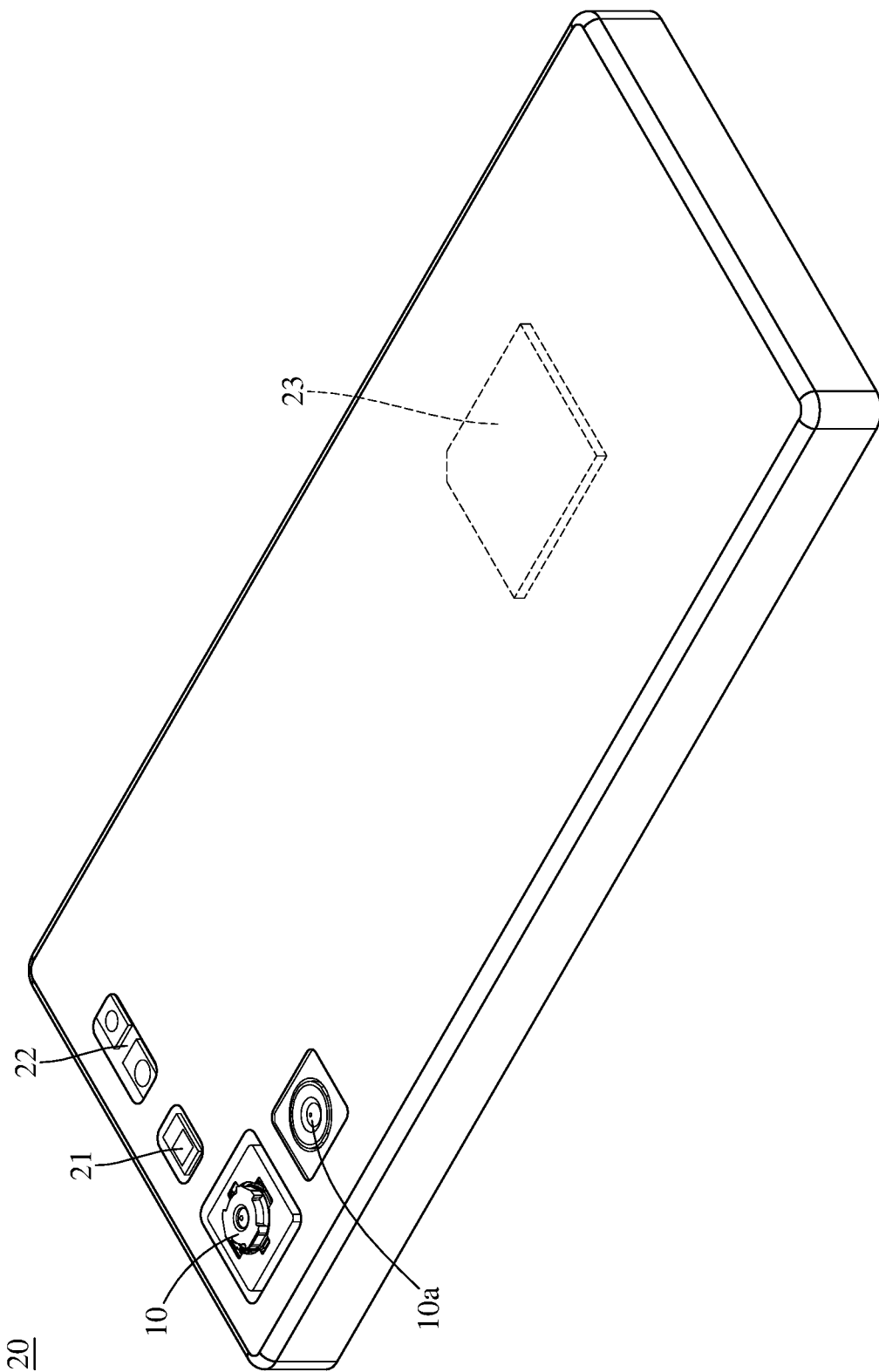
FIG. 18 is one perspective view of an electronic device according to the 10th embodiment of the present disclosure.
Figure 19:
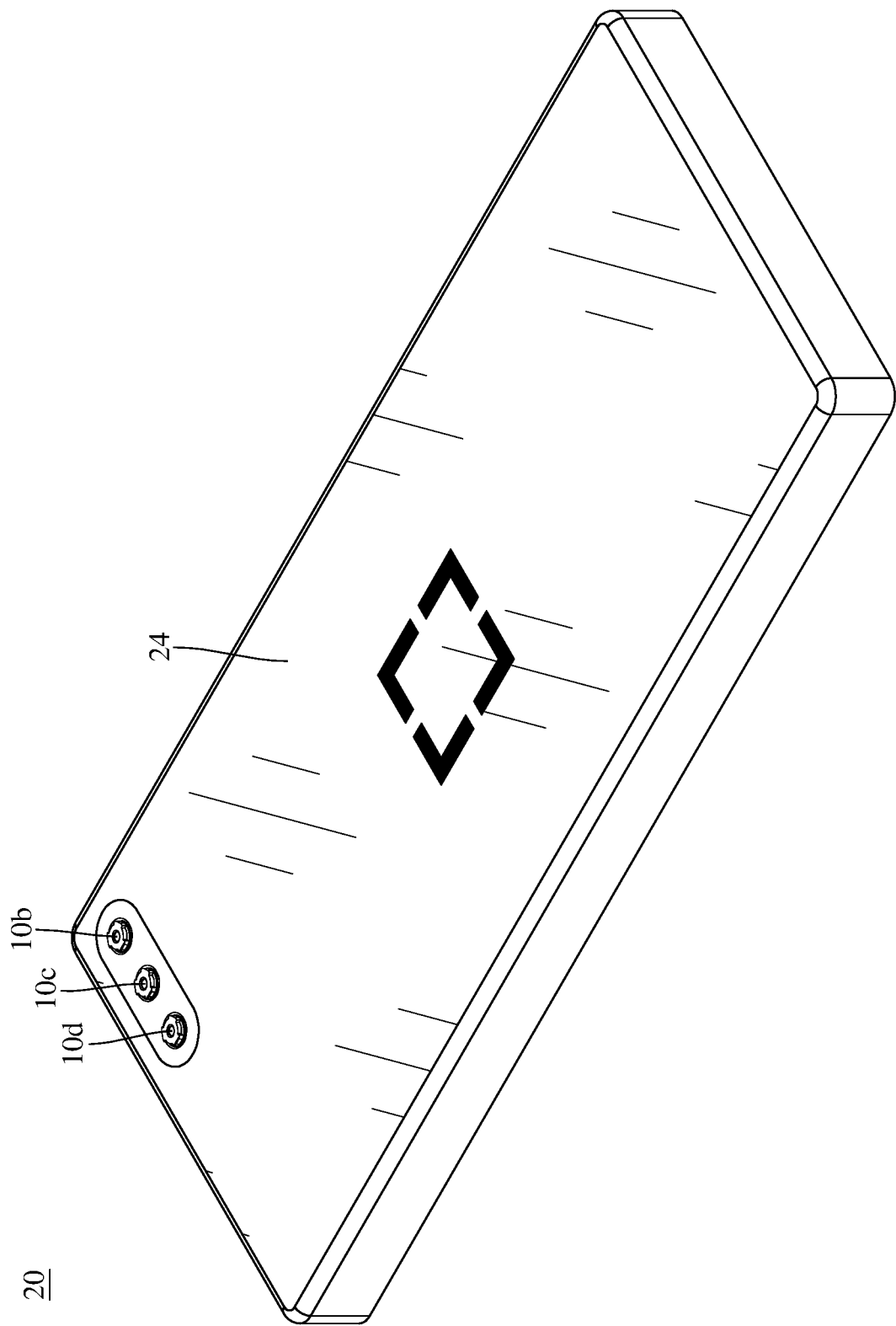
FIG. 19 is another perspective view of the electronic device in FIG. 18.
Figure 20:
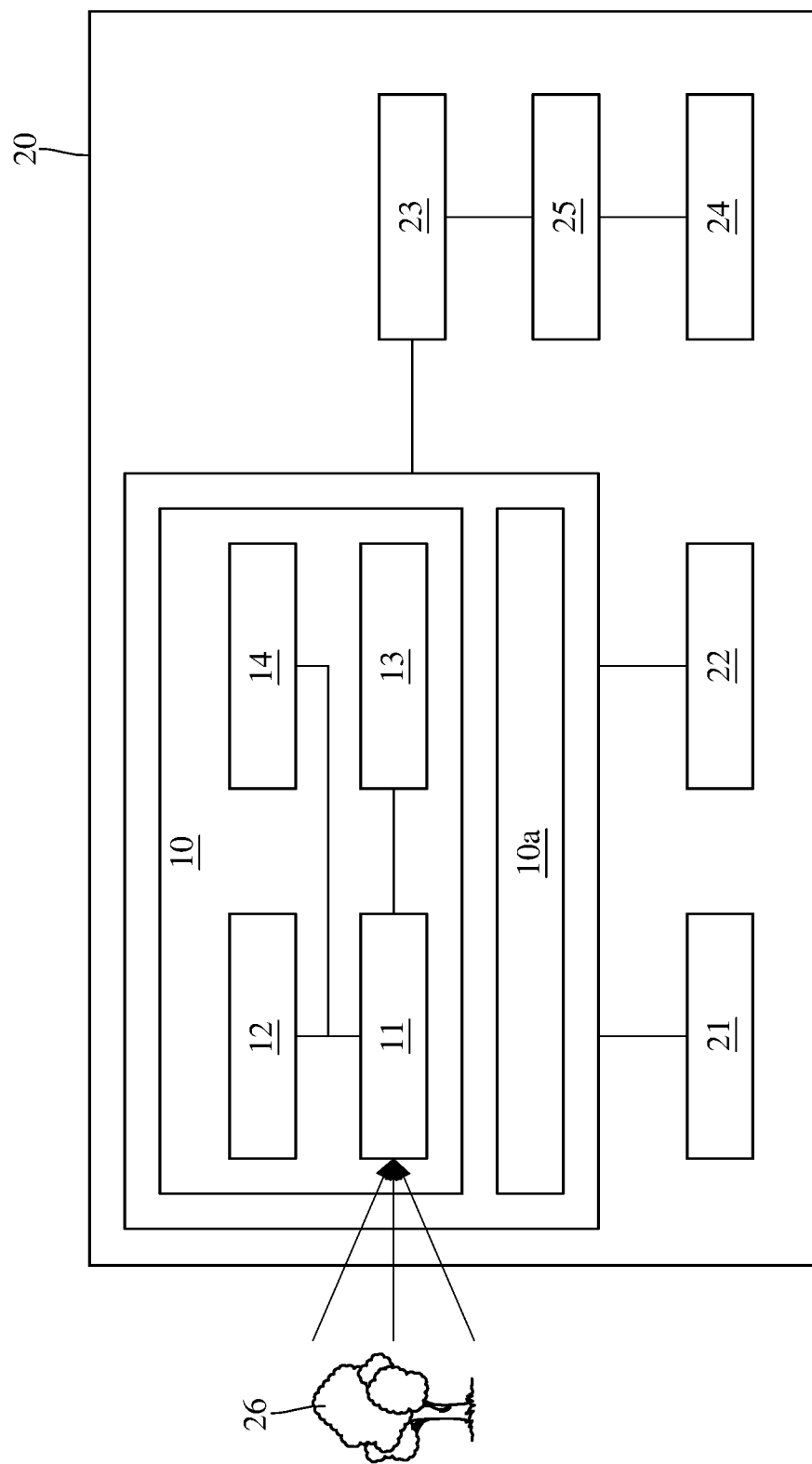
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18.

In this embodiment, an electronic device 20 is a smartphone including the image capturing unit 10 disclosed in the 9th embodiment, an image capturing unit 10a, an image capturing unit 10b, an image capturing unit 10c, an image capturing unit 10d, a flash module 21, a focus assist module 22, an image signal processor 23, a display module (user interface) 24 and an image software processor 25. The image capturing unit 10 and the image capturing unit 10a are disposed on the same side of the electronic device 20 and each of the image capturing units 10 and 10a has a single focal point. The image capturing unit 10b, the image capturing unit 10c, the image capturing unit 10d and the display module 24 are disposed on the opposite side of the electronic device 20, such that the image capturing units 10b, 10c, 10d can be front-facing cameras of the electronic device 20 for taking selfies, but the present disclosure is not limited thereto. Furthermore, each of the image capturing units 10a, 10b, 10c and 10d can include the photographing optical lens system of the present disclosure and can have a configuration similar to that of the image capturing unit 10. In detail, each of the image capturing units 10a, 10b, 10c and 10d can include a lens unit, a driving device, an image sensor and an image stabilizer, and each of the lens unit can include an optical lens assembly such as the photographing optical lens system of the present disclosure, a barrel and a holder member for holding the optical lens assembly.

The image capturing unit 10 is a wide-angle image capturing unit, the image capturing unit 10a is an ultra-wide-angle image capturing unit, the image capturing unit 10b is a wide-angle image capturing unit, the image capturing unit 10c is an ultra-wide-angle image capturing unit, and the image capturing unit 10d is a ToF (time of flight) image capturing unit. In this embodiment, the image capturing units 10, 10a, 10b and 10c have different fields of view, such that the electronic device 20 can have various magnification ratios so as to meet the requirement of optical zoom functionality. In addition, the image capturing unit 10d can determine depth information of the imaged object. In this embodiment, the electronic device 20 includes multiple image capturing units 10, 10a, 10b, 10c and 10d, but the present disclosure is not limited to the number and arrangement of image capturing units.

When a user captures images of an object 26, the light rays converge in the image capturing unit 10 or the image capturing unit 10a to generate images, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the light rays may converge in the image capturing unit 10b, 10c or 10d to generate images. The display module 24 can include a touch screen, and the user is able to interact with the display module 24 and the image software processor 25 having multiple functions to capture images and complete image processing. Alternatively, the user may capture images via a physical button. The image processed by the image software processor 25 can be displayed on the display module 24.

11th Embodiment

Figure 21:
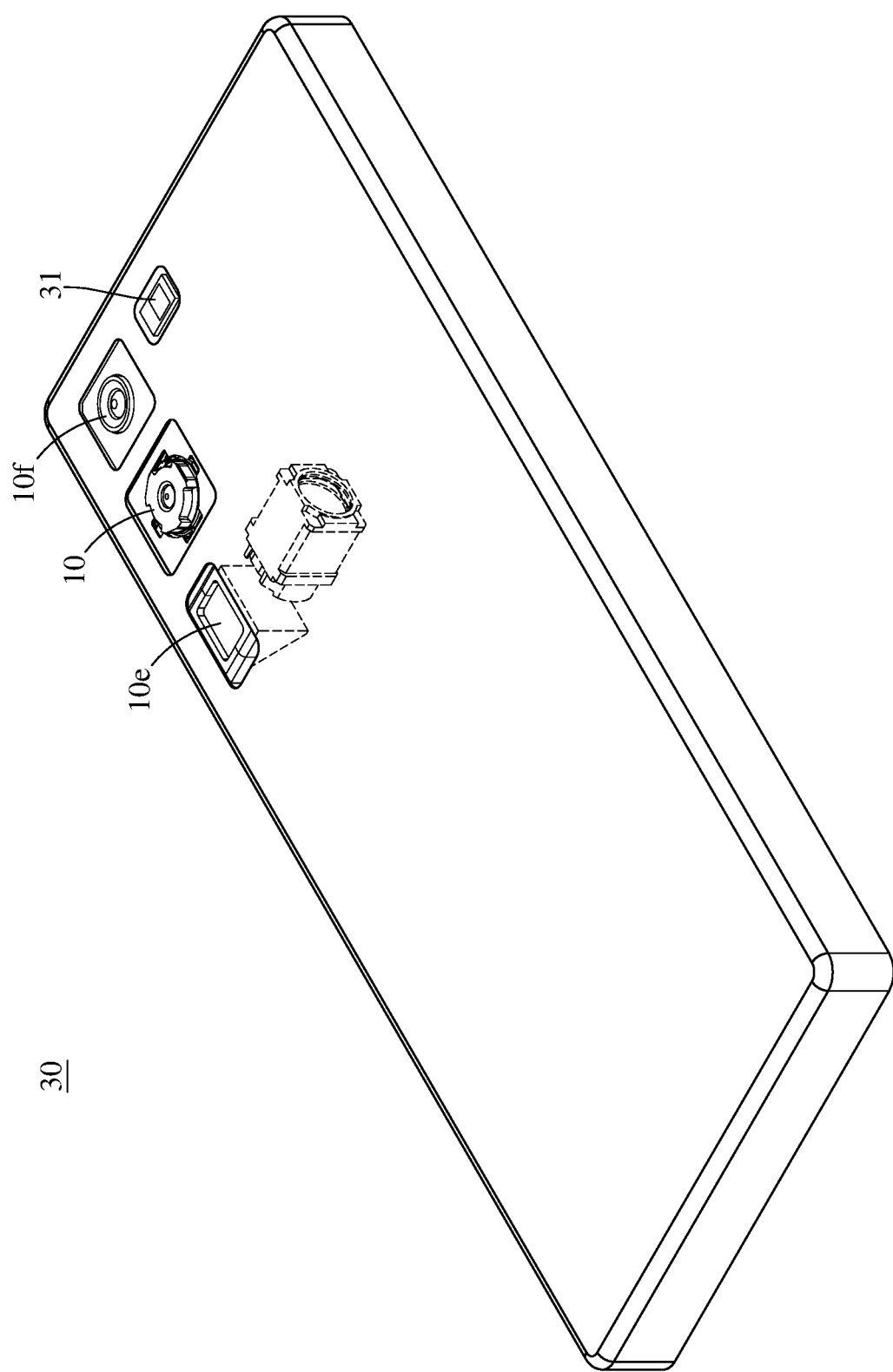
FIG. 21 is one perspective view of an electronic device according to the 11th embodiment of the present disclosure.

FIG. 21 is one perspective view of an electronic device according to the 11th embodiment of the present disclosure.

In this embodiment, an electronic device 30 is a smartphone including the image capturing unit 10 disclosed in the 9th embodiment, an image capturing unit 10e, an image capturing unit 10f, a flash module 31, a focus assist module, an image signal processor, a display module and an image software processor (not shown). The image capturing unit 10, the image capturing unit 10e and the image capturing unit 10f are disposed on the same side of the electronic device 30, while the display module is disposed on the opposite side of the electronic device 30. Furthermore, each of the image capturing units 10e and 10f can include the photographing optical lens system of the present disclosure and can have a configuration similar to that of the image capturing unit 10, so the details in this regard will not be provided again.

The image capturing unit 10 is a wide-angle image capturing unit, the image capturing unit 10e is a telephoto image capturing unit, and the image capturing unit 10f is an ultra-wide-angle image capturing unit. In this embodiment, the image capturing units 10, 10e and 10f have different fields of view, such that the electronic device 30 can have various magnification ratios so as to meet the requirement of optical zoom functionality. Moreover, the image capturing unit 10e can be a telephoto image capturing unit having a light-folding element configuration, such that the total track length of the image capturing unit 10e is not limited by the thickness of the electronic device 30. Moreover, the light-folding element configuration of the image capturing unit 10e can be similar to, for example, one of the structures shown in FIG. 24 to FIG. 26 which can be referred to foregoing descriptions corresponding to FIG. 24 to FIG. 26 so the details in this regard will not be provided again. In this embodiment, the electronic device 30 includes multiple image capturing units 10, 10e and 10f, but the present disclosure is not limited to the number and arrangement of image capturing units. When a user captures images of an object, light rays converge in the image capturing unit 10, 10e or 10f to generate images, and the flash module 31 is activated for light supplement. Further, the subsequent processes are performed in a manner similar to the abovementioned embodiment, so the details in this regard will not be provided again.

12th Embodiment

Figure 22:
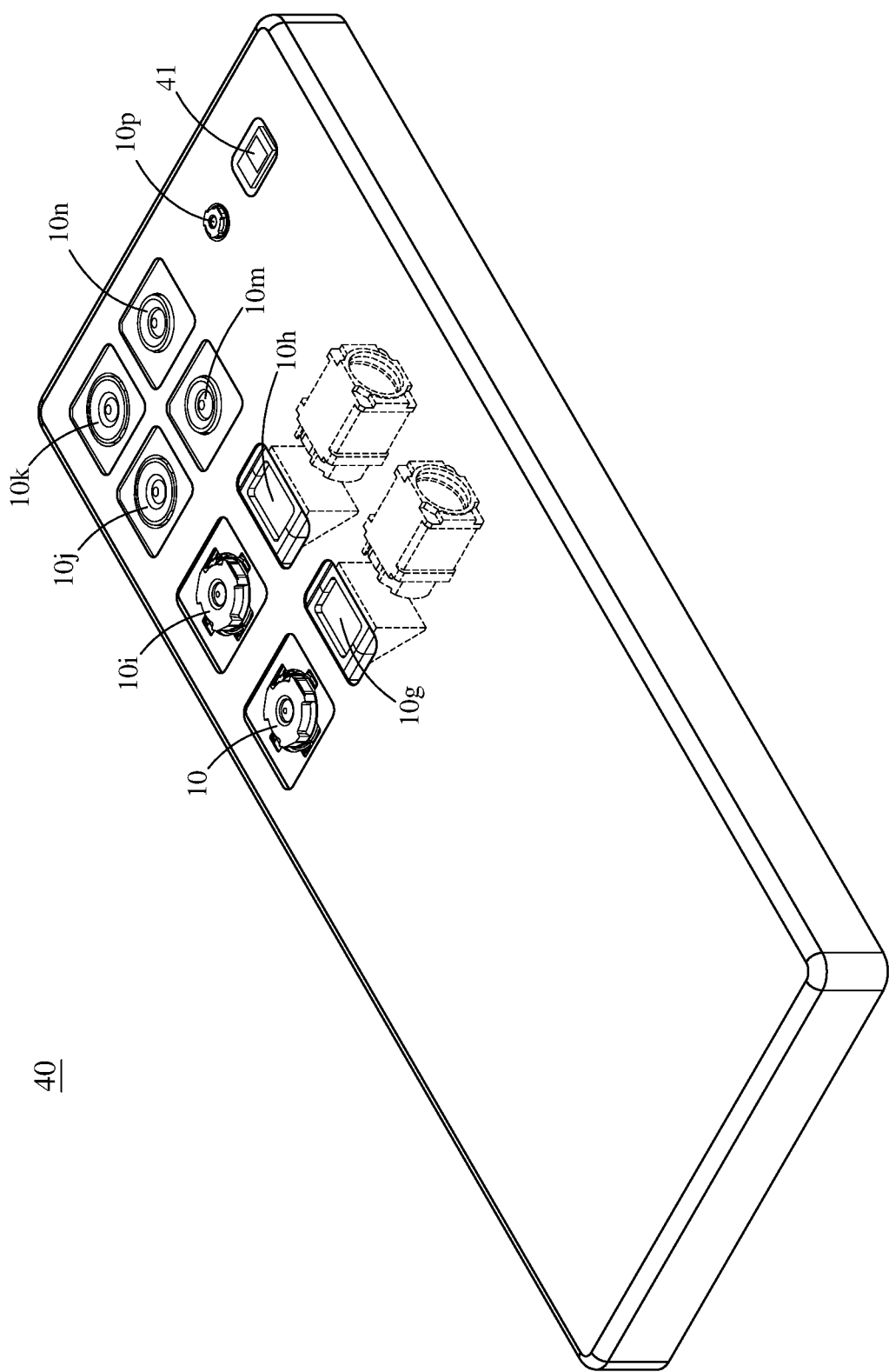
FIG. 22 is one perspective view of an electronic device according to the 12th embodiment of the present disclosure.

FIG. 22 is one perspective view of an electronic device according to the 12th embodiment of the present disclosure.

In this embodiment, an electronic device 40 is a smartphone including the image capturing unit 10 disclosed in the 9th embodiment, an image capturing unit 10g, an image capturing unit 10h, an image capturing unit 10i, an image capturing unit 10j, an image capturing unit 10k, an image capturing unit 10m, an image capturing unit 10n, an image capturing unit 10p, a flash module 41, a focus assist module, an image signal processor, a display module and an image software processor (not shown). The image capturing units 10, 10g, 10h, 10i, 10j, 10k, 10m, 10n and 10p are disposed on the same side of the electronic device 40, while the display module is disposed on the opposite side of the electronic device 40. Furthermore, each of the image capturing units 10g, 10h, 10i, 10j, 10k, 10m, 10n and 10p can include the photographing optical lens system of the present disclosure and can have a configuration similar to that of the image capturing unit 10, so the details in this regard will not be provided again.

The image capturing unit 10 is a wide-angle image capturing unit, the image capturing unit 10g is a telephoto image capturing unit, the image capturing unit 10h is a telephoto image capturing unit, the image capturing unit 10i is a wide-angle image capturing unit, the image capturing unit 10j is an ultra-wide-angle image capturing unit, the image capturing unit 10k is an ultra-wide-angle image capturing unit, the image capturing unit 10m is a telephoto image capturing unit, the image capturing unit 10n is a telephoto image capturing unit, and the image capturing unit 10p is a ToF image capturing unit. In this embodiment, the image capturing units 10, 10g, 10h, 10i, 10j, 10k, 10m and 10n have different fields of view, such that the electronic device 40 can have various magnification ratios so as to meet the requirement of optical zoom functionality. Moreover, each of the image capturing units 10g and 10h can be a telephoto image capturing unit having a light-folding element configuration. Moreover, the light-folding element configuration of each of the image capturing unit 10g and 10h can be similar to, for example, one of the structures shown in FIG. 24 to FIG. 26 which can be referred to foregoing descriptions corresponding to FIG. 24 to FIG. 26 so the details in this regard will not be provided again. In addition, the image capturing unit 10p can determine depth information of the imaged object. In this embodiment, the electronic device 40 includes multiple image capturing units 10, 10g, 10h, 10i, 10j, 10k, 10m, 10n and 10p, but the present disclosure is not limited to the number and arrangement of image capturing units. When a user captures images of an object, the light rays converge in the image capturing unit 10, 10g, 10h, 10i, 10j, 10k, 10m, 10n or 10p to generate images, and the flash module 41 is activated for light supplement. Further, the subsequent processes are performed in a manner similar to the abovementioned embodiments, so the details in this regard will not be provided again.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;

wherein the object-side surface of the first lens element is concave in a paraxial region thereof, the sixth lens element has positive refractive power, the object-side surface of the sixth lens element is concave in a paraxial region thereof, the image-side surface of the sixth lens element is convex in a paraxial region thereof, and at least one of the object-side surface and the image-side surface of at least one lens element of the photographing optical lens system has at least one inflection point;

wherein an Abbe number of the third lens element is V3, an Abbe number of the fourth lens element is V4, an Abbe number of the fifth lens element is V5, an axial distance between the object-side surface of the first lens element and an image surface is TL, an entrance pupil diameter of the photographing optical lens system is EPD, a maximum image height of the photographing optical lens system is ImgH, and the following conditions are satisfied:

$0.30 < (V3+V5)/V4 < 1.2;$ $1.0 < TL/EPD < 6.0;$ and $0.80 < TL/ImgH < 1.8.$

2. The photographing optical lens system of claim 1, wherein the Abbe number of the third lens element is V3, the Abbe number of the fourth lens element is V4, the Abbe number of the fifth lens element is V5, an Abbe number of the sixth lens element is V6, an Abbe number of the seventh lens element is V7, and the following conditions are satisfied:

$0.40 < (V3+V5)/V4 < 1.0;$ and $4.0 < (V4+V6+V7)/(V3+V5) < 6.0.$

3. The photographing optical lens system of claim 1, wherein the axial distance between the object-side surface of the first lens element and the image surface is TL, the entrance pupil diameter of the photographing optical lens system is EPD, the maximum image height of the photographing optical lens system is ImgH, a maximum effective radius of the object-side surface of the first lens element is Y11, a maximum effective radius of the image-side surface of the seventh lens element is Y72, and the following conditions are satisfied:

$2.0<TL/EPD<5.0;$ $1.0<TL/ImgH<1.6;$ and $0.30<Y11/Y72<0.75.$

4. The photographing optical lens system of claim 1, wherein a minimum value among Abbe numbers of all lens elements of the photographing optical lens system is Vmin, a focal length of the photographing optical lens system is f, a focal length of the first lens element is f1, a focal length of the second lens element is f2, a focal length of the third lens element is f3, and the following conditions are satisfied:

$10.0<Vmin<20.0;$ and $|f/f1|+|f/f2|+|f/f3|<1.0.$

5. The photographing optical lens system of claim 1, wherein a central thickness of the first lens element is CT1, a central thickness of the third lens element is CT3, a central thickness of the fourth lens element is CT4, and the following conditions are satisfied:

$0.90<CT1/CT3<2.8;$ and $0.15<CT3/CT4<0.60.$

6. The photographing optical lens system of claim 1, wherein the object-side surface of the second lens element is convex in a paraxial region thereof, and the image-side surface of the second lens element is concave in a paraxial region thereof;
wherein a vertical distance between a critical point on the object-side surface of the first lens element and an optical axis is Yc11, a maximum effective radius of the object-side surface of the first lens element is Y11, and the object-side surface of the first lens element has at least one critical point in an off-axis region thereof satisfying the following condition:

$0.15<Yc11/Y11<0.75.$

7. The photographing optical lens system of claim 1, wherein the fourth lens element has positive refractive power, and the image-side surface of the fourth lens element is convex in a paraxial region thereof;
wherein a focal length of the fourth lens element is f4, a focal length of the sixth lens element is f6, and the following condition is satisfied:

$1.3<f4/f6<2.5.$

8. The photographing optical lens system of claim 1, wherein the seventh lens element has negative refractive power, and the image-side surface of the seventh lens element is concave in a paraxial region thereof;
wherein a vertical distance between a critical point on the image-side surface of the seventh lens element and an optical axis is Yc72, a maximum effective radius of the image-side surface of the seventh lens element is Y72, and the image-side surface of the seventh lens element has at least one critical point in an off-axis region thereof satisfying the following condition:

$0.35<Yc72/Y72<0.80.$

9. The photographing optical lens system of claim 1, wherein the image-side surface of the seventh lens element is concave in a paraxial region thereof;
wherein a focal length of the photographing optical lens system is f, a curvature radius of the object-side surface of the sixth lens element is R11, a curvature radius of the image-side surface of the sixth lens element is R12, a curvature radius of the image-side surface of the seventh lens element is R14, and the following conditions are satisfied:

$-7.5<f/R11+f/R12<-1.5;$ and $3.0<f/R14<4.0.$

10. An image capturing unit, comprising:
the photographing optical lens system of claim 1; and
an image sensor disposed on the image surface of the photographing optical lens system.

11. An electronic device, comprising:
the image capturing unit of claim 10.

12. A photographing optical lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
wherein the object-side surface of the first lens element is concave in a paraxial region thereof, the image-side surface of the first lens element is convex in a paraxial region thereof, the sixth lens element has positive refractive power, the object-side surface of the sixth lens element is concave in a paraxial region thereof, the image-side surface of the sixth lens element is convex in a paraxial region thereof, the image-side surface of the seventh lens element is concave in a paraxial region thereof, and at least one of the object-side surface and the image-side surface of at least one lens element of the photographing optical lens system has at least one inflection point;
wherein an Abbe number of the third lens element is V3, an Abbe number of the fourth lens element is V4, an Abbe number of the fifth lens element is V5, an axial distance between an object-side surface of the first lens element and an image surface is TL, an entrance pupil diameter of the photographing optical lens system is EPD, and the following conditions are satisfied:

$0.30<(V3+V5)/V4<1.2;$ and $1.0<TL/EPD<6.0.$

13. The photographing optical lens system of claim 12, wherein the Abbe number of the third lens element is V3, the Abbe number of the fourth lens element is V4, the Abbe number of the fifth lens element is V5, and the following condition is satisfied:

$0.40<(V3+V5)/V4<1.0.$

14. The photographing optical lens system of claim 12, wherein the axial distance between the object-side surface of the first lens element and the image surface is TL, the entrance pupil diameter of the photographing optical lens system is EPD, a focal length of the photographing optical lens system is f, and the following conditions are satisfied:

$2.0<TL/EPD<5.0;$ and $1.2<TL/f<2.5.$

15. The photographing optical lens system of claim 12, wherein an Abbe number of the first lens element is V1, an Abbe number of the second lens element is V2, the Abbe number of the third lens element is V3, a focal length of the photographing optical lens system is f, a composite focal length of the first lens element, the second lens element and the third lens element is f123, and the following conditions are satisfied:

$40.0 < V1+V2+V3 < 125.0$; and $|f/f123| < 0.40$.

16. The photographing optical lens system of claim 12, wherein a focal length of the first lens element is f1, a curvature radius of the object-side surface of the first lens element is R1, and the following condition is satisfied:

$|f1|/R1 < -2.5$.

17. The photographing optical lens system of claim 12, wherein the fourth lens element has positive refractive power, and the seventh lens element has negative refractive power;
wherein a vertical distance between a critical point on the image-side surface of the first lens element and an optical axis is Yc12, a maximum effective radius of the image-side surface of the first lens element is Y12, the image-side surface of the first lens element has at least one critical point in an off-axis region thereof satisfying the following condition:

$0.20 < Yc12/Y12 < 0.75$.

18. The photographing optical lens system of claim 12, wherein at least one of the object-side surface and the image-side surface of each of at least two lens elements of the photographing optical lens system has at least one inflection point;
wherein a central thickness of the first lens element is CT1, a central thickness of the second lens element is CT2, an axial distance between the first lens element and the second lens element is T12, and the following condition is satisfied:

$0.80 < (CT1+CT2)/T12 < 12$.

19. A photographing optical lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
wherein the object-side surface of the second lens element is convex in a paraxial region thereof, the image-side surface of the second lens element is concave in a paraxial region thereof, the image-side surface of the fourth lens element is convex in a paraxial region thereof, the object-side surface of the sixth lens element is concave in a paraxial region thereof, the image-side surface of the sixth lens element is convex in a paraxial region thereof, the seventh lens element has negative refractive power, and at least one of the object-side surface and the image-side surface of at least one lens element of the photographing optical lens system has at least one inflection point;
wherein an Abbe number of the third lens element is V3, an Abbe number of the fourth lens element is V4, an Abbe number of the fifth lens element is V5, a central thickness of the sixth lens element is CT6, a central thickness of the seventh lens element is CT7, an axial distance between the sixth lens element and the seventh lens element is T67, a focal length of the first lens element is f1, a focal length of the fourth lens element is f4, and the following conditions are satisfied:

$0.40 < (V3+V5)/V4 < 1.0$;

$1.5 < (CT6+CT7)/T67 < 13$; and $2.2 < |f1/f4|$.

20. The photographing optical lens system of claim 19, wherein the Abbe number of the third lens element is V3, the Abbe number of the fourth lens element is V4, the Abbe number of the fifth lens element is V5, half of a maximum field of view of the photographing optical lens system is HFOV, an f-number of the photographing optical lens system is Fno, and the following conditions are satisfied:

$0.50 < (V3+V5)/V4 < 0.80$;

$42.5$ degrees $<$ HFOV $< 65.0$ degrees; and $1.2 < $ Fno $ < 2.0$.

21. The photographing optical lens system of claim 19, wherein the central thickness of the sixth lens element is CT6, the central thickness of the seventh lens element is CT7, the axial distance between the sixth lens element and the seventh lens element is T67, the focal length of the first lens element is f1, the focal length of the fourth lens element is f4, and the following conditions are satisfied:

$2.0 < (CT6+CT7)/T67 < 10$; and $3.0 < |f1/f4|$.

22. The photographing optical lens system of claim 19, wherein a focal length of the photographing optical lens system is f, the focal length of the first lens element is f1, a focal length of the seventh lens element is f7, a maximum effective radius of the object-side surface of the first lens element is Y11, a maximum effective radius of the image-side surface of the seventh lens element is Y72, and the following conditions are satisfied:

$|f/f1| < 0.45$;

$-1.8 < f/f7 < -0.70$; and $0.25 < Y11/Y72 < 0.90$.

23. The photographing optical lens system of claim 19, wherein the fourth lens element has positive refractive power, and the sixth lens element has positive refractive power;
wherein a focal length of the photographing optical lens system is f, a composite focal length of the fourth lens element, the fifth lens element and the sixth lens element is f456, and the following condition is satisfied:

$1.2 < f/f456 < 1.8$.

24. The photographing optical lens system of claim 19, wherein the object-side surface of the seventh lens element is convex in a paraxial region thereof, and the image-side surface of the seventh lens element is concave in a paraxial region thereof;
wherein a vertical distance between a critical point on the object-side surface of the seventh lens element and an optical axis is Yc71, a maximum effective radius of the object-side surface of the seventh lens element is Y71, the object-side surface of the seventh lens element has at least one critical point in an off-axis region thereof satisfying the following condition:

$0.10 < Yc71/Y71 < 0.50$.

25. The photographing optical lens system of claim 19, wherein at least one of the object-side surface and the image-side surface of at least one lens element of the photographing optical lens system has at least one critical point in an off-axis region thereof;

wherein a curvature radius of the object-side surface of the sixth lens element is R11, a curvature radius of the image-side surface of the sixth lens element is R12, and the following condition is satisfied:

$1.3 < (R11+R12)/(R11-R12) < 4.0$.

* * * * *